(12) United States Patent
Schilders

(10) Patent No.: US 12,481,782 B2
(45) Date of Patent: Nov. 25, 2025

(54) DATA SPLINTERING IN GRAPH-BASED MODELS

(71) Applicant: INFOSYS LIMITED, Bangalore (IN)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 107 days.

(21) Appl. No.: 18/589,032

(22) Filed: Feb. 27, 2024

(65) Prior Publication Data

US 2024/0289483 A1 Aug. 29, 2024

Related U.S. Application Data

(60) Provisional application No. 63/449,246, filed on Mar. 1, 2023, provisional application No. 63/448,711, filed on Feb. 28, 2023, provisional application No. 63/448,724, filed on Feb. 28, 2023, provisional application No. 63/448,738, filed on Feb. 28, 2023, provisional application No. 63/448,831, filed on Feb. 28, 2023.

(51) Int. Cl.
  *G06F 21/62* (2013.01)
  *G06F 16/901* (2019.01)

(52) U.S. Cl.
  CPC ...... *G06F 21/6227* (2013.01); *G06F 16/9024* (2019.01)

(58) Field of Classification Search
  CPC .................. G06F 21/6227; G06F 16/9024
  See application file for complete search history.

(56) References Cited

U.S. PATENT DOCUMENTS

| | | | |
|---|---|---|---|
| 12,056,190 B1 * | 8/2024 | Schilders | G06F 16/9027 |
| 2018/0322159 A1 * | 11/2018 | Metreveli | G06F 16/22 |
| 2023/0060127 A1 * | 3/2023 | Yan | G06F 16/3331 |

* cited by examiner

*Primary Examiner* — Michael Won
(74) *Attorney, Agent, or Firm* — Finnegan, Henderson, Farabow, Garrett & Dunner, LLP

(57) ABSTRACT

An overlay system is provided that includes a primary storage element, a plurality of auxiliary storage elements, and processing circuitry. The primary storage element stores an executable graph-based model having a plurality of nodes. The processing circuitry receives a first stimulus indicative of a data splintering instruction. Based on the first stimulus, the processing circuitry identifies a first node in the executable graph-based model and executes a data splintering operation on the first node to divide the first node into a plurality of splinters. The processing circuitry, based on the first stimulus, instantiates a plurality of location overlay nodes and associates the plurality of location overlay nodes with the plurality of splinters. Based on the association, the processing circuitry stores each splinter of the plurality of splinters in an auxiliary storage element indicated by a corresponding location overlay node.

20 Claims, 19 Drawing Sheets

DATA SPLINTERING IN GRAPH-BASED MODELS

CROSS-REFERENCE TO RELATED APPLICATIONS/INCORPORATION BY REFERENCE

This patent application refers to, claims priority to, and claims the benefit of U.S. Provisional Application Ser. No. 63/448,738, filed Feb. 28, 2023; 63/448,724, filed Feb. 28, 2023; 63/448,831, filed Feb. 28, 2023; 63/448,711, filed Feb. 28, 2023; and 63/449,246, filed Mar. 1, 2023. Each of the above-referenced applications is hereby incorporated herein by reference in its entirety.

FIELD OF THE DISCLOSURE

Various embodiments of the present disclosure relate generally to graph-based models. More specifically, various embodiments of the present disclosure relate to data security in executable graph-based models.

BACKGROUND

In the present era, data has become one of the most crucial aspects of various domains, such as service provider platforms, research and development, marketing, or the like. Data may be a resource or a byproduct of such domains. Many times, such data may be sensitive and confidential. Therefore, the data is required to be protected to prevent misuse (for example, data theft, identity theft, unauthorized data manipulation, or the like). Traditionally, data associated with a domain is stored in a database. The database, in order to protect the data stored therein, is protected by applying one or more security techniques (for example, encryption, obfuscation, or the like). However, such an approach to protect the data faces numerous challenges. Notably, the database is protected using a single-layer security mechanism. Therefore, a single breach in the security leaves the entire database vulnerable. In some instances, the database may store data associated with multiple users of the domain. Therefore, unauthorized access to data associated with one user may compromise data associated with every user of the domain.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating data splintering in executable graph-based models are provided substantially as shown in, and described in connection with, at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
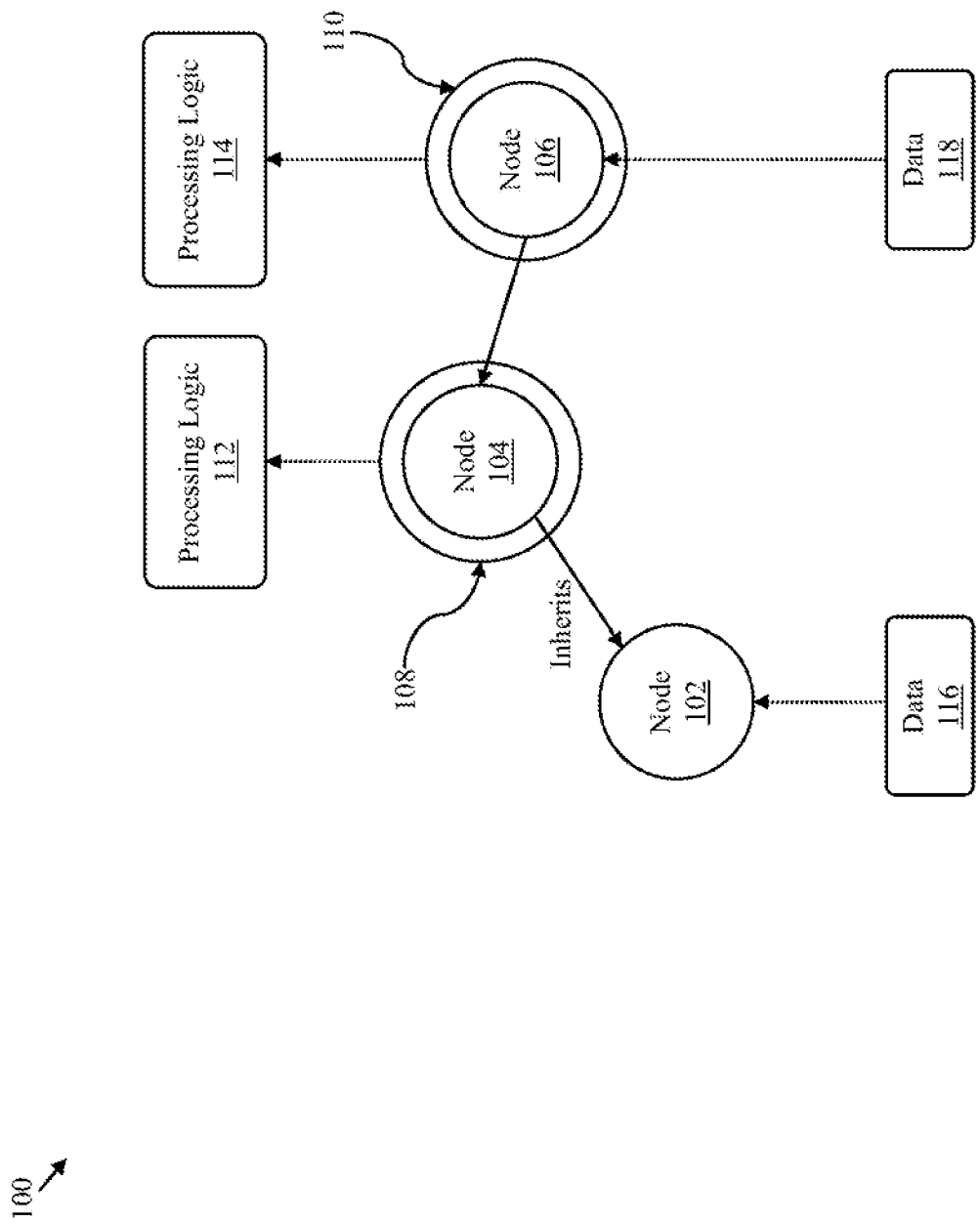
FIG. 1 is a graph that illustrates a composition of an executable graph-based model, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

In recent times, data has become crucial for numerous domains (for example, artificial intelligence, research and development, marketing, hospitality, inventory management, or the like). Such domains may use data as a resource or produce data as a byproduct. Also, the data used as the resource as well as the data produced as the byproduct may be sensitive and confidential. Therefore, the data is required to be secured from unauthorized use, data theft, or other such security threats. Traditionally, data associated with a domain is stored in a database associated therewith. In order to protect the data, the database is secured by applying a security technique (for example, an encryption technique, an obfuscation technique, or the like). However, the traditional approach to secure the data faces numerous challenges. In case of a single security breach in the database, the data stored in the database gets completely exposed. In an instance, the data may include data records associated with multiple users of the domain. Therefore, the security breach exposes data associated with each user of the domain. Moreover, the data in the database becomes available and usable to an intruder, who has caused the security breach, as soon as the database becomes accessible. Hence, the time and effort required for performing the unauthorized access of the data stored in the database are the same as the time and effort required to cause the security breach.

The present disclosure is directed to the facilitation of data splintering in an executable graph-based model of an overlay system. The executable graph-based model is a customized hypergraph having hyper-edges and vertices that are realized by way of executable nodes. Each executable node is a base node that is extended by way of one or more overlays. Each executable node is associated with a particular node type. For example, an edge node corresponds to a base node with an edge node type. Nodes (for example, base nodes and executable nodes) are connected with other nodes by way of roles included in an edge node therebetween. In some embodiments, roles are represented by way of nodes of role node type. A role node between two nodes may be indicative of a context regarding an association therebetween. The executable graph-based model also includes a plurality of overlay nodes that incorporate in-situ features (for example, data splintering) in the overlay system. Each overlay node is associated with one or more nodes (for example, a vertex node, an edge node, or the like) of the executable graph-based model and includes a corresponding processing logic that when executed implements a functionality thereof on the associated nodes.

The overlay system disclosed herein may be used to implement data splintering in a dataset associated therewith. Splintering refers to a concept of dividing each data record in the dataset into a plurality of splinters, where each splinter is a unit of a corresponding data record that is separated from other splinters of the data record. Such separation is realized by storing each of the plurality of splinters of the data record at a separate storage element of the overlay system. In some instances, to form the splinters, the division of the data record may be performed to split the data record into its smallest unit (e.g., a data unit, a data element, a data attribute, or the like). In other instances, to form the splinters, the division of the data record may be performed to separate a data structure from the data, of the data record. In some instances, to form the splinters, the division of the data record may be performed to split data into its smallest unit and separate data structure and data associated with the smallest unit.

The dataset in the overlay system is implemented by way of the executable graph-based model that is stored in a primary storage element of the overlay system. Each node of the executable graph-based model stores a data record associated with the dataset. Further, each data record has a plurality of data attributes that form a plurality of attribute values for a plurality of attributes of a node that stores the data record. In some instances, in order to perform a data splintering operation on a data record, processing circuitry of the overlay system separates a data structure and data of a node that stores the data record. The separated data structure forms a node template of the node, where the node template corresponds to a predefined schema/data structure of the data record stored at the node. The separated data of the node forms a node instance for the node, where the node instance corresponds to the data associated with the data record stored at the node. In other instances, in order to perform the data splintering operation on the data record, the processing circuitry may store each attribute value associated with the node at a corresponding attribute vertex node, such that each attribute vertex node forms a splinter. In other instances, the processing circuitry may separate data and data structure of each attribute value associated with the node such that each attribute value associated with the node forms two different splinters of the node. Further, each splinter may be associated with a corresponding location overlay node that is indicative of an auxiliary storage element of a plurality of auxiliary storage elements of the overlay system. Therefore, the processing circuitry stores each splinter in an auxiliary storage element indicated by the associated location overlay node. Additionally, one or more splinters may be associated with one or more additional overlay nodes (such as a storage strategy overlay node and a security overlay node). Therefore, a splinter that is associated with a storage strategy overlay node is stored in the auxiliary storage element by way of a storage strategy (for example, relational database management system (RDBMS), Document DB, or the like) indicated by the storage strategy overlay node. A splinter that is associated with a security overlay node is secured by applying a security technique (for example, an encryption technique, an obfuscation technique, or the like) indicated by the security overlay node.

Presently, the database is secured by applying a single security technique. Therefore, the single security breach leaves all the data records in the database vulnerable and accessible to the intruder. On the contrary, each data record in the database associated with the overlay system is divided into multiple splinters that are stored separately. Therefore, each splinter is required to be accessed in order to access the data record. Further, presently, the data records become accessible and usable to the intruder as soon as the security breach occurs. However, each splinter associated with data records in the dataset associated with the overlay system is stored separately using different storage strategies and may be secured using different security techniques. Therefore, for unauthorized use, each splinter is required to be accessed separately which requires additional time and effort. Hence, the access to the data records gets delayed which provides ample time for detection and neutralization of the unauthorized use.

Notably, the present disclosure allows for the splintering of data records in the dataset associated with the overlay system. Multiple splinters of each data record in the dataset are stored separately and using different storage strategies. Further, the splinters are secured by way of different security techniques. Therefore, the dataset gets secured by multiple factors including but not limited to, distributed storage of splinters of each data record of the dataset, different and/or separate security techniques applied on each splinter of each data record, and different storage strategies for storing splinters of each data record. Therefore, an unauthorized access to the dataset requires a separate retrieval and decryption of each splinter of each data record associated with the dataset, which results in a significantly high time complexity and processing complexity. In addition, since different data records of the dataset may have different security techniques applied to it, the unauthorized access to the dataset may also require separate retrieval and decryption of each data record of the dataset. Application areas of the present disclosure may include domains that are associated with sensitive and confidential data, such as research and development, database management systems, messaging systems, marketing platforms, financial services, or the like.

Figure Description:

FIG. 1 is a graph that illustrates a composition of an executable graph-based model 100, in accordance with an embodiment of the present disclosure. Referring to FIG. 1, the executable graph-based model 100 is generally formed of a data structure (e.g., a graph-based model or a graphical model) comprising a plurality of nodes 102-106 which can be functionally extended with processing logic via the use of overlays. For example, as shown in FIG. 1, the nodes 104 and 106 are functionally extended with processing logic via the use of overlays 108 and 110, respectively. Although not shown, the node 102 can be similarly extended with processing logic via the use of one or more overlays. Each overlay includes processing logic, such as processing logic 112 and 114 which are associated with the overlays 108 and 110, respectively. At run-time, data, such as data 116 and 118, is associated with the nodes 102 and 106, respectively. Further, the overlays 108 and 110 of the nodes 104 and 106, respectively, provide the functionality to respond to stimuli and interact with, manipulate, or otherwise process the data based on the stimuli. Further, the node 104 inherits the node 102, and hence, also inherits the data 116 which is associated with the node 102. In some embodiments, the node 102 may be extended to have one or more overlays. In such embodiments, the node 104 may further inherit the overlays of the node 102.

Each element within the executable graph-based model 100 (both the data and the processing functionality) is implemented by way of a node. A node forms the fundamental building block of all executable graph-based models. A node may be an executable node. A node that is extended by way of an overlay node forms an executable node. One or more nodes are extended to include overlays in order to form the executable graph-based model 100. As such, the executable graph-based model 100 includes one or more nodes that can be dynamically generated, extended, or processed by one or more other modules within an overlay system (shown in FIG. 2). Throughout the description, the terms "overlay node" and "overlay" are used interchangeably.

Notably, the structure and functionality of the data processing are separate from the data itself when offline (or at rest) and are combined dynamically at run-time. The executable graph-based model 100 thus maintains the separability of the data and the processing logic when offline. Moreover, by integrating the data and the processing logic within a single model, processing delays or latencies are reduced because the data and the processing logic exist within the same logical system. Therefore, the executable graph-based model 100 applies to a range of time-critical systems where efficient processing of the stimuli is required.

Figure 2:
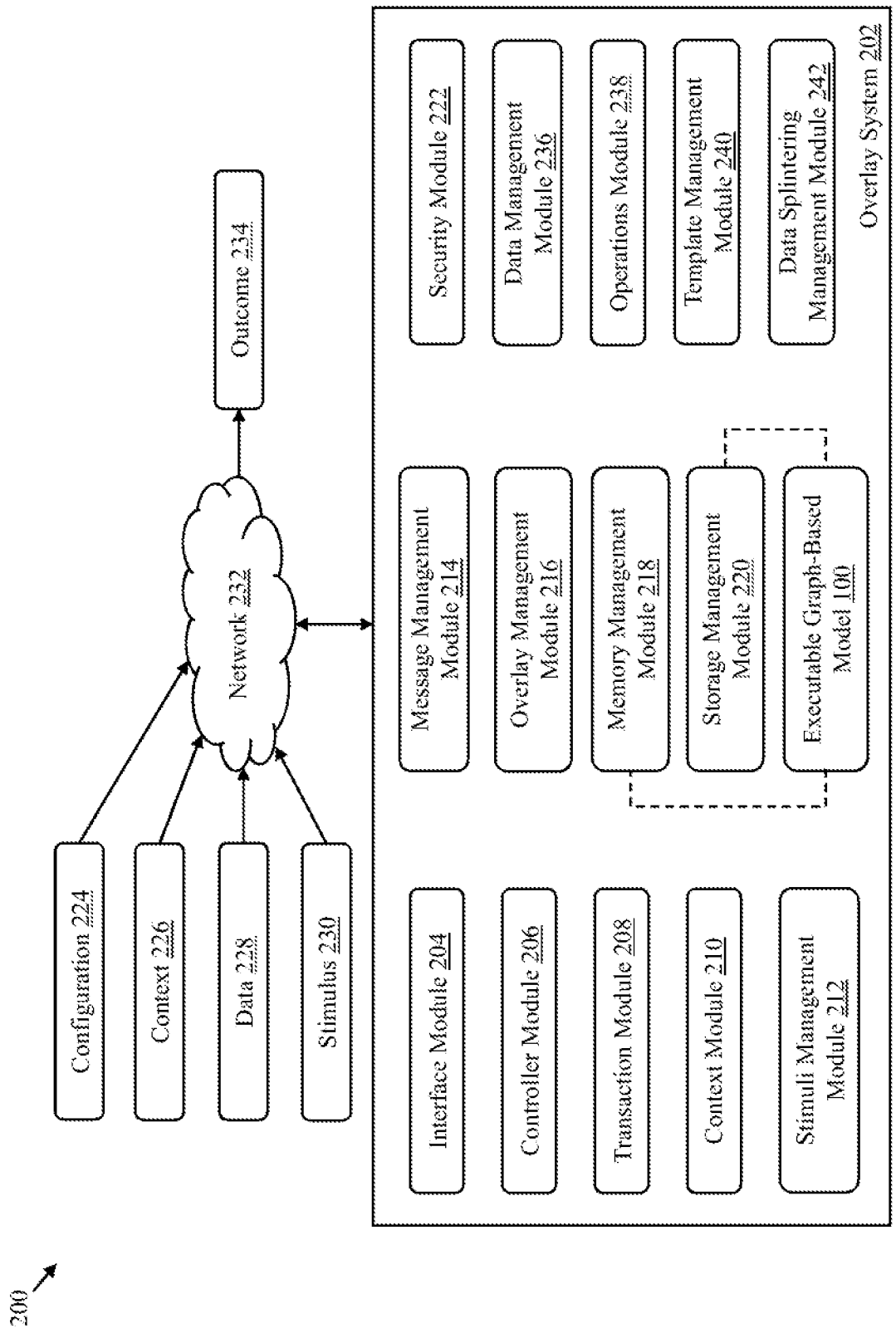
FIG. 2 is a block diagram that illustrates a system environment of an overlay system for execution, management, and configuration of the executable graph-based model, in accordance with an embodiment of the present disclosure.

FIG. 2 is a block diagram that illustrates a system environment 200 of an overlay system 202 for execution, management, and configuration of the executable graph-based model 100, in accordance with an embodiment of the present disclosure. Referring to FIG. 2, the overlay system 202 includes the executable graph-based model 100. The overlay system 202 further includes an interface module 204, a controller module 206, a transaction module 208, a context module 210, a stimuli management module 212, a message management module 214, an overlay management module 216, a memory management module 218, a storage management module 220, and a security module 222. FIG. 2 further shows a configuration 224, a context 226, data 228, a stimulus 230, a network 232, and an outcome 234. Additionally, the overlay system 202 of the present disclosure includes a data management module 236, an operations module 238, a template management module 240, and a data splintering management module 242. In some embodiments, all the modules of the overlay system 202 except for the executable graph-based model 100 may collectively form processing circuitry that performs splintering of data records (namely, data) in a dataset associated with the overlay system 202. Splintering refers to an operation of dividing data records in the dataset into multiple splinters, where each splinter is a unit of the data record that is separated from other splinters of the data record. Such separation is realized by storing each splinter of the data record at separate storage elements of the overlay system. Throughout the description, the terms "data splintering" and "splintering" are used interchangeably.

The overlay system 202 may include suitable logic, circuitry, interfaces, and/or code, executable by the circuitry, that may be configured to facilitate data splintering in the executable graph-based model 100. Data splintering may be performed to provide multiple security layers to the dataset associated with the overlay system 202 against unwanted and/or unauthorized access to the dataset. The overlay system 202 includes the executable graph-based model 100 that corresponds to an application-specific combination of data and processing functionality which is manipulated, processed, and/or otherwise handled by the other modules within the overlay system 202 for performing analysis of data based on the stimulus 230 received by the overlay system 202.

The interface module 204 may include suitable logic, circuitry, interfaces, and/or code, executable by the circuitry, configured to provide a common interface between internal modules of the overlay system 202 and/or external sources. The interface module 204 provides an application programmable interface (API), scripting interface, or any other suitable mechanism for interfacing externally or internally with any module of the overlay system 202. The configuration 224, the context 226, the data 228, and the stimulus 230 may be received by the interface module 204 via the network 232. Similarly, outputs (e.g., the outcome 234) produced by the overlay system 202 are passed by the interface module 204 to the network 232 for consumption or processing by external systems. In one embodiment, the interface module 204 supports one or more messaging patterns or protocols such as the simple object access protocol (SOAP), the representational state transfer (REST) protocol, or the like. The interface module 204 thus allows the overlay system 202 to be deployed in any number of application areas, operational environments, or architecture deployments. Although not illustrated in FIG. 2, the interface module 204 is communicatively coupled (e.g., connected either directly or indirectly) to one or more other modules or elements within the overlay system 202 (such as the controller module 206, the context module 210, the executable graph-based model 100, or the like). In one embodiment, the interface module 204 is communicatively coupled (e.g., connected either directly or indirectly) to one or more overlays within the executable graph-based model 100.

The controller module 206 may include suitable logic, circuitry, interfaces, and/or code, executable by the circuitry, configured to handle and process interactions and executions within the overlay system 202. As will be described in more detail below, stimuli (such as the stimulus 230) and their associated contexts (such as the context 226) provide the basis for all interactions within the executable graph-based model 100. Processing of such stimuli may lead to execution of processing logic associated with one or more overlays within the executable graph-based model 100. The processing of the stimuli within the overlay system 202 may be referred to as a system transaction. The processing and execution of stimuli (and associated overlay execution) within the overlay system 202 is handled by the controller module 206. The controller module 206 manages all received input stimuli (e.g., the stimulus 230) and processes them based on a corresponding context (e.g., the context 226). The context 226 determines the priority that is to be assigned to the processing of the corresponding stimulus by the controller module 206 or the context module 210. This allows each stimulus to be configured with a level of importance and prioritization within the overlay system 202.

The controller module 206 may maintain the integrity of the modules within the overlay system 202 before, during, and after a system transaction. The transaction module 208, which is associated with the controller module 206, is responsible for maintaining the integrity of the overlay system 202 through the lifecycle of a transaction. Maintaining system integrity via the controller module 206 and the transaction module 208 allows a transaction to be rolled back in an event of an expected or unexpected software or hardware fault or failure. The controller module 206 is configured to handle the processing of the stimulus 230 and transactions through architectures such as parallel processing, grid computing, priority queue techniques, or the like. In one embodiment, the controller module 206 and the transaction module 208 are communicatively coupled (e.g., connected either directly or indirectly) to one or more overlays within the executable graph-based model 100.

As stated briefly above, the overlay system 202 utilizes a context-driven architecture, whereby the stimulus 230 within the overlay system 202 is associated with the context 226 which is used to adapt the handling or processing of the stimulus 230 by the overlay system 202. That is to say that the handling or processing of the stimulus 230 is done based on the context 226 associated therewith. Hence, the stimulus 230 is a contextualized stimulus. The context 226 may include details such as username, password, access token, device information, time stamp, one or more relevant identifiers (IDs), or the like, that are required for processing of stimulus within the executable graph-based model 100. Each context within the overlay system 202 may be extended to include additional information that is required for the processing of the stimulus (e.g., a query, a command, or an event).

The context module 210 may include suitable logic, circuitry, interfaces, and/or code, executable by the circuitry, configured to manage the handling of contexts within the overlay system 202. The context module 210 is responsible for processing any received contexts (e.g., the context 226) and translating the received context to an operation execution context. In some examples, the operation execution context is larger than the received context because the context module 210 supplements the received context with further information necessary for the processing of the received context. The context module 210 passes the operation execution context to one or more other modules within the overlay system 202 to drive communication of data associated with the operation execution context. Contexts within the overlay system 202 can be external or internal. While some contexts apply to all application areas and problem spaces, some applications may require specific contexts to be generated and used to process the received stimulus 230. As will be described in more detail below, the executable graph-based model 100 is configurable (e.g., via the configuration 224) so as only to execute within a given execution context for a given stimulus.

The stimuli management module 212 may include suitable logic, circuitry, interfaces, and/or code, executable by the circuitry, configured to process externally received stimuli (e.g., the stimulus 230) and any stimuli generated internally from any module within the overlay system 202. The stimuli management module 212 is communicatively coupled (e.g., connected either directly or indirectly) to one or more overlays within the executable graph-based model 100 to facilitate the processing of stimuli within the executable graph-based model 100. The overlay system 202 utilizes different types of stimuli such as a command (e.g., a transactional request), a query, or an event received from an external system such as an Internet-of-Things (IoT) device. As previously stated, a stimulus (such as the stimulus 230) can be either externally or internally generated. In an example, the stimulus 230 may be a message that is internally triggered (e.g., generated) from any of the modules within the overlay system 202. Such internal generation of the stimulus 230 indicates that something has happened within the overlay system 202 and subsequent handling by one or more other modules within the overlay system 202 may be required. Internal stimulus 230 can also be triggered (e.g., generated) from the execution of processing logic associated with overlays within the executable graph-based model 100. In another example, the stimulus 230 may be externally triggered and may be generated based on an input received via a user interface associated with the controller module 206. The externally triggered stimulus 230 may be received in the form of a textual, audio, or visual input. The externally triggered stimulus 230 may be associated with the intent of a user to execute an operation indicated by the stimulus 230. The operation is executed in accordance with information included in the context 226 associated with the stimulus 230.

The stimuli management module 212 may receive the stimuli (such as the stimulus 230) in real-time or near-real-time and communicate the received stimuli to one or more other modules or nodes of the executable graph-based model 100. In some examples, the stimuli are scheduled in a batch process. The stimuli management module 212 utilizes any suitable synchronous or asynchronous communication architectures or approaches in communicating the stimuli (along with associated information). The stimuli within the overlay system 202 are received and processed (along with a corresponding context) by the stimuli management module 212, which then determines the processing steps to be performed for the communication of data associated with each stimulus. In one embodiment, the stimuli management module 212 processes the received stimuli in accordance with a predetermined configuration (e.g., the configuration 224) or dynamically determines what processing needs to be performed based on the contexts associated with the stimuli and/or based on a state of the executable graph-based model 100. The state of the executable graph-based model 100 refers to the current state of each node of the executable graph-based model 100 at a given point in time. The state of the executable graph-based model 100 is dynamic, and hence, may change based on processing of data by any of its nodes. In some examples, the processing of a stimulus (such as the stimulus 230) results in the generation, communication, or processing of data that further results in one or more outcomes (e.g., the outcome 234) being generated. Such outcomes are either handled internally by one or more modules in the overlay system 202 or communicated via the interface module 204 as an external outcome. In one embodiment, all stimuli and corresponding outcomes are recorded for auditing and post-processing purposes by, for example, the operations module 238 of the overlay system 202.

The message management module 214 may include suitable logic, circuitry, interfaces, and/or code, executable by the circuitry, configured to manage all data or information associated with data (e.g., in form of messages) communicated within the overlay system 202 (e.g., the data 228) for a given communication network implemented by way of the executable graph-based model 100. Operations performed by the message management module 214 include data loading, data unloading, data modeling, and data processing operations associated with the generation and communication of messages within the overlay system 202. The message management module 214 is communicatively coupled (e.g., connected either directly or indirectly) to one or more other modules within the overlay system 202 to complete some or all of these operations. For example, the storage of data or information associated with messages is handled in conjunction with the storage management module 220 (as described in more detail below).

The overlay management module 216 may include suitable logic, circuitry, interfaces, and/or code, executable by the circuitry, configured to manage all overlays within the overlay system 202. Operations performed by the overlay management module 216 include overlay storage management, overlay structure modeling, overlay logic creation and execution, and overlay loading and unloading (within the executable graph-based model 100). The overlay management module 216 is communicatively coupled (e.g., connected either directly or indirectly) to one or more other modules within the overlay system 202 to complete some or all of these operations. For example, overlays can be persisted in some form of physical storage using the storage management module 220 (as described in more detail below). As a further example, overlays can be compiled and preloaded into memory via the memory management module 218 for faster run-time execution.

The memory management module 218 may include suitable logic, circuitry, interfaces, and/or code, executable by the circuitry, configured to manage and optimize the memory usage of the overlay system 202. The memory management module 218 thus helps to improve the responsiveness and efficiency of the processing performed by one or more of the modules within the overlay system 202 by optimizing the memory handling performed by these modules. The memory management module 218 uses direct memory or some form of distributed memory management architecture (e.g., a local or remote caching solution). Additionally, or alternatively, the memory management module 218 deploys multiple different types of memory management architectures and solutions (e.g., reactive caching approaches such as lazy loading or a proactive approach such as write-through cache may be employed). These architectures and solutions are deployed in the form of a flat (single-tiered) or multi-tiered caching architecture where each layer of the caching architecture can be implemented using a different caching technology or architecture solution approach. In such implementations, each cache or caching tier can be configured (e.g., by the configuration 224) independent of the requirements for one or more modules of the overlay system 202. For example, data priority and an eviction strategy, such as least-frequently-used (LFU) or least-recently-used (LRU), can be configured for all or parts of the executable graph-based model 100. In one embodiment, the memory management module 218 is communicatively coupled (e.g., connected either directly or indirectly) to one or more overlays within the executable graph-based model 100.

The storage management module 220 may include suitable logic, circuitry, interfaces, and/or code, executable by the circuitry, configured to manage the temporary or permanent storage of data associated with the overlay system 202. The storage management module 220 is any suitable low-level storage device solution (such as a file system) or any suitable high-level storage technology such as another database technology (e.g., relational database management system (RDBMS) or NoSQL database). The storage management module 220 is directly connected to the storage device upon which the relevant data is persistently stored. For example, the storage management module 220 can directly address the computer-readable medium (e.g., hard disk drive, external disk drive, or the like) upon which the data is being read or written. Alternatively, the storage management module 220 is connected to the storage device via a network such as the network 232. As will be described in more detail later in the present disclosure, the storage management module 220 uses manifests to manage the interactions between the storage device and the modules within the overlay system 202. In one embodiment, the storage management module 220 is communicatively coupled (e.g., connected either directly or indirectly) to one or more overlays within the executable graph-based model 100.

As described, storage, loading, and unloading of the executable graph-based model 100 or one or more components thereof is facilitated by the memory management module 218 and the storage management module 220. The memory management module 218 and the storage management module 220 may facilitate such operations by interacting with the storage device. In the present disclosure, the executable graph-based model 100 may be stored in a primary storage element of the overlay system 202, whereas, splinters of the data records in the dataset associated with the overlay system 202 are stored in a plurality of auxiliary storage elements of the overlay system 202. The primary storage element and the plurality of auxiliary storage elements correspond to a combination of the memory management module 218 and storage management module 220 that may be configured to store the executable graph-based model 100 and the splinters, respectively. In some embodiments, the primary and auxiliary storage elements may be storage modules that are managed by the memory management module 218 and storage management module 220, collectively. The overlay system 202 further includes a plurality of manifest storages. The manifest storages are used by the memory management module 218 and the storage management module 220 to facilitate storage manifest states (including manifest template states and manifest instance states) of nodes. Manifest states are described in detail in conjunction with FIG. 5.

The security module 222 may include suitable logic, circuitry, interfaces, and/or code, executable by the circuitry, configured to manage the security of the overlay system 202. This includes the security at a system level and a module level. Security is hardware-related, network-related, or software-related, depending on the operational environment, the architecture of the deployment, or the data and information contained within the overlay system 202. For example, if the system is deployed with a web-accessible API (as described above in relation to the interface module 204), the security module 222 can enforce a hypertext transfer protocol secure (HTTPS) protocol with the necessary certification. As a further example, if the data or information associated with the data associated with the overlay system 202 contains Personally Identifiable Information (PII) or Protected Health Information (PHI), the security module 222 can implement one or more layers of data protection to ensure that the PII or PHI are correctly processed and stored. In an additional example, in implementations whereby the overlay system 202 operates on United States of America citizen medical data, the security module 222 may enforce additional protections or policies as defined by the United States Health Insurance Portability and Accountability Act (HIPAA). Similarly, if the overlay system 202 is deployed in the European Union (EU), the security module 222 may enforce additional protections or policies to ensure that the data processed and maintained by the overlay system 202 complies with the General Data Protection Regulation (GDPR). In one embodiment, the security module 222 is communicatively coupled (e.g., connected either directly or indirectly) to one or more overlays within the executable graph-based model 100, thereby directly connecting security execution to the data/information in the executable graph-based model 100. The security module 222 thus acts as a centralized coordinator that works in conjunction with the message management module 214 and the overlay management module 216 for managing and executing security-based overlays.

The data management module 236 may include suitable logic, circuitry, interfaces, and/or code, executable by the circuitry, configured to manage all data or information within the overlay system 202 (e.g., the data 228) for a given application. Operations performed by the data management module 236 include data loading, data unloading, data modeling, and data processing. The data management module 236 is communicatively coupled (e.g., connected either directly or indirectly) to one or more other modules within the overlay system 202 to complete some or all of these operations. For example, data storage is handled by the data management module 236 in conjunction with the storage management module 220.

The operations module 238 may include suitable logic, circuitry, interfaces, and/or code, executable by the circuitry, configured to track operational metrics and the behavior of all modules of the overlay system 202. Operational metrics of a module are indicative of statistics associated with the performance of the module while performing an operation (for example, communication, data processing, stimulus processing, or the like).

The template management module 240 may include suitable logic, circuitry, interfaces, and/or code, executable by the circuitry, configured to enable the overlay system 202 to implement a templated version of one or more nodes of the executable graph-based model 100. The template management module 240 may be configured to create one or more predefined templates in the executable graph-based model 100. The template management module 240 may be further configured to generate one or more node instances of the predefined templates for the implementation of a templated version of the executable graph-based model 100. Notably, the template management module 240 ensures ontology integrity by enforcing the structure and rules of a template when generating instances of the template at run-time. Ontology integrity refers to the consistency, accuracy, and correctness of an ontology. Thus, the template management module 240 ensures that the consistency, accuracy, and correctness of the ontology of the executable graph-based model 100 is maintained while generating the instances of the template at run-time. The template management module 240 may be communicatively coupled (i.e., connected either directly or indirectly) to one or more nodes and/or one or more overlays within the executable graph-based model 100.

The data splintering management module 242 may include suitable logic, circuitry, interfaces, and/or code, executable by the circuitry, configured to perform data splintering in data records included in the dataset associated with the overlay system 202. The data splintering management module 242 may be configured to (i) create splinters of each data record included in the dataset associated with the overlay system 202, (ii) manage the splinters, and (iii) organize the splinters of each data record to re-form a corresponding data record, and/or any other operation associated with data splintering.

The functionality of two or more of the modules included in the overlay system 202 may be combined within a single module. Conversely, the functionality of a single module can be split into two or more further modules which can be executed on two or more devices. The modules described above in relation to the overlay system 202 can operate in a parallel, distributed, or networked fashion. The overlay system 202 may be implemented in software, hardware, or a combination of both software and hardware. Examples of suitable hardware modules include a general-purpose processor, a field programmable gate array (FPGA), and/or an application-specific integrated circuit (ASIC). Software modules can be expressed in a variety of software languages such as C, C++, Java, Ruby, Visual Basic, Python, and/or other object-oriented, procedural, or programming languages.

Although it is described that the overlay system 202 includes a single executable graph-based model (e.g., the executable graph-based model 100), the scope of the present disclosure is not limited to it. In other embodiments, the overlay system 202 may include more than one executable graph-based model, without deviating from the scope of the present disclosure. In such a scenario, each executable graph-based model is implemented and managed in a manner that is similar to the executable graph-based model 100.

Having described the overlay system 202 for executing and managing executable graph-based models, the description will now turn to the elements of an executable graph-based model; specifically, the concept of a node. Unlike conventional graph-based systems, all elements (e.g., data, overlays, etc.) within the executable graph-based model (e.g., the executable graph-based model 100) are implemented as nodes. As will become clear, this allows executable graph-based models to be flexible, extensible, and highly configurable.

Figure 3A:
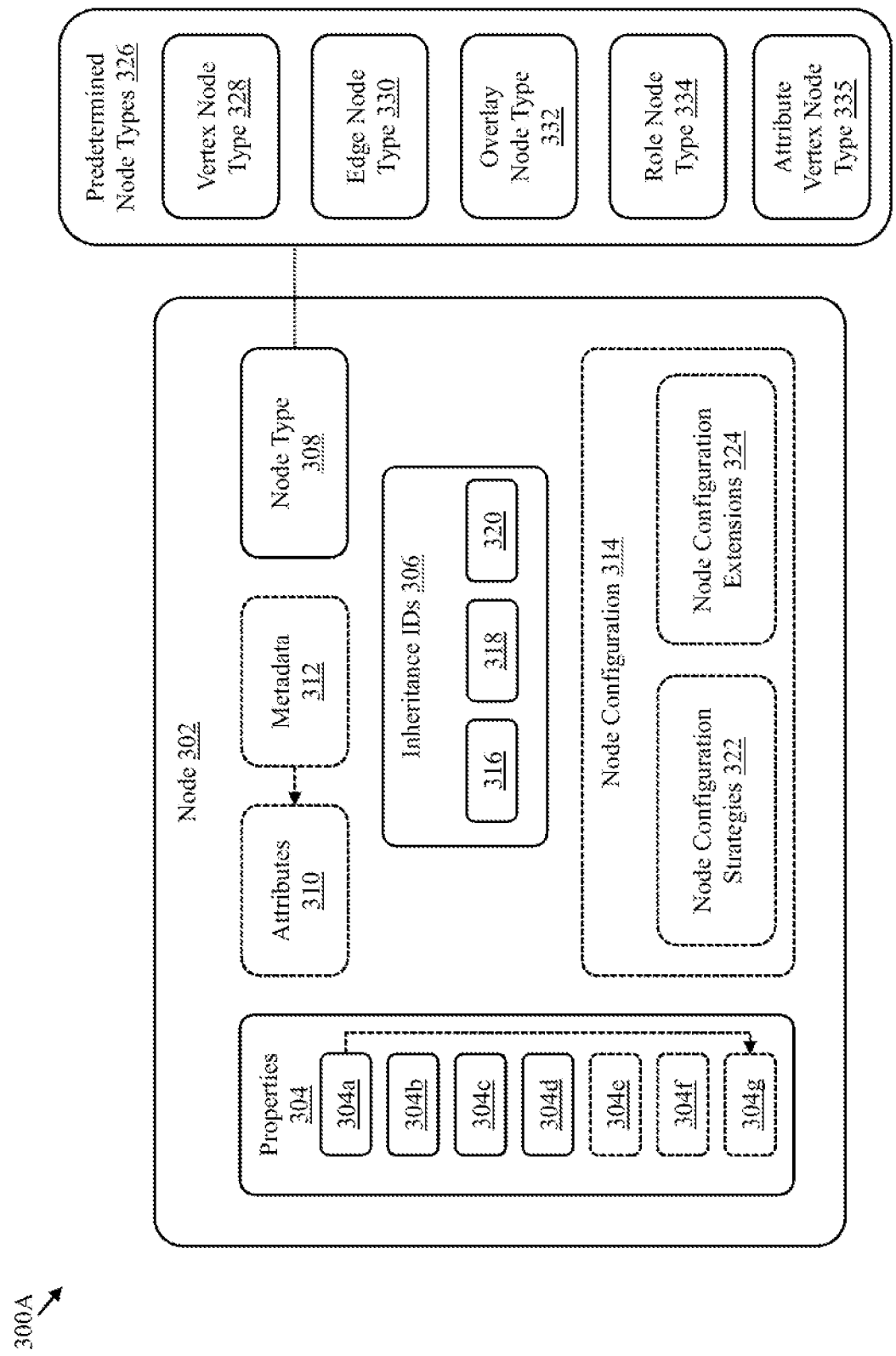
FIG. 3A is a block diagram that illustrates a generic structure of a node within the executable graph-based model, in accordance with an embodiment of the present disclosure.

FIG. 3A is a block diagram 300A that illustrates a generic structure of a node 302 within the executable graph-based model 100, in accordance with an embodiment of the present disclosure. Referring to FIG. 3A, the node 302 corresponds to the core structure of the executable graph-based model 100 and forms the foundational building block for all data and processing logic within the executable graph-based model 100. The node 302 includes properties 304, inheritance IDs 306, and a node type 308. The node 302 optionally includes one or more attributes 310, metadata 312 associated with the attributes 310, and a node configuration 314.

The properties 304 of the node 302 include a unique ID 304a, a version ID 304b, a namespace 304c, and a name 304d. The properties 304 optionally include one or more icons 304e, one or more labels 304f, and one or more alternative IDs 304g. The inheritance IDs 306 of the node 302 include an abstract flag 316, a leaf flag 318, and a root flag 320. The node configuration 314 optionally includes one or more node configuration strategies 322 and one or more node configuration extensions 324.

The unique ID 304a is unique for each node within the executable graph-based model 100. The unique ID 304a is used to register, manage, and reference the node 302 within the system (e.g., the overlay system 202). In some embodiments, the one or more alternative IDs 304g are associated with the unique ID 304a to help manage communications and connections with external systems (e.g., during configuration, sending stimuli, or receiving outcomes). The version ID 304b of the node 302 is incremented when the node 302 undergoes transactional change. This allows the historical changes between versions of the node 302 to be tracked by modules or overlays within the overlay system 202. The namespace 304c of the node 302, along with the name 304d of the node 302, is used to help organize nodes within the executable graph-based model 100. That is, the node 302 is assigned a unique name 304d within the namespace 304c such that the name 304d of the node 302 need not be unique within the entire executable graph-based model 100, only within the context of the namespace 304c to which the node 302 is assigned. The node 302 optionally includes one or more icons 304e which are used to provide a visual representation of the node 302 when visualized via a user interface. The one or more icons 304e can include icons at different resolutions and display contexts such that the visualization of the node 302 is adapted to different display settings and contexts. The node 302 also optionally includes one or more labels 304f which are used to override the name 304d when the node 302 is rendered or visualized.

The node 302 supports the concept of inheritance of data and processing logic associated with any other node of the executable graph-based model 100 that is inherited by the node 302. This allows the behavior and functionality of the node 302 to be extended or derived from the inherited node of the executable graph-based model 100. The inheritance IDs 306 of the node 302 indicate the inheritance-based information, which may apply to the node 302. The inheritance IDs 306 comprise a set of Boolean flags which identify the inheritance structure of the node 302. The abstract flag 316 allows the node 302 to support the construct of abstraction. When the abstract flag 316 takes a value 'true', the node 302 is flagged as abstract that is to say that it cannot be instantiated or created within an executable graph-based model (e.g., the executable graph-based model 100). Thus, in an instance when the node 302 has the abstract flag 316 set to 'true', the node 302 may only form the foundation of other nodes that inherit therefrom. By default, the abstract flag 316 of the node 302 is set to 'false'. The leaf flag 318 is used to indicate whether any other node may inherit from the node 302. If the leaf flag 318 is set to 'true', then no other node may inherit from the node 302 (but unlike an abstract node, a node with the leaf flag 318 set may be instantiated and created within the executable graph-based model 100). The root flag 320 is used to indicate whether the node 302 inherits from any other node. If the root flag 320 is set to 'true', the node 302 does not inherit from any other node. The node 302 is flagged as leaf (e.g., the leaf flag 318 is set to 'true') and/or root (e.g., the root flag 320 is set to 'true'), or neither (e.g., both the leaf flag 318 and the root flag 320 are set to 'false'). It will be apparent to a person skilled in the art that a node cannot be flagged as both abstract and leaf (e.g., the abstract flag 316 cannot be set to 'true' whilst the leaf flag 318 is set to 'true').

As stated above, all elements of the executable graph-based model 100 are defined as nodes. This functionality is in part realized due to the use of a node type. The node type 308 of the node 302 is used to extend the functionality of the node 302. All nodes within the executable graph-based model 100 comprise a node type that defines additional data structures and implements additional executable functionality. A node type thus includes data structures and functionality that are common across all nodes that share that node type. The composition of a node with a node type therefore improves extensibility by allowing the generation of specialized node functionalities for specific application areas. Such extensibility is not present in prior art graph-based models. As illustrated in FIG. 3A, the node 302 and the node type 308 are one logical unit that is not separated in the context of an executing system at run-time (e.g., in the context of execution of an executable graph-based model).

FIG. 3A further shows the plurality of predetermined node types 326 which provides a non-exhaustive list of node types for the node type 308 associated with the node 302. The plurality of predetermined node types 326 includes a vertex node type 328 and an edge node type 330. The vertex node type 328 (also referred to as a data node type or a value node type) includes common data structures and functionality related to the 'things' modeled in the graph (e.g., the data). The edge node type 330 includes common data structures and functionality related to joining two or more nodes. A node having the edge node type 330 may connect two or more nodes and thus the edge node type 330 constructs associations and connections between nodes (for example, objects or 'things') within the executable graph-based model 100. The edge node type 330 is not restricted to the number of nodes that can be associated or connected by a node having the edge node type 330. The data structures and functionality of the edge node type 330 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween.

The plurality of predetermined node types 326 further includes an overlay node type 332, a role node type 334, and an attribute vertex node type 335. As will be described in more detail below, a node with the overlay node type 332 is used to extend the functionality of a node, such as the node 302, to incorporate processing logic. Unlike non-overlay nodes, an overlay node (e.g., a node having the overlay node type 332) includes processing logic which determines the functionality of the overlay node. The processing logic of an overlay node includes a block of executable code, or instructions, which carries out one or more operations associated with the communication of data within the executable graph-based model 100. The block of executable code is pre-compiled code, code that requires interpretation at run-time, or a combination of both. Different overlay nodes provide different processing logic to realize different functionality. For example, a location overlay node includes a storage location at which an associated node is to be stored and processing logic for facilitating such storage of the associated node, a storage strategy overlay node includes a storage strategy using which an associated node is to be stored and processing logic for facilitating such storage of the associated node, and a security overlay node includes a security technique using which an associated node is to be protected/secured and processing logic for facilitating such security/protection of the associated node.

The role node type 334 defines a connective relationship between two nodes, for example, an edge node and a first vertex node. A node with the role node type 334 defines a relationship without expressly defining the first vertex node to which the edge node connects. A number of roles (and thus a number of connections) that an edge node type can have is not limited. A node with the attribute vertex node type 335 refers to a node that stores an attribute value for a corresponding attribute of a node that is associated therewith by way of an attribute connection. The attribute connection may be an edge node or an attribute path. A plurality of attribute vertex nodes associated with a node store a composition of the associated node. A node with the attribute vertex node type 335 may be extended by way of one or more overlay nodes (such as a location overlay node, a storage strategy overlay node, and a security overlay node). Notably, based on the association with the overlay nodes, functionalities (a storage location, a storage strategy, and a security technique) of such overlay nodes are applied to the node with the attribute vertex node type 335.

A composition of a node (for example, a node with the vertex node type 328, another node with the edge node type 330, or the like) corresponds to a plurality of attribute values for a plurality of attributes associated therewith. The plurality of attribute values, collectively, form data and transactional information associated with the node. In an example, a first plurality of attribute values for the plurality of attributes of a node with the vertex node type 328 may represent data stored at the node.

The one or more attributes 310 correspond to the data associated with the node 302 (e.g., the data represented by the node 302 within the executable graph-based model 100 as handled by the data management module 236). Notably, a node in the executable graph-based model 100 that is not associated with data may not have any attributes. The one or more attributes 310 represent a complex data type. Each attribute of the one or more attributes 310 is composed of an attribute behavior. Attribute behavior may be one of a standard attribute behavior, a reference attribute behavior, a derived attribute behavior, and a complex attribute behavior. The attribute behavior of each attribute defines the behavior of the corresponding attribute. The attribute behavior of each attribute may be configured by associated attribute configurations. The attribute configurations are examples of attribute configuration extensions which are node configuration extensions (e.g., they are part of the one or more node configuration extensions 324 of the node 302 shown in FIG. 3A). The standard attribute behavior may be configured by a standard attribute configuration, the reference attribute behavior may be configured by a reference attribute configuration, the derived attribute behavior is configured by a derived attribute configuration, and the complex attribute behavior is configured by a complex attribute configuration.

The attribute behavior defines the behavior of the corresponding attribute. The standard attribute behavior is a behavior that allows read-write access to the data of the corresponding attribute. The reference attribute behavior is a behavior that allows read-write access to the data of the corresponding attribute but restricts possible values of the data to values defined by a reference data set. The reference attribute configuration associated with the reference attribute behavior includes appropriate information to obtain a reference data set of possible values. The derived attribute behavior is a behavior that allows read-only access to data of the corresponding attribute. Also, data of the corresponding attribute is derived from other data or information, within the executable graph-based model 100 in which an executable node of the corresponding attribute is used. The data is derived from one or more other attributes associated with the node or is derived from more complex expressions depending on the application area. In one embodiment, the derived attribute configuration (which is used to configure the derived attribute behavior) includes mathematical and/or other forms of expressions (e.g., regular expressions, templates, or the like) that are used to derive the data (value) of the corresponding attribute. The complex attribute behavior is a behavior that allows the corresponding attribute to act as either a standard attribute behavior if the data of the corresponding attribute is directly set, or a derived attribute behavior if the data of the corresponding attribute is not directly set.

As shown, the node 302 further includes the metadata 312 (e.g., data stored as a name, a confidentiality indicator for indicating data as sensitive and/or confidential, an average processing time required for processing data, or the like) which is associated with either the node 302 or an attribute (for example, the one or more attributes 310) of the node 302. An attribute within the one or more attributes 310 may either have an independent state or a shared state. That is to say, an attribute may be a value-shared attribute or a non-value-shared attribute. An independent attribute has data that is not shared with any other node within the executable graph-based model 100. Conversely, a shared attribute has data that is shared with one or more other nodes within the executable graph-based model 100. For example, if two nodes within the executable graph-based model 100 comprise a shared-data attribute with a value state shared by both nodes, then updating the data (e.g., the value) of this shared attribute will be reflected across both nodes.

The node configuration 314 provides a high degree of configurations for the different elements of the node 302. The node configuration 314 optionally includes the one or more node configuration strategies 322 and/or the one or more node configuration extensions 324 which are complex data types. An example of a concrete node configuration strategy is an ID strategy, associated with the configuration of the unique ID 304a of the node 302, which creates message source IDs. A further example of a concrete node configuration strategy is a versioning strategy, associated with the configuration of the version ID 304b of the node 302, which supports major and minor versioning (depending on the type of transactional change incurred by the node 302). The versioning strategy may be adapted to a native filing system of a user device hosting the overlay system 202 or a third-party data storage (for example, Snowflake®, or the like) associated with the overlay system 202.

Figure 3B:
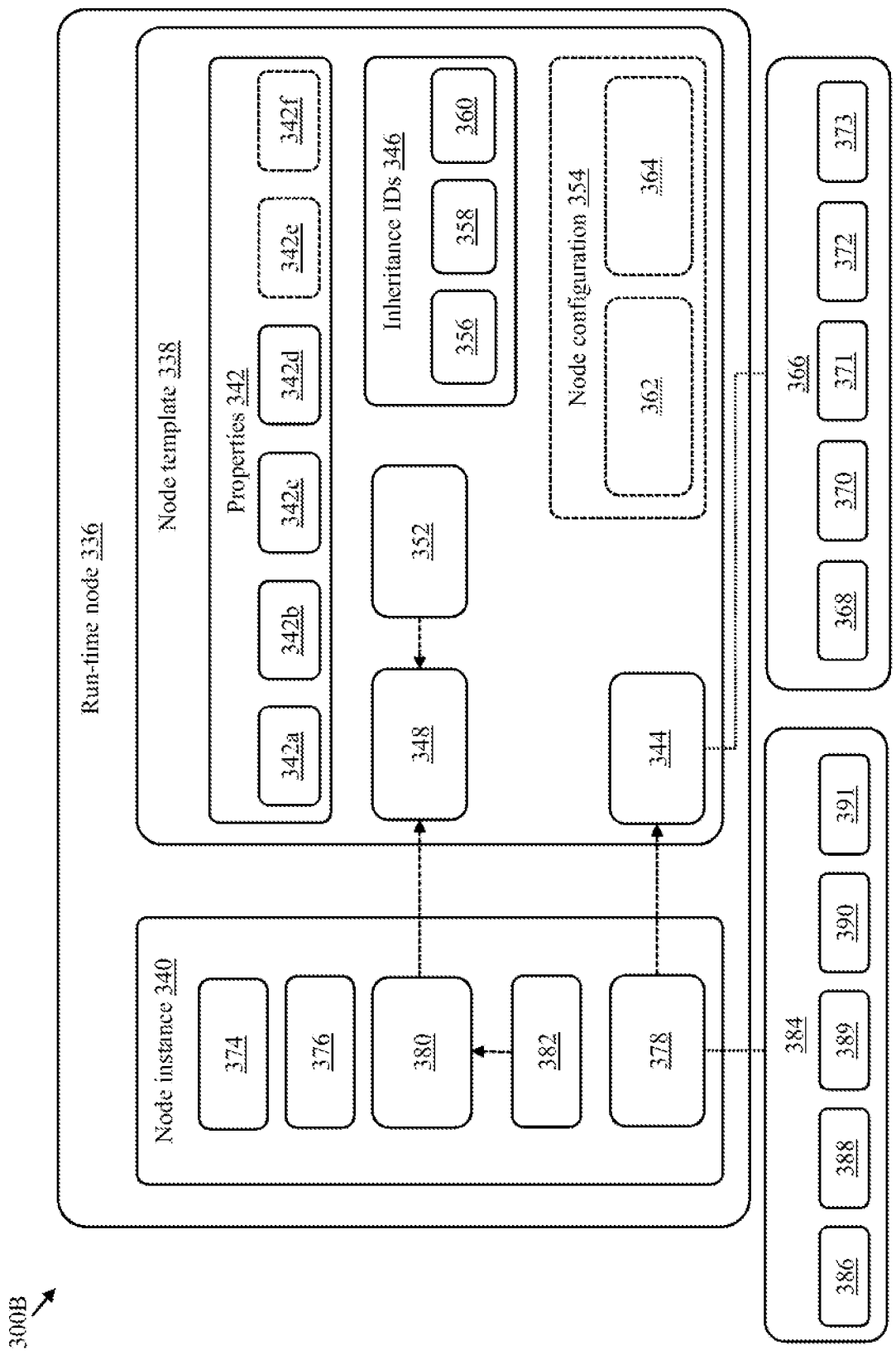
FIG. 3B is a block diagram that illustrates a generic structure of a run-time node within the executable graph-based model, in accordance with an embodiment of the present disclosure.

FIG. 3B is a block diagram 300B that illustrates a generic structure of a run-time node 336 within the executable graph-based model 100, in accordance with an embodiment of the present disclosure. Referring to FIG. 3B, the run-time node 336 corresponds to the core structure of the executable graph-based model 100 and forms the foundational building block for all data and processing logic within the executable graph-based model 100. The run-time node 336 is shown to include a node template 338 and a node instance 340. The node instance 340 is generated according to the node template 338. The node template 338 forms a data structure for the node instance 340. The run-time node 336 is shown in FIG. 3B is a compositional structure that is generated and executed, at run-time as part of the executable graph-based model 100. In other words, the node template 338 is defined as 'offline' and the node instance 340 and the run-time node 336 are run-time structures that are dynamically generated during execution of the executable graph-based model 100.

The node template 338 comprises a predetermined node structure. Further, the node template 338 defines one or more rules that govern the generation of the node instance 340. The node instance 340 is an implementation of the node template 338. In other words, the node instance 340 is generated based on the predetermined node structure and the one or more rules of the node template 338. The node template 338 cannot be modified during the execution but may be modified during offline mode or at rest. During execution, only the node instance 340 of the run-time node 336 may be modified.

The node template 338 includes properties 342, a node type template 344, inheritance IDs 346, and a set of attribute templates 348. The node template 338 may optionally include metadata 352 and a node configuration 354. The properties 342 of the node template 338 include a unique identifier (ID) 342a, a version ID 342b, a namespace 342c, a name 342d, and optionally include one or more icons 342e and a set of labels 342f. The inheritance IDs 346 comprise an abstract flag 356, a leaf flag 358, and a root flag 360. The node configuration 354 optionally comprises one or more node configuration strategies 362 and/or one or more node configuration extensions 364. FIG. 3B further shows a plurality of predetermined node type templates 366 of the node type template 344. The plurality of predetermined node type templates 366 includes a vertex node type template 368, an edge node type template 370, a role node type template 371, an overlay node type template 372, and an attribute vertex node type template 373. Further, the node instance 340 includes a unique ID 374, a version ID 376, a node type instance 378, and a set of attribute instances 380. The node instance 340 may optionally include metadata 382. FIG. 3B further shows a plurality of predetermined node type instances 384 of the node type instance 378. The plurality of predetermined node type instances 384 include a vertex node type instance 386, an edge node type instance 388, a role node type instance 389, an overlay node type instance 390, and an attribute vertex node type instance 391.

The unique ID 342a is unique for each node template within the executable graph-based model 100. Similarly, the unique ID 374 is unique for each node instance within the executable graph-based model 100. The unique ID 342a and the unique ID 374 are used to register, manage, and reference the node template 338 and the node instance 340, respectively, within the overlay system 202. The version ID 342b of the node template 338 is incremented when the node template 338 undergoes transactional change. Similarly, the version ID 376 of the node instance 340 is incremented when the node instance 340 undergoes transactional change. The namespace 342c of the node template 338, along with the name 342d of the node template 338, is used to help organize node templates within the executable graph-based model 100. That is, the node template 338 is assigned a unique name 342d within the namespace 342c such that the name 342d of the node template 338 need not be unique within the entire executable graph-based model 100, only within the context of the namespace 342c to which the node template 338 is assigned. The node template 338 optionally comprises one or more icons 342e which are used to provide a visual representation of the node template 338. The one or more icons 342e can include icons at different resolutions and display contexts such that the visualization of the node is adapted to different display contexts and settings. The node template 338 also optionally comprises the set of labels 342f which are used to override the name 342d when the node template 338 is rendered or visualized.

The node template 338 supports the software development feature of multiple inheritance by maintaining references (not shown) to zero or more other node templates, which then act as the base of the node template 338. This allows the behavior and functionality of a node template to be extended or derived from one or more other node templates within an executable graph-based model (such as the executable graph-based model 100). The node instance 340 likewise supports multiple inheritance because it is an instance representation of the node template 338. The multiple inheritance structure of the node instance 340 is, however, limited to the corresponding instance realization of the multiple inheritance structure defined by the node template 338, i.e., one node instance 340 is created and managed for each node template 338 defined in the inheritance hierarchy for a node instance of a node template.

The inheritance IDs 346 of the node template 338 provide an indication of the inheritance-based information, which is applicable, or can be applicable, to the node template 338. The inheritance IDs 346 have a description that is similar to the inheritance IDs 306. The abstract flag 356 has a description that is similar to the abstract flag 316, the leaf flag 358 has a description that is similar to the leaf flag 318, and the root flag 360 has a description that is similar to the root flag 320.

All elements within the executable graph-based model 100 are defined as node templates or node instances. The functionality of the node template 338 and the node instance 340 are realized due to the use of the node type template 344 and the node type instance 378. The node type template 344 of the node template 338 is used to extend the functionality of the node template 338 by defining the standard set of capabilities, including data and associated behavior.

The vertex node type template 368 (also referred to as a data node type) includes a template of common data structures and functionality related to the 'things' modeled in the graph (e.g., the data). The vertex node type instance 386 includes the common data structures and functionality related to the 'things' modeled in the graph based on the vertex node type template 368. The edge node type template 370 includes a template of common data structures and functionality related to joining two or more nodes. A node instance having the edge node type instance 388 may connect two or more nodes and thus the edge node type instance 388 constructs associations and connections between nodes (for example objects or 'things') within the executable graph-based model 100. The edge node type instance 388 is not restricted to the number of nodes that can be associated or connected by a node having the edge node type instance 388. The data structures and functionality of the edge node type instance 388 thus define a hyper-edge which allows two or more nodes to be connected through a defined set of roles. A role defines a connective relationship between the two or more nodes, and hence, allows an edge node to connect two or more nodes such that the two or more nodes may have more than one relationship therebetween. The role node type template 371 is used to define structure, conditions, or the like for establishing a connective relationship between two node instances or node templates. Similarly, the role node type instance 389 is used to define a connective relationship between two node instances. The overlay node type template 372 is used to extend the functionality of a node template (e.g., the node template 338) to incorporate processing logic. Similarly, the overlay node type instance 390 is used to extend the functionality of a node instance (e.g., the node instance 340) to incorporate processing logic.

The attribute vertex node type template 373 is used to store a data structure of an attribute associated with a node template (e.g., the node template 338). Similarly, the attribute vertex node type instance 391 is used to store an attribute value of an attribute associated with a node instance (e.g., the node instance 340). Notably, a node template with the attribute vertex node type template 373 may be extended by way of one or more overlay nodes (such as a location overlay node, a storage strategy overlay node, and a security overlay node). Notably, based on the association with the overlay nodes, functionalities (a storage location, a storage strategy, and a security technique) of such overlay nodes are applied to the node template with the attribute vertex node type template 373. Similarly, a node instance with the attribute vertex node type instance 391 may be extended by way of one or more overlay nodes (such as a location overlay node, a storage strategy overlay node, and a security overlay node). Based on the association with the overlay nodes, functionalities (a storage location, a storage strategy, and a security technique) of such overlay nodes are applied to the node instance with the attribute vertex node type instance 391.

The set of attribute templates 348 corresponds to the data defined by the node template 338. For example, the set of attribute templates 348 may define the names and value types (e.g., integer, string, float, etc.) of one or more attributes but not the values of these attributes. The values of the set of attribute templates 348 may be defined by the set of attribute instances 380 of the node instance 340 through one or more values or instance values. For example, the node template 338 may define a string attribute 'surname' and the corresponding node instance 340 may assign the instance value 'Bell-Richards' to this string attribute. Each attribute instance of the set of attribute instances 380 is associated with an attribute template of the set of attribute templates 348. The node template 338 may define one or more default values for the set of attribute templates 348. The default values correspond to the values that the attributes take if no value is assigned. The metadata 352 (e.g., data stored as a name, a value type, and a value triplet) is associated with either the node template 338 or one or more of the set of attribute templates 348 of the node template 338. Similarly, the node instance 340 also optionally comprises the metadata 352 (e.g., data stored as a name, a value type, and a value triplet) which is associated with either the node instance 340 or one or more of the set of attribute instances 380.

The node configuration 354 provides a high degree of configurability for the different elements of a node template and/or a node instance. An example of a concrete node configuration strategy is an ID strategy, associated with the configuration of the unique ID 342*a* of the node template 338. A further example of a concrete node configuration strategy is a versioning strategy, associated with the configuration of the version ID 342*b* of the node template 338 which supports major and minor versioning (depending on the type of transactional change incurred). The versioning strategy may be adapted to a native filing system of a user device hosting the overlay system 202 or a third-party data storage (for example, Snowflake®, or the like) associated with the overlay system 202.

It will be apparent to a person skilled in the art that each node of the executable graph-based model 100 has a generic structure that is similar to the node 302 of FIG. 3A or the run-time node 336 of FIG. 3B.

Figure 4:
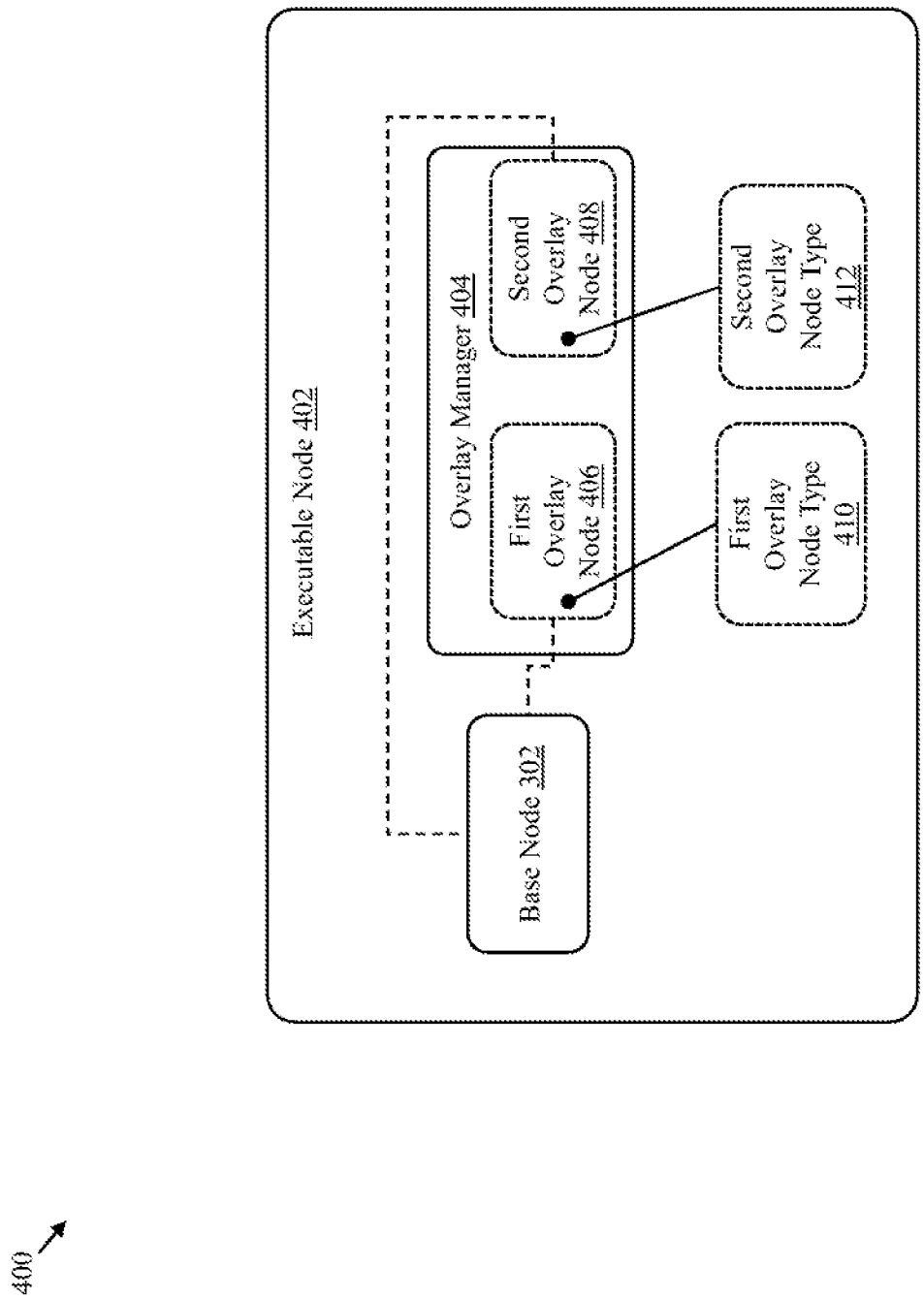
FIG. 4 is a block diagram that illustrates an executable node within the executable graph-based model, in accordance with an embodiment of the present disclosure.

FIG. 4 is a block diagram 400 that illustrates an executable node 402 within the executable graph-based model 100, in accordance with an embodiment of the present disclosure. Referring to FIG. 4, the executable node 402 is shown to include a base node (e.g., the node 302 or the run time node 336) and an overlay manager 404. For the sake of ongoing discussion, the base node corresponds to the node 302, and is hereinafter referred to as the "base node 302". However, the functionality of the executable node 402 for the base node corresponding to the run time node 336 may be similar to that for the base node corresponding to the run time node 336.

The base node 302 may store the data record associated with the dataset. A plurality of data attributes associated with the data record are stored at the base node 302 as a plurality of attribute values of a plurality of attributes of the base node 302. The splintering of the data record is performed at (i) the node level by separating a data structure and data of the data record stored at the base node 302 or (ii) at the attribute level by separating each attribute from other attributes. The splintering of the data record results in the creation of a plurality of splinters.

The overlay manager 404 includes a first overlay node 406 and a second overlay node 408. The executable node 402 provides processing functionality (e.g., processing logic) to the base node 302 via one or more associated overlay nodes (for example, the first and second overlay nodes 406 and 408). Beneficially, the data and processing capability of the base node 302 may be dynamically and significantly extended using the concept of an executable node (for example, the executable node 402). As shown, the first overlay node 406 has a first overlay node type 410, and the second overlay node 408 has a second overlay node type 412. Examples of overlay node type includes, but are not limited to, a location overlay node type, a storage strategy overlay node type, and a security overlay node type.

A node with the location overlay node type is a location overlay node that is indicative of an auxiliary storage element of the plurality of auxiliary storage elements of the overlay system 202. The location overlay node also includes processing logic to store an associated splinter of a plurality of splinters of an associated node at the auxiliary storage element indicated thereby.

A node with the storage strategy overlay node type is a storage strategy overlay node that is indicative of a storage strategy (for example, RDBMS, Document DB, MySQL, PostgreSQL, SQLite, Oracle DB, or the like) using which an associated splinter of a corresponding node is to be stored. The storage strategy overlay node also includes processing logic to store the associated splinter using the storage strategy indicated thereby.

A node with the security overlay node type is a security overlay node that is indicative of a security technique (such as an encryption technique, an obfuscation technique, or the like) using which an associated splinter of a corresponding node is to be secured. The security overlay node also includes processing logic to secure a splinter of a corresponding node. Examples of the security technique include a symmetric encryption algorithm, an asymmetric encryption algorithm, security protocols, a combination of these, or any other encryption technique.

Each of the location overlay node, the storage strategy overlay node, and the security overlay node includes a corresponding overlay configuration that indicates the splinter of the plurality of splinters of the corresponding node on which corresponding functionality (e.g., storage location, storage strategy, security technique, or the like) is to be applied.

Although, the executable node 402 is shown to include the first and second overlay nodes 406 and 408, in other embodiments, the executable node 402 may include any number of overlay nodes, without deviating from the scope of the present disclosure.

The executable node 402 extends the base node 302 (or is a subtype of the base node 302) such that all the functionality and properties of the base node 302 are accessible to the executable node 402. The executable node 402 also dynamically extends the functionality of the base node 302 by associating the overlay nodes maintained by the overlay manager 404 with the base node 302. The executable node 402 may thus be considered a combination of the base node 302 and the first and second overlay nodes 406 and 408. The executable node 402 may be alternatively referred to as a node with overlay(s). Therefore, the executable node 402 acts as a decorator of the base node 302 adding the functionality of the overlay manager 404 to the base node 302.

It will be apparent to a person skilled in the art that the base node 302 refers to any suitable node within the executable graph-based model 100. As such, the base node 302 may be a node having a node type such as a vertex node type, an edge node type, an overlay node type, an attribute vertex node type, or the like. Alternatively, the base node 302 may be an executable node such that the functionality of the (executable) base node 302 is dynamically extended. In this way, complex and powerful processing functionality can be dynamically generated by associating and extending overlay nodes.

The overlay manager 404 registers and maintains one or more overlay nodes (such as the first overlay node 406 and the second overlay node 408) associated with the base node 302. The assignment of the first and second overlay nodes 406 and 408 to the base node 302 (via the overlay manager 404) endows the base node 302 with processing logic and executable functionality defined within the first and second overlay nodes 406 and 408.

Extending the functionality of a base node through one or more overlay nodes is at the heart of the overlay system 202. As illustrated in FIG. 2, the data (e.g., a vertex node as represented by the base node 302 in FIG. 4) and the functionality that acts upon that data (e.g., an overlay node) can be separated and independently maintained offline, but at run-time, an association between the data node and the overlay node is determined and an executable node is generated (e.g., the executable node 402 shown in FIG. 4).

It will be apparent to a person skilled in the art that functionalities of the first and second overlay nodes 406 and 408 may be performed by a single overlay node that includes processing logic associated with both of the first and second overlay nodes 406 and 408.

It will be apparent to a person skilled in the art that the list of overlay types is not exhaustive and the number of different overlay types that can be realized is not limited. Because an overlay node is itself a node, all functionality of a node described in relation to the base node 302 is thus applicable to an overlay node. For example, an overlay node includes a unique ID, a name, etc., can have attributes (e.g., an overlay node can have its data defined), supports multiple inheritance, and can be configured via node configurations. Furthermore, because an overlay node is a node, the overlay node can have one or more overlay nodes associated therewith (e.g., the overlay node may be an overlay node with an overlay). Moreover, the processing functionality of an overlay node extends to the node type of the node to which the overlay node is applied.

An overlay node, such as the first overlay node 406 or the second overlay node 408, is not bound to a single executable node or a single executable graph-based model (unlike nodes that have non-overlay node types). This allows overlay nodes to be centrally managed and reused across multiple instances of executable graph-based models. Notably, a node (for example, a base node, an executable node, and an overlay node) may be extended by way of overlays. Further, each overlay node may be extended to have one or more overlays. Such overlays may be termed chaining overlays. Also, a single overlay node may be associated with multiple executable nodes. Thus, the overlay node and functionality thereof may be shared among the multiple executable nodes.

The overlay manager 404 of the executable node 402 is responsible for executing all overlays registered therewith. The overlay manager 404 also coordinates the execution of all associated overlay nodes. As shown in FIG. 4, the executable node 402 associates the base node 302 with two overlay nodes that is the first overlay node 406 and the second overlay node 408. Thus, the overlay manager 404 employs a strategy to manage the potentially cascading execution flow. Example strategies to manage the cascading execution of overlays include the visitor pattern and the pipe and filter pattern. Further examples include strategies that apply either breadth-first or depth-first processing patterns, a prioritization strategy, or a combination thereof. All execution strategies are defined and registered with the overlay manager 404 and are associated with an overlay via a node configuration extension for the overlay.

The data and the processing logic associated with one or more overlays of an executable node (for example, the executable node 402) are persistent. The persistent nature of the data and the processing logic are described in detail in conjunction with FIG. 5.

Figure 5:
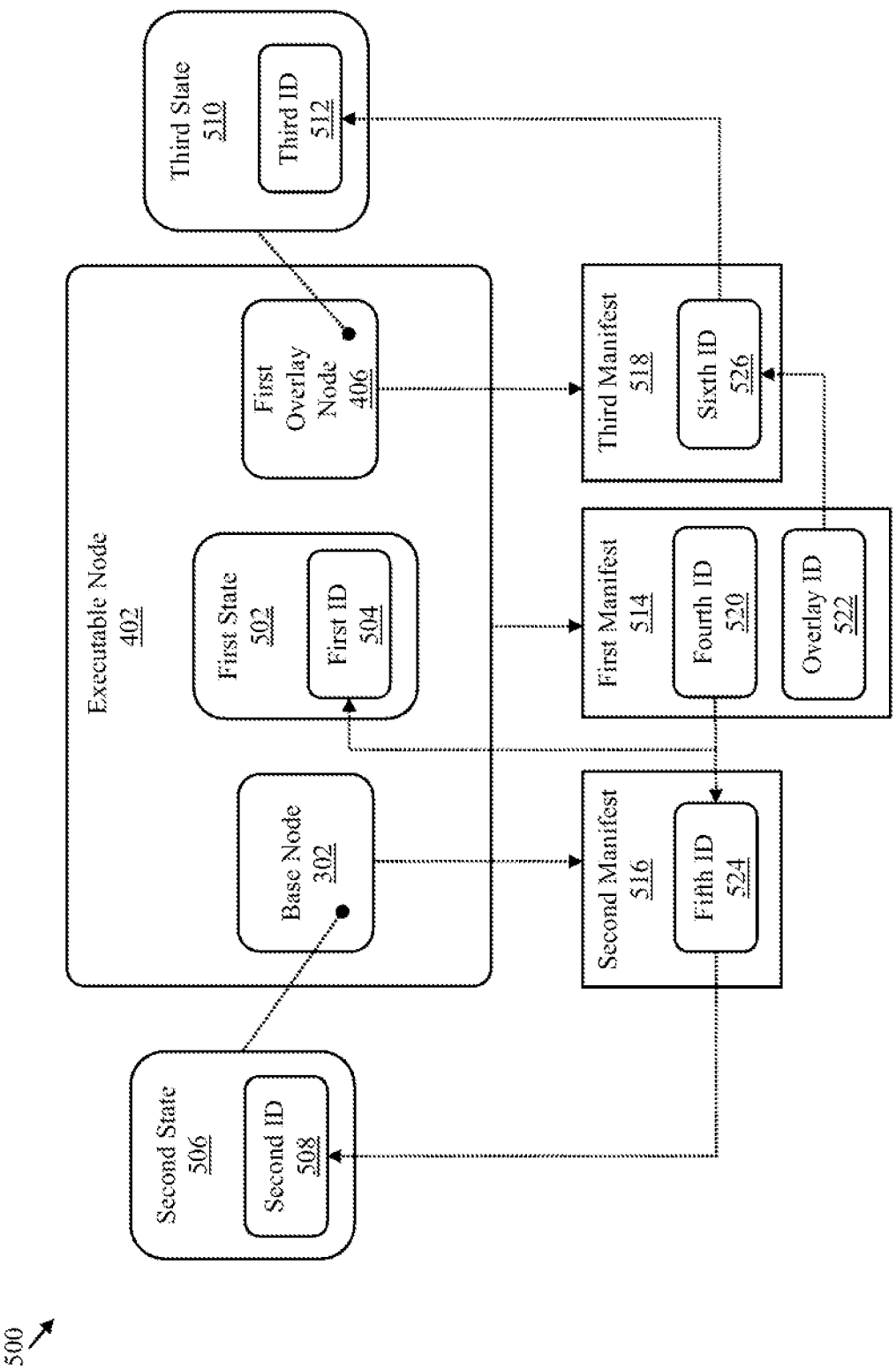
FIG. 5 is a block diagram that illustrates a composition of the executable node that enables persistent storage of data and processing logic associated therewith, in accordance with an embodiment of the present disclosure.

FIG. 5 is a block diagram 500 that illustrates a composition of the executable node 402 that enables persistent storage of data and the processing logic associated therewith, in accordance with an embodiment of the present disclosure.

As described in conjunction with FIG. 4, the executable node 402 includes the base node 302 and one or more overlay nodes (e.g., the first and second overlay nodes 406 and 408). For the brevity of the ongoing description, the persistent storage is explained for the executable node 402 including only the first overlay node 406. One or more operations performed for ensuring the persistence of the first overlay node 406 may be performed for the second overlay node 408 as well.

Referring to FIG. 5, the executable node 402 includes the base node 302 and the first overlay node 406. The executable node 402 has a corresponding first state 502 having a first ID 504. The base node 302 has a second state 506 having a second ID 508, and the first overlay node 406 has a third state 510 having a third ID 512. A manifest (for example, first through third manifests 514-518) is generated for each of the base node 302, the executable node 402, and the first overlay node 406. In an embodiment, the manifests may be generated by the storage management module 220. The first manifest 514 is associated with the executable node 402 and has a fourth ID 520 and an overlay ID 522. The second manifest 516 is associated with the base node 302 and has a fifth ID 524. The third manifest 518 is associated with the first overlay node 406 and has a sixth ID 526. Further, the manifests are stored at respective storage locations that may be centralized or distributed storage locations associated with the overlay system 202. The manifests may be stored by the storage management module 220.

The first state 502 of the executable node 402 includes data required to reconstruct the executable node 402 (e.g., attributes, properties, etc.). The first state 502 of the executable node 402 is persistently stored along with the first ID 504. The first manifest 514 is generated for the executable node 402 and has (i) the fourth ID 520 (which is the same as the first ID 504), (ii) the storage location of the first state 502 of the executable node 402, and (iii) the overlay ID 522 (which is the same as the sixth ID 526). Notably, the fourth ID 520 is the same as the first ID 504 and the fifth ID 524, hence, the first manifest 514 includes the ID of the state of the base node 302 and the executable node 402. Further, the overlay ID 522 is the same as the sixth ID 526 of the state of the first overlay node 406. Therefore, the first manifest 514 may be used to identify and retrieve the states of the base node 302, the executable node 402, and the first overlay node 406. Subsequently, the retrieved states may be used to reconstruct the executable node 402 and the first overlay node 406. In an instance, the executable node 402 may be further extended to include additional overlay nodes. In such an instance, the first manifest 514 may include state IDs of the additional overlay nodes as well. A first manifest state (not shown) is then generated for the first manifest 514 and persistently stored along with the fourth ID 520.

The second state 506 of the base node 302 includes data required to reconstruct the base node 302 (e.g., attributes, properties, etc.) and is persistently stored along with the second ID 508. The second manifest 516 is generated for the base node 302 and has (i) the fifth ID 524 and (ii) the storage location of the second state 506 of the base node 302. The second ID 508 of the second state 506 and the fifth ID 524 of the second manifest 516 are the same as the first ID 504 of the first state 502 of the executable node 402 (which is also the same as the fourth ID 520 of the first manifest 514 of the executable node 402). As mentioned above, along with the first state 502, the first manifest 514 may also be used to identify and retrieve the second manifest 516 which in turn may be used to identify the second state 506 of the base node 302. A second manifest state (not shown) is then generated for the second manifest 516 and persistently stored along with the fifth ID 524. Thus, the states, manifests, and manifest states for the executable node 402 and the base node 302 include the same, shared, ID. A shared ID can be used in this instance because the states, manifests, and manifest states are stored separately. The separate storage of the states, manifests, and manifest states exhibit a distributed architecture of the overlay system 202.

The third state 510 of the first overlay node 406 includes data required to reconstruct the first overlay node 406 (e.g., attributes, properties, processing logic, etc.) and is persistently stored along with the third ID 512. The third manifest 518 is generated for the first overlay node 406 and includes the sixth ID 526, which is the same as the third ID 512. Therefore, the first manifest 514 may be further used to identify and retrieve the third manifest 518 which in turn may be used to identify and retrieve the third state 510 of the first overlay node 406. A third manifest state (not shown) is then generated for the third manifest 518 and is persistently stored along with the sixth ID 526.

For the executable node 402, the base node 302 and the first overlay node 406 constitute a plurality of splinters of the executable node 402. The location overlay node, the storage strategy overlay node, and the security overlay node may be associated with the executable node 402 and may be managed by the overlay manager 404 of the executable node 402. Additionally, the location overlay node, the storage strategy overlay node, and the security overlay node may include corresponding overlay configuration that indicates a splinter of the plurality of splinters of the executable node 402 on which corresponding functionality (e.g., storage location, storage strategy, security technique, or the like) is to be applied.

In operation, when the executable node 402 is to be loaded, the transaction module 208, in conjunction with the storage management module 220, may execute one or more operations to retrieve the first manifest state stored at a known storage location. Based on the first manifest state, the storage management module 220 may re-construct the first manifest 514 which includes the fourth ID 520 which is the same as the fifth ID 524 of the second manifest 516. Based on the fifth ID 524, the storage management module 220 may identify the second manifest state and may generate the second manifest 516 based on which the second state 506 is identified. Subsequently, the base node 302 is loaded and the storage management module 220 may determine that the base node is a node with overlay. Based on the fourth ID 520 (that is the same as the first ID 504 of the first state 502 of the executable node 402) of the first manifest 514, the first state 502 is identified and retrieved. Subsequently, the executable node 402 is loaded. Moreover, based on the overlay ID 522 (that is the same as the sixth ID 526 of the third manifest 518) of the first manifest 514, the third manifest state is identified and the third manifest 518 is generated. Subsequently, based on the sixth ID 526 (that is the same as the third ID of the third state) of the third manifest 518, the third state 510 is identified and retrieved. Based on the third state 510, the first overlay node 406 is reconstructed and loaded in the executable graph-based model 100.

In an embodiment, when the base node 302 and the first overlay node 406 constitute the plurality of splinters of the executable node 402, the processing circuitry (such as the controller module 206 and the stimuli management module 212) may receive a stimulus (for example, the stimulus 230) indicative of an instruction to re-form (namely, re-create, reconstruct, or re-instantiate) the executable node 402.

Based on a context of the stimulus, the processing circuitry (such as the context module 210) may determine an ID which is the same as the fifth ID 524. Based on the determined ID, the processing circuitry (such as the memory management module 218 and the storage management module 220) may identify the second manifest 516. Subsequently, the processing circuitry (such as the memory management module 218 and the storage management module 220) may identify the second state 506 that has the second ID 508 that matches the fifth ID 524. Further, the processing circuitry (such as the memory management module 218 and the storage management module 220) may retrieve the second state 506 associated with the second manifest 516 from a corresponding auxiliary storage element. Subsequently, the processing circuitry (such as the memory management module 218 and the storage management module 220) may determine, by checking the manifest storage(s) associated with the overlay system 202, whether there is another manifest (such as the first manifest of the executable node 402) with an ID that matches the second ID 508 and the fifth ID 524. Notably, the first manifest 514 includes storage locations of each overlay node (for example, the first overlay node 406) of the executable node 402. Based on the overlay ID 522 included in the first manifest 514 that matches the sixth ID 526 included in the third manifest 518, the processing circuitry (such as the memory management module 218 and the storage management module 220) may identify and retrieve the third manifest 518 from a manifest storage of a plurality of manifest storages of the overlay system 202. Subsequently, the processing circuitry (such as the memory management module 218 and the storage management module 220) may identify the third state 510 that has the third ID 512 that matches the sixth ID 526. Further, the processing circuitry (such as the memory management module 218 and the storage management module 220) may retrieve the third state 510 associated with the third manifest 518 from a corresponding auxiliary storage element. To determine whether the first overlay node 406 has an overlay node associated therewith, the processing circuitry (such as the memory management module 218 and the storage management module 220) may also perform a check to determine whether any of the plurality of manifest storages of the overlay system 202 includes any other manifest with an ID that matches the sixth ID 526. Since the first overlay node 406 does not have an overlay associated therewith, no other manifest has the ID that matches the sixth ID.

In instances, when a splinter (such as the base node 302 and the first overlay node 406) is associated with a location overlay node, a storage strategy overlay node, and/or a security overlay node, the splinter is retrieved from a corresponding auxiliary storage element in accordance with functionalities of the associated location overlay node, the associated storage strategy overlay node, and/or the associated security overlay node.

Notably, the manifest (the third manifest 518) of the first overlay node 406 includes a reference (such as an identifier that is common to the second manifest 516 and the third manifest 518, a link, a path, a storage location, or the like) to the second manifest 516 of the base node 302. Therefore, the re-formation of the executable node 402 includes re-creation of the first overlay node 406 prior to re-creation of the base node 302. Subsequently, the first overlay node 406 and the base node 302 are organized by associating the base node 302 with the first overlay node 406 to re-form the executable node 402.

In some embodiments, the first overlay node 406 may not be loaded in case it is not required for executing the operation associated with the stimulus 230. The loaded executable node 402 and the first overlay node 406 may be unloaded in case they remain unused for a predefined time period, whereas one or more executable nodes that are used at least once during the predefined time period may remain loaded in the executable graph-based model 100. In some embodiments, the data and processing logic associated with a loaded executable node and/or overlay node may be transferred to a local memory of the overlay system 202 if the data and the processing logic remain unused for a first predefined period of time. Further, the data and the processing logic associated with the executable node/overlay node are transferred to an external storage from the local memory in case the executable node/overlay node remains unused for a second predefined period of time. The second predefined period of time is greater than the first predefined period of time. The term unloading refers to storing a state of a node with a current version of data and processing logic associated therewith at a storage location that is pointed by the corresponding manifest.

An executable graph-based model (for example, the executable graph-based model 100) may be stored (and loaded) using the above-described composition. Beneficially, each component is stored separately thereby allowing a user to maintain and store their data independently of the storage of the structure and functionality of the executable graph-based model 100.

Notably, the management and storage of manifests is managed by the controller module 206, the memory management module 218, the storage management module 220, a combination of these, or any other module of the overlay system 202. Also, all manifest states are stored together at a storage location (such as a manifest storage) that is known to the storage management module 220. Such centralized storage of the manifest states ensures that node states associated therewith are easily accessible.

It will be apparent to a person skilled in the art that although FIG. 5 illustrates only a single overlay node, in other embodiments, the executable node 402 may include additional or different overlay nodes (for example, the second overlay node 408). It will also be apparent to a person skilled in the art that only those overlay nodes that are required for responding to the stimulus 230 may be loaded.

The overlay system 202 described in conjunction with FIGS. 1-5 is used to implement systems and methods for facilitating data splintering in the executable graph-based model 100. As mentioned previously, data splintering refers to a concept of dividing a node into a plurality of splinters, where each splinter forms a unit of the node that is separate from other splinters of the node. Notably, such data splintering may be performed at a node level or an attribute level. In an instance, when the node is splintered at the node level, data structure (node template) and data (node instance) constitute the plurality of splinters of the node. In another instance, when the node is splintered at the attribute level, a plurality of attribute values for a plurality of attributes associated with the node constitute the plurality of splinters.

Figure 6A:
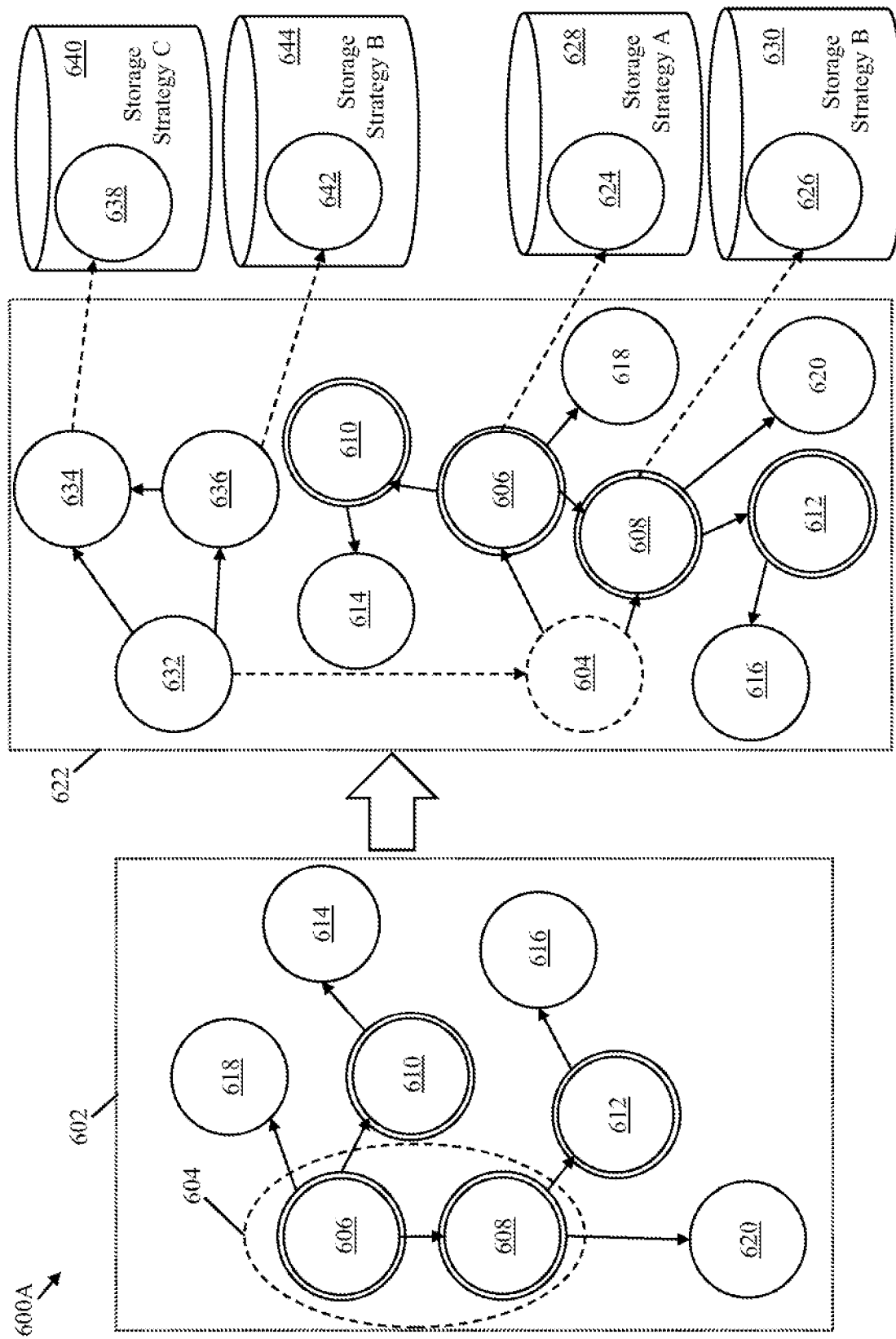
FIG. 6A illustrates a schematic diagram that depicts an example implementation of data splintering at a node level, in accordance with an embodiment of the present disclosure.

FIG. 6A illustrates a schematic diagram 600A that depicts an example implementation of data splintering at the node level, in accordance with an embodiment of the present disclosure. The executable graph-based model 100 includes a plurality of nodes that store sensitive and confidential data and hence, are to be splintered. Throughout the description, each node that is represented in a corresponding figure as an inner circle enclosed within an outer circle is an executable node. The inner circle represents its base node, and the outer circle represents an overlay node associated therewith. Further, coupling between a first node with the inner circle of the executable node represents an association between the executable node and the first node. A coupling between the outer circle of the executable node and a second node indicates that the second node is an overlay of the executable node.

Splintering a node refers to an operation of dividing the node into a plurality of splinters, where each splinter is stored at a different storage location (such as an auxiliary storage element). Therefore, to re-form the node, each of the plurality of splinters is required to be retrieved from a corresponding storage location and organized. Storage and retrieval of each splinter is performed in a manner that is similar to the storage and retrieval of a node described in conjunction with FIG. 5.

As mentioned previously, for storing a node (for example, the node 302), a node state is generated for the node. The node state includes information (for example, attribute values, a label, an icon, a version number, or the like) to re-create the node. The node state gets stored in an auxiliary storage element of the overlay system 202. Subsequently, a manifest for the node state is generated, where the manifest includes a storage location of the node state. Further, a manifest state for the manifest is generated the manifest state includes information to re-create the manifest. The manifest state gets stored in a manifest storage of the overlay system 202. The manifest storage is a storage element of the overlay system 202 that is administered by one or more modules (for example, the memory management module 218 and the storage management module 220). For retrieval of the node, the manifest state is retrieved from the manifest storage and used to re-create the manifest that includes the storage location of the node state. Subsequently, the node state is retrieved from the auxiliary storage element and the node is re-created based on the retrieved node state.

For storing a run-time node (for example, the run-time node 336), a node state is generated for the run-time node. The node state includes information (for example, attribute values, a label, an icon, a version number, or the like) to re-create the run-time node. The node state includes a node template state for a node template of the run-time node, and a node instance state for a node instance of the run-time node. Each of the node template state and the node instance state is stored in a corresponding auxiliary storage element. Subsequently, a node manifest for the node state is generated, where the node manifest includes a node manifest template that stores a storage location of the node template state and a node manifest instance that stores a storage location of the node instance state and includes a reference to the node manifest template. Subsequently, a node manifest template state is generated for the node manifest template, where the node manifest template state includes information to re-create the node manifest template. Additionally, a node manifest instance state is generated for the node manifest instance, where the node manifest instance state includes information to re-create the node manifest instance and a reference to the node manifest template state. The node manifest template state is stored in a manifest template storage of the overlay system 202, whereas, the node manifest instance state is stored in a manifest instance storage of the overlay system 202. The plurality of manifest storages of the overlay system 202 include the manifest template storage and the manifest instance storage.

For retrieval of the run-time node, the node manifest instance state is retrieved from the manifest instance storage based on an ID of the node instance. As mentioned previously, the node manifest instance state includes (i) information to re-create the node manifest instance and (ii) the reference to the node manifest template state. Subsequently, the node manifest template state is retrieved by way of the reference and used to re-create the node manifest template, whereas the node manifest instance state is used to re-create the node manifest instance. Subsequently, each of the node template and the node instance for the run-time node are loaded as described in conjunction with FIG. 5. Notably, the node template of the run-time node gets loaded before the node instance of the run-time node. Subsequently, the node template and the node instance are organized (such as combined, sequenced, assembled, or the like) to form the run-time node.

Notably, the storage location of the node state is determined by an owner of data record stored at the node, whereas the storage location of the manifest and the manifest state is determined by one or more modules (such as the memory management module 218 and the storage management module 220) of the overlay system 202.

Referring to FIG. 6A, as shown within a dotted box 602, the executable graph-based model 100 includes a node 604 that stores sensitive and confidential data. Therefore, the data stored at the node 604 is to be protected. For the sake of description of FIG. 6A, the node 604 is assumed to be a run-time node and is referred as the run-time node 604.

A first stimulus (for example, the stimulus 230) may be received by the overlay system 202, where the first stimulus may be indicative of a data splintering instruction. The data splintering instruction may be indicative of (i) a command to execute a data splintering operation to divide the run-time node 604 to create a plurality of splinters of the run-time node 604 and (ii) a plurality of storage locations where the plurality of splinters of the run-time node 604 are to be stored. Each splinter of the run-time node 604 is a unit thereof that is separated from the remaining splinters of the run-time node 604. The data splintering instruction may be further indicative of a set of storage strategies using which a first set of splinters of the plurality of splinters are to be stored. The data splintering instruction may be further indicative of a set of security techniques using which a second set of splinters are to be secured. The first and second sets of splinters may include splinters that may be the same, different, or a combination of these. The data splintering instruction may be further indicative of a splintering level at which the plurality of splinters of the data stored at the first node is to be created. The splintering level may be (i) a node level splintering, where the plurality of splinters are created by separating data structure (node template) and data (node instance) of the run-time node 604, and (ii) an attribute level splintering, where the plurality of splinters are created based on a plurality of attribute values of a plurality of attributes of the run-time node 604.

FIG. 6A depicts the data splintering performed at the node level. Therefore, the splintering level of the first stimulus corresponds to the node level splintering. In other words, the data splintering instruction may be indicative of the node level splintering. Based on a first context of the first stimulus, the processing circuitry (for example, the data splintering management module 242) may be configured to identify at least the run-time node 604 in the executable graph-based model 100 that is required for processing the first stimulus. The processing circuitry (such as the controller module 206) may be configured to determine whether the first node is loaded in the executable graph-based model 100. In an instance, when the first node is not loaded in the executable graph-based model 100, the processing circuitry (such as the memory management module 218 and the storage management module 220) may load the first node in the executable graph-based model 100.

Subsequently, based on the first stimulus, the processing circuitry (for example, the data splintering management module 242) may be configured to execute a data splintering operation on the run-time node 604 to divide the run-time node 604 into the plurality of splinters. Since the splintering level indicated by the first stimulus is the node level splintering, the processing circuitry (such as the controller module 206 and the data splintering management module 242)

may be configured to separate a data structure from data stored at the run-time node 604. The run-time node 604 includes a node template 606 and a node instance 608. Therefore, for separating the data structure from the data of the run-time node 604, the processing circuitry (such as the controller module 206 and the data splintering management module 242) may create a node template splinter of the run-time node 604 that corresponds to the node template 606 (i.e., the data structure) of the run-time node 604, and a node instance splinter of the run-time node 604 that corresponds to the node instance 608 (e.g., the data) of the run-time node 604. The node instance 608 corresponds to an implementation of the node template 606. Therefore, the plurality of splinters of the run-time node 604 includes the node template splinter and the node instance splinter. Hereinafter, the node template splinter is referred to as the node template 606, and the node instance splinter is referred to as the node instance 608.

Based on the first stimulus, the processing circuitry (such as the data splintering management module 242 and the overlay management module 216) may instantiate a plurality of location overlay nodes including location overlay nodes 610 and 612 for the plurality of splinters of the run-time node 604. Each of the location overlay nodes 610 and 612 may be indicative of a corresponding auxiliary storage element of the plurality of auxiliary storage elements of the overlay system 202. The location overlay nodes 610 and 612 are associated with the node template 606 and the node instance 608, respectively, of the run-time node 604.

Moreover, based on the first stimulus, the processing circuitry (such as the data splintering management module 242 and the overlay management module 216) may be configured to instantiate a set of additional overlay nodes for a set of splinters of the plurality of splinters of the run-time node 604. The set of additional overlay nodes may include a storage strategy overlay node and/or a security overlay node. As shown, the processing circuitry (such as the data splintering management module 242 and the overlay management module 216) instantiates storage strategy overlay nodes 614 and 616 (e.g., the additional overlay nodes) for the node template 606 and the node instance 608, respectively. The location overlay nodes 610 and 612 are associated with storage strategy overlay nodes 614 and 616, respectively. In other words, the storage strategy overlay nodes 614 and 616 are overlays of the location overlay nodes 610 and 612, respectively.

Based on the first stimulus, the processing circuitry (such as the data splintering management module 242 and the overlay management module 216) may be further configured to instantiate security overlay nodes 618 and 620 (e.g., the additional overlay nodes). The processing circuitry (such as the data splintering management module 242 and the overlay management module 216) may be configured to associate the security overlay nodes 618 and 620 with the node template 606 and the node instance 608, respectively.

Notably, an additional overlay node may be associated with a node in a tightly coupled manner or a loosely coupled manner. When tightly coupled, the additional overlay node is directly associated with the node, whereas, when loosely coupled the additional overlay node is associated with the node via one or more intermediate nodes. In an example, as shown, the security overlay node 618 is in a direct association with the node template 606. Therefore, the security overlay node 618 is associated with the node template 606 in a tightly coupled manner. In another example, as shown, the storage strategy overlay node 614 is associated with the node template 606 via the location overlay node 610. Therefore, the storage strategy overlay node 614 is associated with the node template 606 in a loosely coupled manner. Additionally, the additional overlay node may be associated with the node via the location overlay node. For example, as shown, the storage strategy overlay node 614 is associated with the node template 606 via the location overlay node 610.

Based on the association between the node template 606 and the location overlay node 610, the node template 606 is stored at the auxiliary storage element indicated by the location overlay node 610 using a storage strategy associated with the storage strategy overlay node 614. Similarly, based on the association between the node instance 608 and the location overlay node 612, the node instance 608 is stored at the auxiliary storage element indicated by the location overlay node 612 using a storage strategy associated with the storage strategy overlay node 616. Further, based on the association between the node template 606 and the security overlay node 618, the node template 606 is secured/protected using a security technique associated with the security overlay node 618. Similarly, based on the association between the node template 606 and the security overlay node 620, the node instance 608 is secured using a security technique associated with the security overlay node 620.

As shown within a dotted box 622, the run-time node 604 is divided into the node template 606 and the node instance 608. Therefore, the run-time node 604 (shown by way of a dashed circle inside the dotted box 622) becomes transient and does not exist within the overlay system 202 but may be re-formed based on the plurality of splinters associated therewith. In other words, once a node gets splintered, the node becomes transient and hence, does not exist within the overlay system 202 but may be re-formed based on the plurality of splinters associated therewith. The term transient refers to a node being unloaded and non-existent in the executable graph-based model 100. The term transient further refers to an ability of the overlay system 202 to re-form the node that is transient.

Subsequently, for storing the plurality of splinters of the run-time node 604, the processing circuitry (such as the memory management module 218 and the storage management module 220) may be configured to create a node template state 624 and a node instance state 626 for the node template 606 and the node instance 608, respectively. The node template state 624 includes information (such as attribute values, labels, icons, version, or the like) that is required to re-create the node template 606. Similarly, the node instance state 626, includes information (such as attribute values, labels, icons, version, or the like) that is required to re-create the node instance 608.

As shown, the node template state 624 is stored in an auxiliary storage element 628, that is indicated by the location overlay node 610. Further, the node template state 624 is stored in the auxiliary storage element 628 by way of a storage strategy A that is indicated by the storage strategy overlay node 614. Additionally, the node template state 624 is secured by a security technique indicated by the security overlay node 618. Similarly, the node instance state 626 is stored in an auxiliary storage element 630, that is indicated by the location overlay node 612. Further, the node instance state 626 is stored in the auxiliary storage element 630 by way of a storage strategy B indicated by the storage strategy overlay node 616. Additionally, the node instance state 626 is secured (namely, protected) by a security technique indicated by the security overlay node 620. Although not shown, each auxiliary storage element may have a plurality of node template states and/or node instance states that may be stored by way of similar or different storage strategies. Additionally, the plurality of node template states and/or node instance states may be secured by way of similar or different security techniques.

Subsequently, the processing circuitry (such as the memory management module 218 and the storage management module 220) may be configured to create a node manifest 632 for the run-time node 604, where the node manifest 632 includes storage information of the node template state 624 and the node instance state 626, and hierarchical data associated therewith. The node manifest 632 includes a node manifest template 634 and a node manifest instance 636. The node manifest instance 636 includes a reference to the node manifest template 634. Further, the processing circuitry (such as the memory management module 218 and the storage management module 220) may be configured to create a node manifest template state 638 for the node manifest template 634. The node manifest template state 638 includes information to re-create the node manifest template 634. The node manifest template state 638 is stored in a manifest storage 640 by way of a storage strategy C. Such storage of the node manifest template state 638 is determined and performed by the processing circuitry (such as the memory management module 218 and the storage management module 220). Similarly, the processing circuitry (such as the memory management module 218 and the storage management module 220) may be configured to create a node manifest instance state 642 for the node manifest instance 636. The node manifest instance state 642 includes information to re-create node manifest instance 636. The node manifest instance state 642 is stored in a manifest storage 644 by way of a storage strategy B. Such storage of the node manifest instance state 642 is determined and performed by the processing circuitry (such as the memory management module 218 and the storage management module 220).

The run-time node 604 is thus said to be splintered in the plurality of splinters.

The node template 606 and the node instance 608 associated with the run-time node 604 are stored separately. Hence, in order to re-form the run-time node 604, each of the node template 606 and the node instance 608 of the run-time node 604 are required to be retrieved and organized (such as combined, sequenced, assembled, or the like) to re-form the run-time node 604. Additionally, the retrieval of the node template 606 and the node instance 608 includes accessing the node template state 624 and the node instance state 626, respectively. In order to access the node template state 624 and the node instance state 626, the node manifest 632 is required to be re-created based on the node manifest template 634 and the node manifest instance 636. The node manifest template 634 gets loaded by way of the corresponding reference in the node manifest instance 636. The node manifest template 634 gets loaded/re-created prior to the node manifest instance 636. It will be appreciated by a person skilled in the art that each of the node template 606, the location overlay node 610, the storage strategy overlay node 614, and the security overlay node 618 are associated with corresponding node state, manifest and manifest states and hence, get loaded in the executable graph-based model 100 as described in conjunction with FIG. 5. Similarly, each of the node instance 608, the location overlay node 612, the storage strategy overlay node 616, and the security overlay node 620 are associated with corresponding node state, manifest and manifest states and hence, get loaded in the executable graph-based model 100 as described in conjunction with FIG. 5.

Notably, the plurality of splinters for the run-time node 604 also include the location overlay nodes 610 and 612, the storage strategy overlay nodes 614 and 616, and the security overlay nodes 618 and 620. Further, the run-time node 604 and the plurality of splinters thereof form a hierarchy such that the run-time node 604 acts as a root node, and the node template 606 and the node instance 608 act as child nodes to the root node (e.g., the run-time node 604) such that the node template 606 and the node instance 608 are siblings. The location overlay node 610, the storage strategy overlay node 614, and the security overlay node 618 are child nodes of the node template 606 such that the location overlay node 610 and the security overlay node 618 are siblings, and the storage strategy overlay node 614 is a child node of the location overlay node 610. Additionally, the storage strategy overlay node 614 and the security overlay node 618 are leaf nodes. The location overlay node 612, the storage strategy overlay node 616, and the security overlay node 620 are child nodes of the node instance 608 such that the location overlay node 612 and the security overlay node 620 are siblings, and the storage strategy overlay node 616 is a child node of the location overlay node 612. Additionally, the storage strategy overlay node 616 and the security overlay node 620 are leaf nodes. The hierarchy is stored by the data splintering management module 242 in the form of hierarchical data. The hierarchical data includes manifests of the run-time node 604 and the plurality of splinters. The hierarchical data includes a manifest graph that is created by the data splintering management module 242 based on the hierarchy of the run-time node 604 and the plurality of splinters such that each manifest represents the corresponding node in the hierarchy.

In operation, the processing circuitry (such as the controller module 206 and the stimuli management module 212) may be configured to receive a second stimulus (for example, the stimulus 230), that is indicative of an operation to be executed on the run-time node 604. The processing circuitry (such as the controller module 206, the memory management module 218, and the storage management module 220) may be configured to identify and load each splinter (such as the location overlay nodes 610 and 612, the storage strategy overlay nodes 614 and 616, the security overlay nodes 618 and 620, the node template 606 and the node instance 608) as described in conjunction with FIG. 5. Subsequently, the plurality of splinters are organized (namely, reconstructed) in accordance with the hierarchical data associated with the run-time node 604 in a bottom-up approach. That is to say that, the organizing of the splinters begins from the leaf nodes of the hierarchical data, where manifests of leaf nodes include a reference to manifests of corresponding parent nodes. Therefore, once leaf nodes are reconstructed, corresponding parent nodes are reconstructed, where the manifest of the parent node also includes a reference to corresponding parent nodes. All the splinters are similarly reconstructed. Notably, one or more splinters may be loaded and reconstructed parallelly. To summarize, the processing circuitry (such as the controller module 206) may organize the plurality of splinters by reconstructing, instantiating, combining, assembling, and/or sequencing the plurality of splinters in accordance with the hierarchical data to re-form the run-time node 604.

Figure 6B:
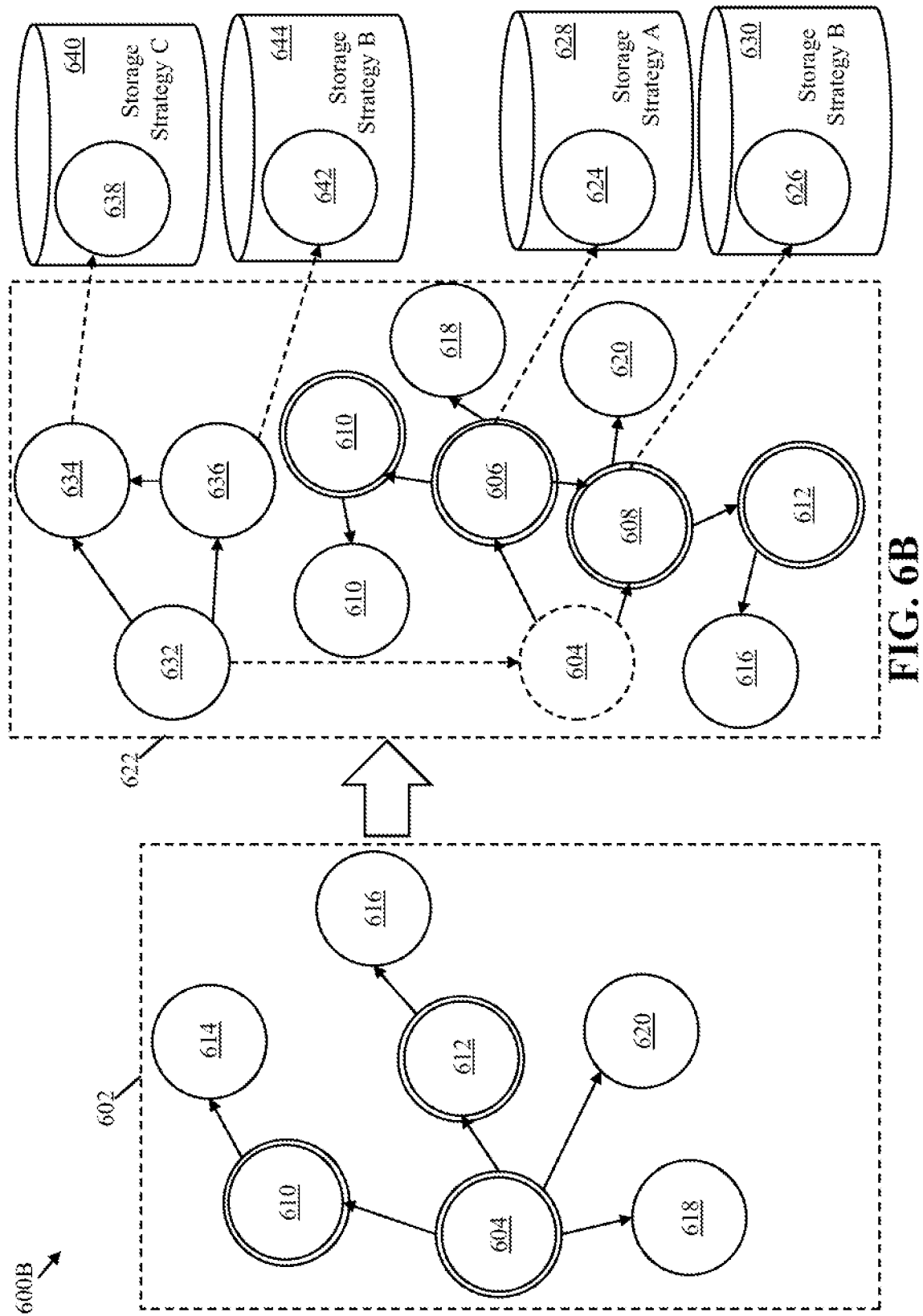
FIG. 6B illustrates another schematic diagram that depicts another example implementation of data splintering at the node level, in accordance with another embodiment of the present disclosure.

FIG. 6B illustrates another schematic diagram 600B that depicts another example implementation of data splintering at the node level, in accordance with another embodiment of the present disclosure.

Referring to FIG. 6B, the graph illustrated in FIG. 6B has a description that is similar to the graph illustrated in FIG. 6A. However, for the sake of description of FIG. 6B, the node 604 is assumed to be an executable node. Therefore, the node 604 does not include the corresponding node template and corresponding node instance. Hence, in order to create the plurality of splinters of the node 604, a dynamic node template and a dynamic node instance of the node 604 may be extracted from the node 604. For the sake of description of FIG. 6B, the node template 606 is assumed to be the dynamic node template and the node instance 608 is assumed to be the dynamic node instance. The dynamic node template corresponds to the data structure splinter and the dynamic node instance corresponds to the data splinter of the node 604. Also, the creation of the plurality of splinters for the node 604 and re-forming of the node 604 may be performed as described in conjunction with FIG. 6A.

Notably, a run-time node includes a node template and a node instance that are static. Here, the word static means pre-existing, that is to say that, the node template and node instance exist prior to execution of a data splintering operation. Therefore, such node template and node instance may be referred to as a static node template and a static node instance, respectively. Since, the node 604 of FIG. 6B is not a run-time node, the node 604 does not include a node template and a node instance. Therefore, for executing the data splintering operation at the node level, the dynamic node template and the dynamic node instance are generated for the node 604. The dynamic node template and the dynamic node instance are generated by separating the data structure of the node 604 from the data stored thereat. The data structure of the node 604 forms the dynamic node template and the data stored at the node 604 forms the dynamic node instance.

Moreover, since the node 604 does not have a pre-existing node template and a pre-existing node instance, the location overlay nodes 610 and 612, and the security overlay nodes 618 and 620 are associated with the node 604. Additionally, the location overlay nodes 610 and 612, the storage strategy overlay nodes 614 and 616, and the security overlay nodes 618 and 620 include corresponding overlay configurations. The overlay configuration of an overlay node is indicative of conformity and/or association thereof with a specific splinter of a corresponding node. The location overlay node 610, the storage strategy overlay node 614, and the security overlay node 618 include a first overlay configuration that indicates an association thereof with a data structure splinter, i.e., the dynamic node template of the node 604. Similarly, the location overlay node 612, the storage strategy overlay node 616, and the security overlay node 620 include a second overlay configuration that indicates an association thereof with a data splinter, i.e., the dynamic node instance of the node 604. Subsequently, the creation of the plurality of splinters for the node 604 and re-forming of the node 604 may be performed as described in conjunction with FIG. 6A.

Throughout the description, a manifest created for a splinter of a node is a splinter manifest and a state created for the splinter is a splinter state.

Figure 7A:
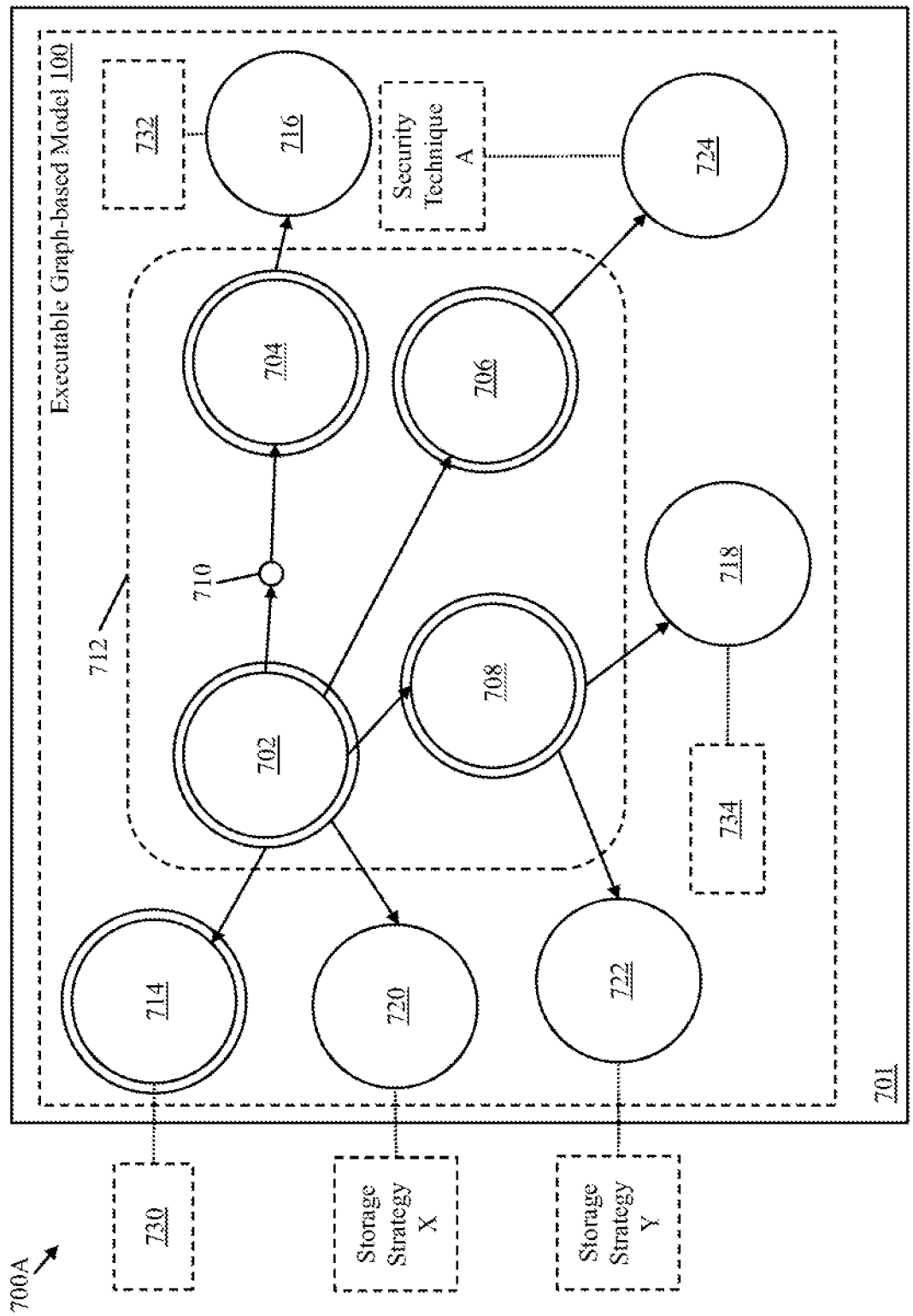
FIGS. 7A-7D illustrate schematic diagrams that, collectively, depict data splintering at an attribute level, in accordance with an embodiment of the present disclosure.

FIGS. 7A-7D illustrate schematic diagrams 700A-700D, respectively, that, collectively, depict data splintering at the attribute level, in accordance with an embodiment of the present disclosure. Referring to FIG. 7A, the executable graph-based model 100 is stored in a primary storage element 701 of the overlay system 202. The executable graph-based model 100 is shown to include a node 702 having a composition that includes a plurality of attribute values for a plurality of attributes associated with the node 702. Notably, the node 702 may store data that may be sensitive and confidential. Therefore, the processing circuitry (such as the controller module 206 and the stimuli management module 212) may be configured to receive a third stimulus indicative of (i) a second data splintering instruction that may be indicative of an instruction/command to execute operations to divide the node 702 to create a plurality of splinters and (ii) a plurality of storage locations where the plurality of splinters of the node 702 are to be stored. The second data splintering instruction may be further indicative of a set of storage strategies using which a set of splinters of the plurality of splinters of the node 702 are to be stored. The second data splintering instruction may be further indicative of a set of security techniques using which the same or different set of splinters of the node 702 are to be secured. Also, the second data splintering instruction may be indicative of the attribute level splintering to be performed for creating the splinters of the node 702. For the sake of description of FIGS. 7A-9B, a plurality of attributes of a node (for example, the node 302 or the run-time node 336) are assumed to include each element (as shown in FIGS. 3A and 3B) of the node.

Based on a third context of the third stimulus, the processing circuitry (for example, the data splintering management module 242) may be configured to identify the node 702 in the executable graph-based model 100 that is required for processing the third stimulus. In an instance, when the node 702 is not loaded in the executable graph-based model 100, the processing circuitry (such as the memory management module 218 and the storage management module 220) may load the node 702 in the executable graph-based model 100. Subsequently, based on the third stimulus, the processing circuitry (for example, the data splintering management module 242) may be configured to execute a second data splintering operation on the node 702 to divide the node 702 into a plurality of splinters.

Since the splintering level indicated by the third stimulus is the attribute level splintering, the processing circuitry (such as the data splintering management module 242) may be configured to store the plurality of attribute values for the plurality of attributes associated with the node 702 in a plurality of attribute vertex nodes 704-708. The attribute vertex nodes 704-708 are associated with the node 702 via corresponding attribute connections. An attribute connection refers to a link between an attribute vertex node and an associated node. The attribute connection may be realized by way of an edge node or an attribute path. In an instance, when the attribute connection may be the edge node, the node 702 and an attribute vertex node, having an attribute value of an attribute associated with the node 702, may be coupled by way of a first edge node, where the first edge node includes a role for each of the node 702 and the attribute vertex node. In another instance, when the attribute connection may be the attribute path, the node 702 may include a path, an address, a link, an identifier, a reference, a pointer, or the like associated with the attribute vertex node.

As shown, the attribute vertex node 704 is associated with the node 702 via an edge node 710. The attribute vertex nodes 706 and 708 are associated with the node 702 via corresponding attribute paths. That is to say that, the node 702 includes the attribute paths of the attribute vertex nodes 706 and 708 and references to each of the attribute vertex nodes 706 and 708 via the corresponding attribute path. Additionally, as shown within a dashed box 712, the plurality of attribute vertex nodes 704-708 form a logical structure of the node 702.

Based on the third stimulus, the processing circuitry (such as the overlay management module 216 and the data splintering management module 242) may be configured to instantiate location overlay nodes 714, 716, and 718. The processing circuitry (such as the overlay management module 216 and the data splintering management module 242) may be further configured to instantiate, based on the third stimulus, a set of additional overlay nodes including storage strategy overlay nodes 720 and 722 and a security overlay node 724. Based on the third stimulus, the processing circuitry (such as the overlay management module 216 and the data splintering management module 242) may be further configured to associate the location overlay nodes 714-718 with the node 702, the attribute vertex nodes 704 and 708, respectively.

Figure 7B:
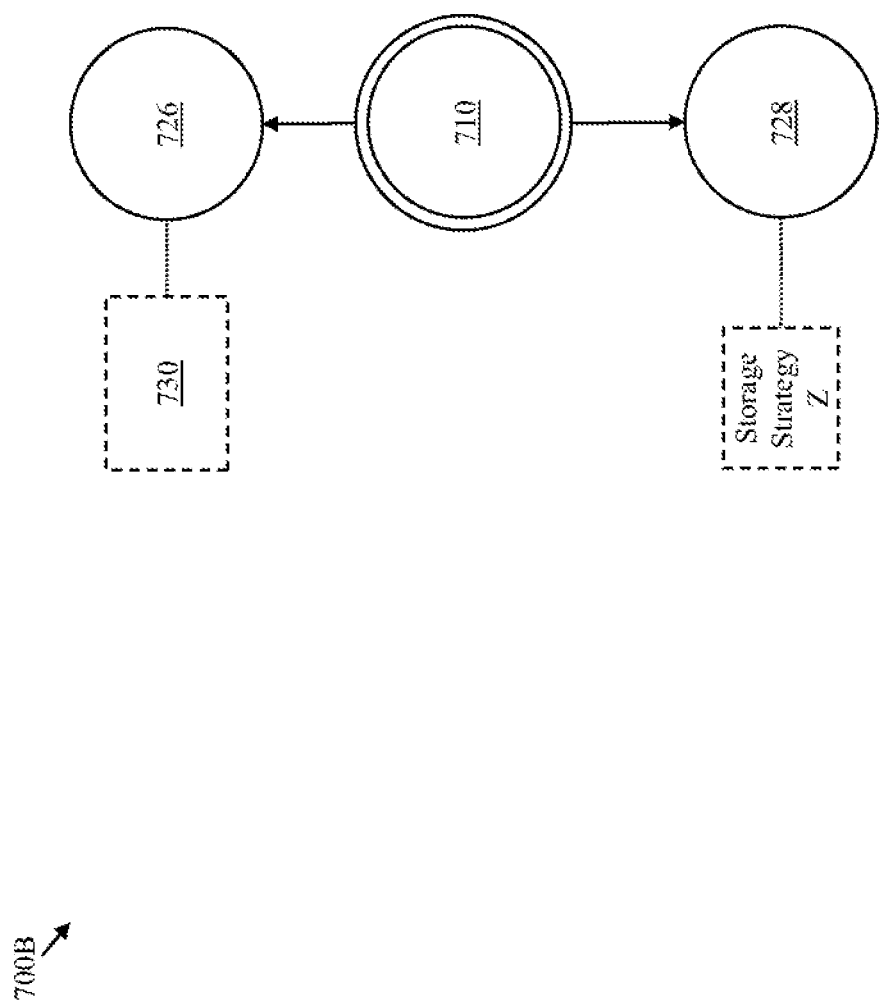

Location and storage security overlay nodes may also be instantiated for the edge node 710. For example, as shown in FIG. 7B, the processing circuitry (such as the overlay management module 216 and the data splintering management module 242) may be further configured to instantiate a location overlay node 726 and a storage strategy overlay node 728 for the edge node 710, and associate the location overlay node 726 with the edge node 710.

The location overlay node 714 is indicative of an auxiliary storage element 730 which is also a default storage location for the node 702 (i.e., the composition of the node 702). The location overlay node 726 is also indicative of the auxiliary storage element 730 where the edge node 710 is to be stored. The location overlay node 716 is indicative of an auxiliary storage element 732 where the attribute vertex node 704 is to be stored. The location overlay node 718 is indicative of an auxiliary storage element 734 where the attribute vertex node 708 is to be stored.

Additionally, the processing circuitry (such as the overlay management module 216 and the data splintering management module 242) may be further configured to associate the storage strategy overlay nodes 720 and 722 with the node 702 and the attribute vertex node 708, respectively. The storage strategy overlay node 728 is also associated with the edge node 710. The storage strategy overlay node 720 may be indicative of a storage strategy X that is a default storage strategy using which the node 702 (i.e., the composition of the node 702) is to be stored. The storage strategy overlay node 722 may be indicative of a storage strategy Y using which the attribute vertex node 708 is to be stored. The storage strategy overlay node 728 may be indicative of a storage strategy Z using which the edge node 710 is to be stored.

The processing circuitry (such as the overlay management module 216 and the data splintering management module 242) may be further configured to associate the security overlay node 724 with the attribute vertex node 706. The security overlay node 724 is indicative of a security technique A using which the attribute vertex node 706 is to be secured/protected. Notably, the edge node 710 that forms a connection between the node 702 and the attribute vertex node 704 also forms a splinter of the plurality of splinters of the node 702.

In some embodiments, the node 702 may be further associated with a security overlay node (not shown). In such embodiments, a security level of the security overlay node 724 may be higher than a security level of the security overlay node of the node 702. For example, the security level of the security overlay node of the node 702 may be a 128-bit encryption, whereas, the security level of the security overlay node 724 may be a 256-bit encryption.

The processing circuitry (such as the memory management module 218 and the storage management module 220) may be configured to store the plurality of splinters of the node 702 in accordance with a location overlay node and/or additional overlay nodes associated therewith.

In some embodiments, each of the location overlay node, the storage strategy overlay node, and the security overlay node includes a corresponding overlay configuration that indicates a splinter of a plurality of splinters of a corresponding node on which corresponding functionality (e.g., storage location, storage strategy, security technique, or the like) is to be applied. In such an embodiment, a plurality of attribute values of a plurality of attributes of the node are stored in the corresponding node or in an attribute value object that acts as a mere storage within the executable graph-based model 100. Further, the location overlay node, the storage strategy overlay node, and the security overlay node are associated with the node and corresponding functionalities are applied on the splinter of the node which is indicated by the corresponding overlay configuration.

Figure 7C:
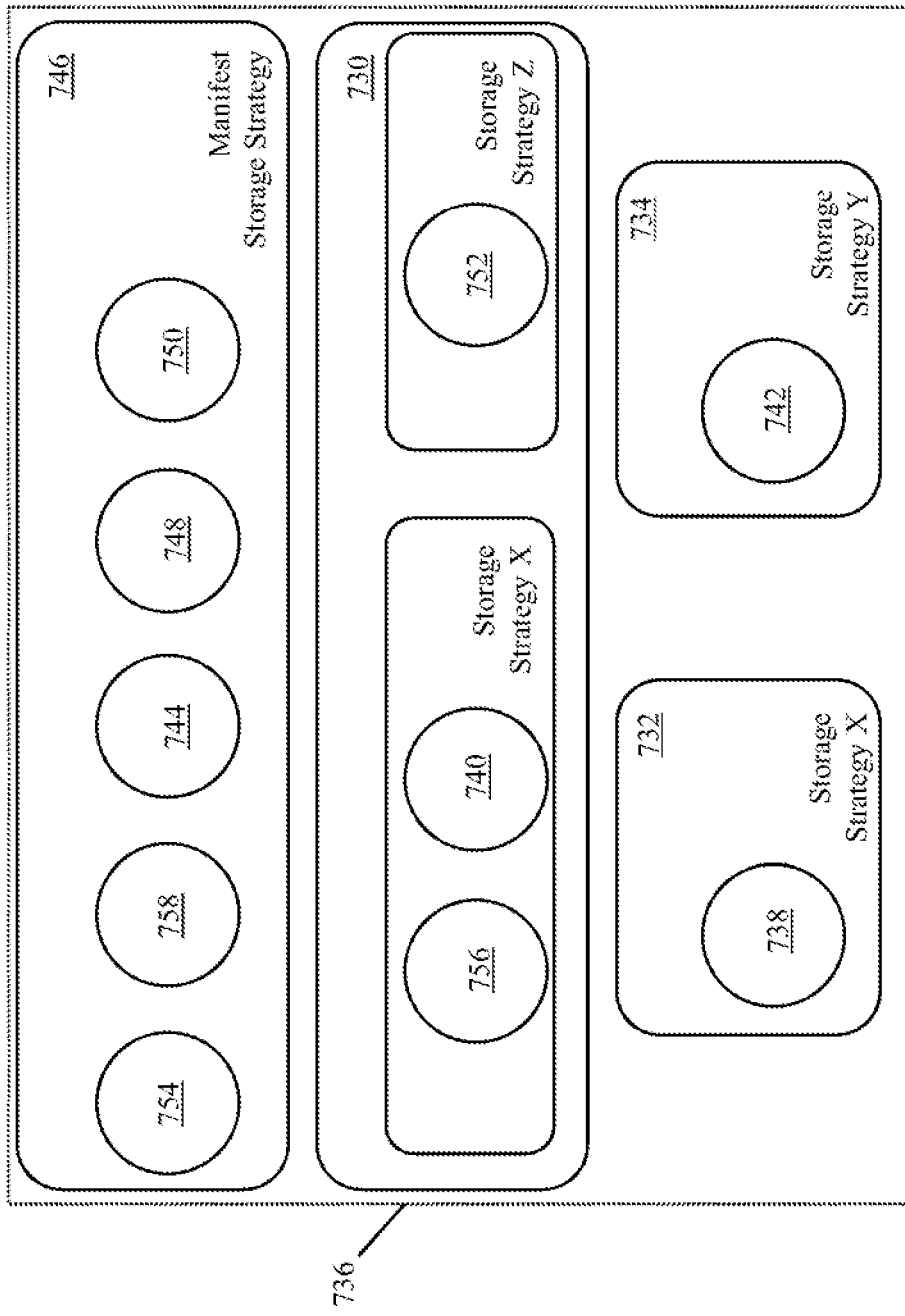
Figure 7D:
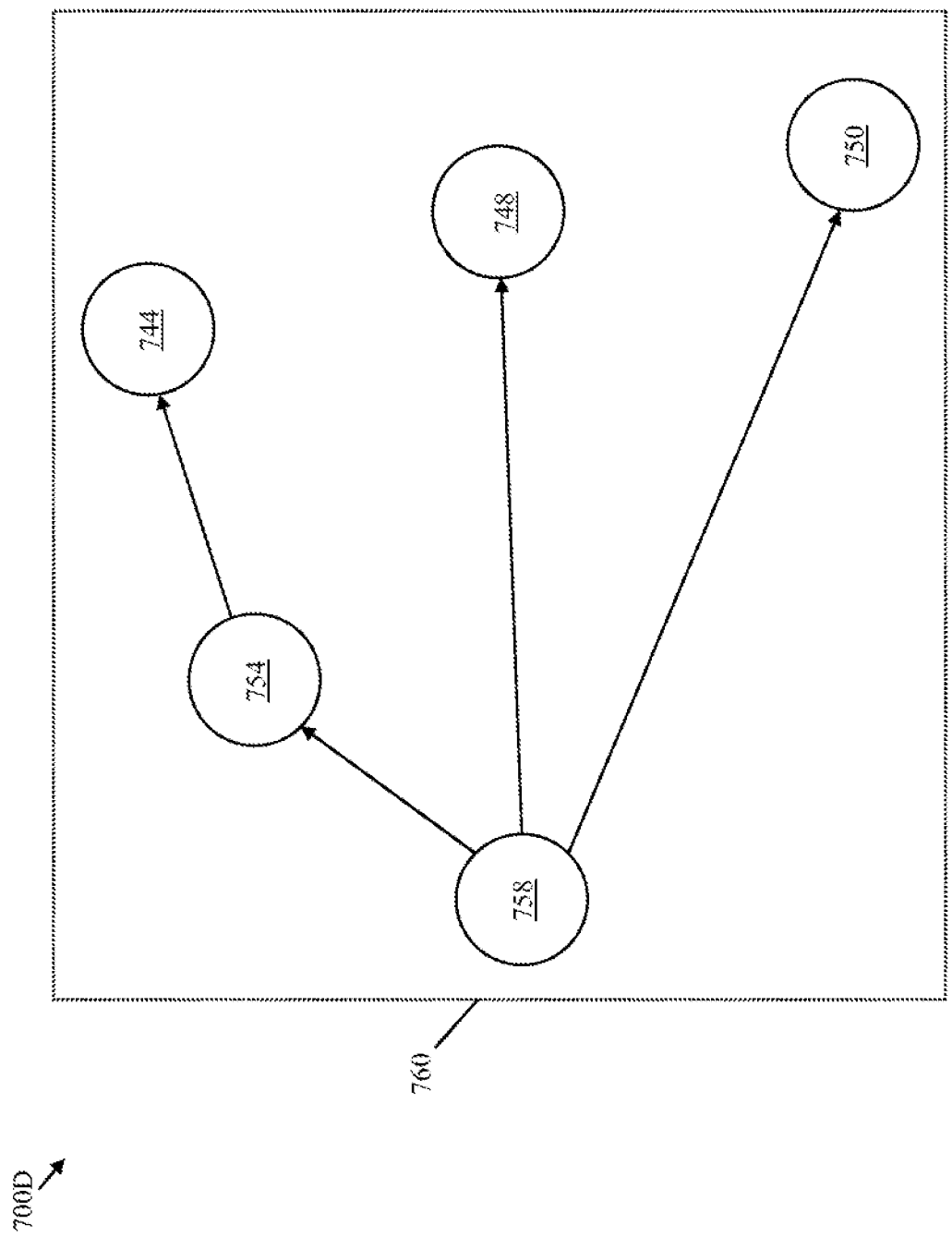

Referring to FIG. 7C, shown is a splinter storage record 736 which is maintained by the processing circuitry (such as the data splintering management module 242). Notably, the processing circuitry (such as the memory management module 218 and the storage management module 220) may be configured to generate a state for the node 702 and a plurality of splinter states for the plurality of splinters of the node 702. Subsequently, for each state, the processing circuitry (such as the memory management module 218 and the storage management module 220) may be configured to generate a manifest state that stores storage information associated with the corresponding state. Notably, the plurality of splinters of the node 702 also include the location overlay nodes 714, 716, 718, and 726, the storage strategy overlay nodes 720, 722, and 728, and the security overlay node 724. For the sake of brevity, FIGS. 7C and 7D illustrate node states, manifest, and manifest states only for the node 702 and the attribute vertex nodes 704, 706, and 708. For remaining splinters of the node 702, storage and retrieval may be executed in a similar manner.

The processing circuitry (such as the memory management module 218 and the storage management module 220) may be configured to generate attribute vertex node states for each of the plurality of attribute vertex nodes 704-708. That is to say that, the processing circuitry may generate attribute vertex node states 738, 740, and 742 for the attribute vertex nodes 704, 706, and 708, respectively. The attribute vertex node states 738, 740, and 742 may include information that is required to re-create the attribute vertex nodes 704, 706, and 708, respectively.

Subsequently, the processing circuitry (such as the memory management module 218 and the storage management module 220) may be configured to store the attribute vertex node state 738 in the auxiliary storage element 732 indicated by the location overlay node 716. Additionally, since the attribute vertex node 704 is not associated with a storage strategy overlay node, the storage strategy X, associated with the storage strategy overlay node 720 associated with the node 702, is used to store the attribute vertex node state 738. Subsequently, a manifest is created for the attribute vertex node state 738, where the manifest includes storage information of the attribute vertex node state 738. The storage information of the attribute vertex node state 738 may be indicative of a storage location (e.g., a directory, a file name, a logical address, or the like) in the auxiliary storage element 732. The processing circuitry (such as the memory management module 218 and the storage management module 220) may be configured to generate a manifest state 744 for the manifest of the attribute vertex node state 738. The processing circuitry may store the manifest state 744 in a manifest storage 746 using a manifest storage strategy.

Similarly, since the attribute vertex node 706 is not associated with a location overlay node, the processing circuitry (such as the memory management module 218 and the storage management module 220) may be configured to store the attribute vertex node state 740 in the auxiliary storage element 730 indicated by the location overlay node 714 of the node 702. Additionally, since the attribute vertex node 706 is not associated with a storage strategy overlay node, the storage strategy X, associated with the storage strategy overlay node 720 associated with the node 702, is used to store the attribute vertex node state 740. Further, since the attribute vertex node 706 is associated with the security overlay node 724, the attribute vertex node state 740 is secured by way of a security technique A associated with the security overlay node 724. Subsequently, a manifest is created for the attribute vertex node state 740, where the manifest includes storage information of the attribute vertex node state 740. The storage information of the attribute vertex node state 740 may be indicative of a storage location (e.g., a directory, a file name, a logical address, or the like) in the auxiliary storage element 730. The processing circuitry (such as the memory management module 218 and the storage management module 220) may be configured to generate a manifest state 748 for the manifest of the attribute vertex node state 740. The processing circuitry may store the manifest state 748 in the manifest storage 746 using the manifest storage strategy.

Additionally, since the attribute vertex node 708 is associated with the location overlay node 718, the processing circuitry (such as the memory management module 218 and the storage management module 220) may be configured to store the attribute vertex node state 742 in the auxiliary storage element 734 indicated by the location overlay node 718. Since the attribute vertex node 708 is associated with the storage strategy overlay node 722, the storage strategy Y, associated with the storage strategy overlay node 722, is used to store the attribute vertex node state 742. Subsequently, a manifest is created for the attribute vertex node state 742, where the manifest includes storage information of the attribute vertex node state 742. The storage information of the attribute vertex node state 742 may be indicative of a storage location (e.g., a directory, a file name, a logical address, or the like) in the auxiliary storage element 734. The processing circuitry (such as the memory management module 218 and the storage management module 220) may be configured to generate a manifest state 750 for the manifest of the attribute vertex node state 742. The processing circuitry may store the manifest state 750 in the manifest storage 746 using the manifest storage strategy.

Subsequently, since the attribute vertex node 704 is associated with the node 702 via the edge node 710, the processing circuitry (such as the memory management module 218 and the storage management module 220) may create an edge node state 752 for the edge node 710. The edge node state 752 may include information to re-create the edge node 710. The edge node state 752 may be indicative of roles for the node 702 and the attribute vertex node 704 (e.g., an association between the node 702 and the attribute vertex node 704). As shown in FIG. 7B, the edge node 710 is associated with the location overlay node 726. Therefore, the processing circuitry (such as the memory management module 218 and the storage management module 220) may be configured to store the edge node state 752 in the auxiliary storage element 730 indicated by the location overlay node 726. Further, as the edge node 710 is associated with the storage strategy overlay node 728, the processing circuitry (such as the memory management module 218 and the storage management module 220) may be configured to store the edge node state 752 by way of the storage strategy Z associated with the storage strategy overlay node 728. Subsequently, a manifest is created for the edge node state 752, where the manifest includes storage information of the edge node state 752. The storage information of the edge node state 752 may be indicative of a storage location (e.g., a directory, a file name, a logical address, or the like) in the auxiliary storage element 730. The processing circuitry (such as the memory management module 218 and the storage management module 220) may be configured to generate a manifest state 754 for the manifest of the edge node state 752. The processing circuitry may store the manifest state 754 in the manifest storage 746 using the manifest storage strategy.

Moreover, the processing circuitry (such as the memory management module 218 and the storage management module 220) may be configured to create a node state 756 for the node 702. The node state 756 may include the storage location of the manifest state 744, the manifest state 748, the manifest state 750, and the manifest state 754. The node state 756 may also include hierarchical data associated with the plurality of splinters of the node 702. Since, the node 702 is associated with the location overlay node 714 and the storage strategy overlay node 720, the processing circuitry (such as the memory management module 218 and the storage management module 220) may be configured to store the node state 756 in the auxiliary storage element 730 associated with the location overlay node 714. Additionally, the node state 756 may be stored using the storage strategy X associated with the storage strategy overlay node 720. Subsequently, the processing circuitry (such as the memory management module 218 and the storage management module 220) may be configured to create a node manifest for the node state 756. The node manifest includes the storage location of the node state 756. The processing circuitry (such as the memory management module 218 and the storage management module 220) may be configured to generate a node manifest state 758 for the node manifest. The node manifest state 758 includes information to re-create the node manifest. The processing circuitry (such as the memory management module 218 and the storage management module 220) may be configured to store the node manifest state 758 in the manifest storage 746 using the manifest storage strategy. Although FIG. 7C depicts all the manifest states to be stored in a single manifest storage, in practical implementations, the manifest states 744, 748, 750, 754, and 758 may be stored in different manifest storages associated with the overlay system 202.

The manifest storage strategy, using which the manifest state 744, the manifest state 748, the manifest state 750, the manifest state 754, and the node manifest state 758 are stored in the manifest storage 746, is determined by the processing circuitry (such as the memory management module 218 and the storage management module 220).

Referring to FIG. 7D, shown is a manifest graph 760 that depicts the hierarchical data of the plurality of splinters of the node 702. The hierarchical data of the node 702 may be indicative of a sequence in which the plurality of splinters are to be organized/re-constructed/re-created to re-form the node 702. The manifest graph 760 depicts the manifest state 744, the manifest state 748, and the manifest state 750 at the leaf level of the manifest graph 760. Further, the hierarchical data indicates that the edge node 710 is a parent node to the attribute vertex node 704 which is indicated by the manifest state 754 being a parent node to the manifest state 744. The hierarchical data further depicts that the node 702 is parent to each of the attribute vertex nodes 704-708 and the attribute vertex node 704 is associated with the node 702 by way of the edge node 710. This is depicted in the manifest graph 760 as the node manifest state 758 acts as a root of the manifest graph 760.

Additionally, although not shown, the manifest graph 760 may also include manifest states for the location overlay nodes 714-718, the storage strategy overlay nodes 720 and 722, the security overlay node 724, the location overlay node 726, and the storage strategy overlay node 728. The manifest states for the location overlay nodes 714-718, the storage strategy overlay nodes 720 and 722, the security overlay node 724, the location overlay node 726, and the storage strategy overlay node 728 may be associated with manifest states of corresponding nodes.

In operation, the processing circuitry (such as the controller module 206 and the stimuli management module 212) may identify and load manifests of each of the plurality of splinters in accordance with the hierarchical data depicted in the manifest graph 760. Notably, the manifests of the node 702 and the plurality of splinters are identified and loaded in a top-down manner. Subsequently, the node corresponding to each splinter is loaded and re-created (namely, re-instantiated or reconstructed) in accordance with the manifest graph while following a bottom-up approach. Each of the plurality of splinters may be loaded as described in conjunction with FIG. 5. As mentioned previously, the plurality of splinters also include the location overlay nodes 714-718, the storage strategy overlay nodes 720 and 722, the security overlay node 724, the location overlay node 726, and the storage strategy overlay node 728. Therefore, manifests corresponding to the location overlay nodes 714-718, the storage strategy overlay nodes 720 and 722, the security overlay node 724, the location overlay node 726, and the storage strategy overlay node 728 are also identified and loaded by the processing circuitry (such as the controller module 206 and the stimuli management module 212) based on the hierarchical data. Subsequently, nodes for the location overlay nodes 714-718, the storage strategy overlay nodes 720 and 722, the security overlay node 724, the location overlay node 726, and the storage strategy overlay node 728 are loaded and re-created (namely, re-instantiated or reconstructed) in accordance with the manifest graph while following the bottom-up approach. Each of the location overlay nodes 714-718, the storage strategy overlay nodes 720 and 722, the security overlay node 724, the location overlay node 726, and the storage strategy overlay node 728 may be loaded as described in conjunction with FIG. 5.

Subsequently, the processing circuitry (such as the memory management module 218 and the storage management module 220) may organize the plurality of splinters to re-form the node 702. Notably, organizing the plurality of splinters refers to sequencing, assembling, and/or combining the plurality of splinters to re-form the node 702. Once, the node 702 is re-formed, the operation associated with the fourth stimulus is executed on the re-formed node 702.

In some embodiments, the plurality of attribute values of the plurality of attributes of node 702 may be divided to form a plurality of sets of attribute values. In such embodiments, for performing data splintering on the node 702, the processing circuitry (such as the data splintering management module 242) may be configured to store each set of attribute values of the plurality of sets of attribute values in a corresponding sub-node. A sub-node may have the features and structure of a node (such as the node 302) described in FIG. 3A or a run-time node (such as the run-time node 336) described in FIG. 3B. Each sub-node is associated with the node 702 via a corresponding attribute connection. In such embodiments, the plurality of sub-nodes constitute the plurality of splinters and data splintering is performed in a manner that is similar to data splintering performed when the plurality of attribute vertex nodes 704-708 constitute the plurality of splinters. Further, each sub-node may act as a child node of the node 702. Therefore, based on an absence of a location overlay node, a storage strategy overlay node, or a security overlay node being associated with a sub-node, the sub-node is considered to be associated with a location overlay node, a storage strategy overlay node, or a security overlay node associated with the node 702.

Figure 8A:
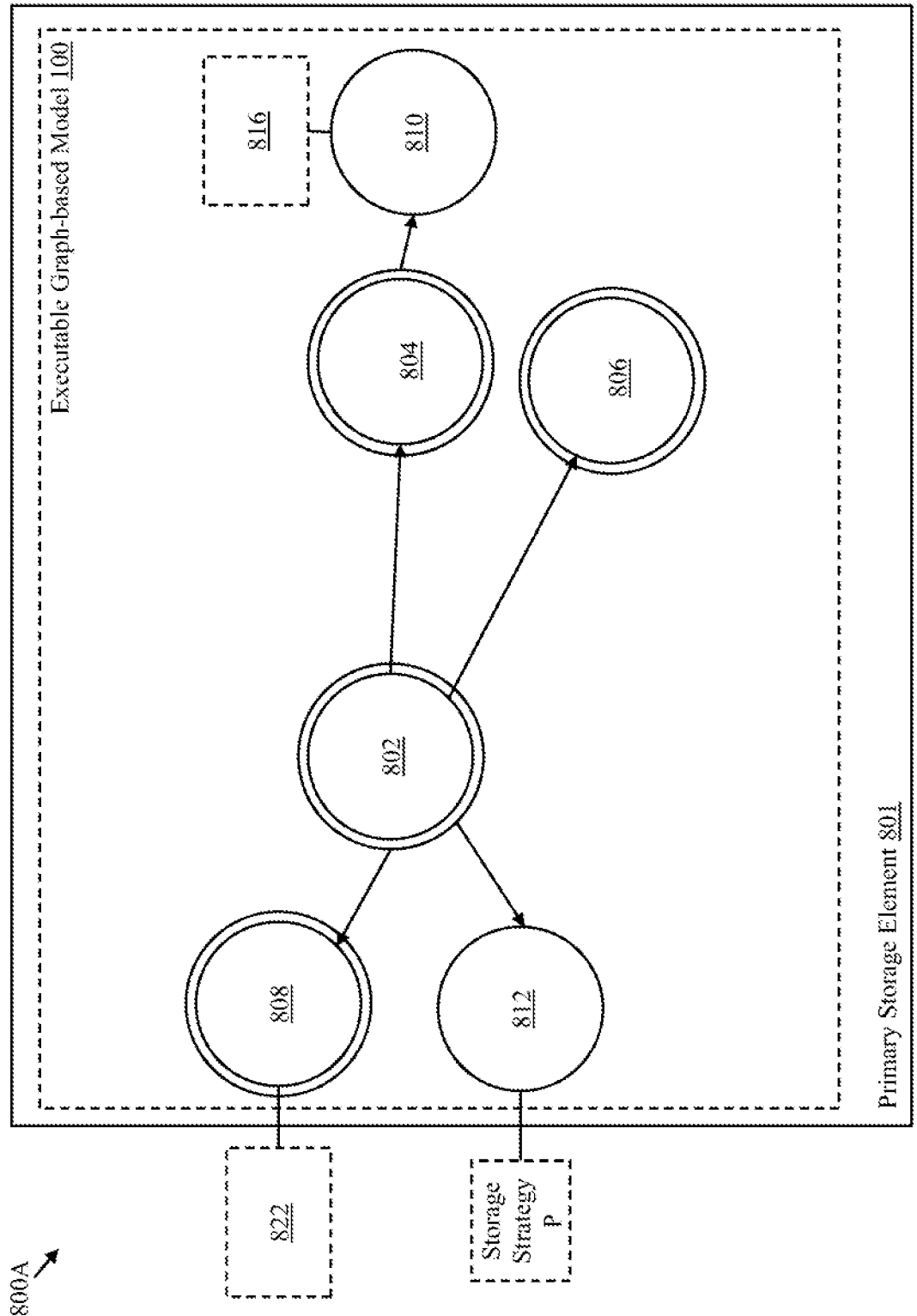
FIGS. 8A and 8B illustrate schematic diagrams that, collectively, depict data splintering at the attribute level, in accordance with another embodiment of the present disclosure.
Figure 8B:
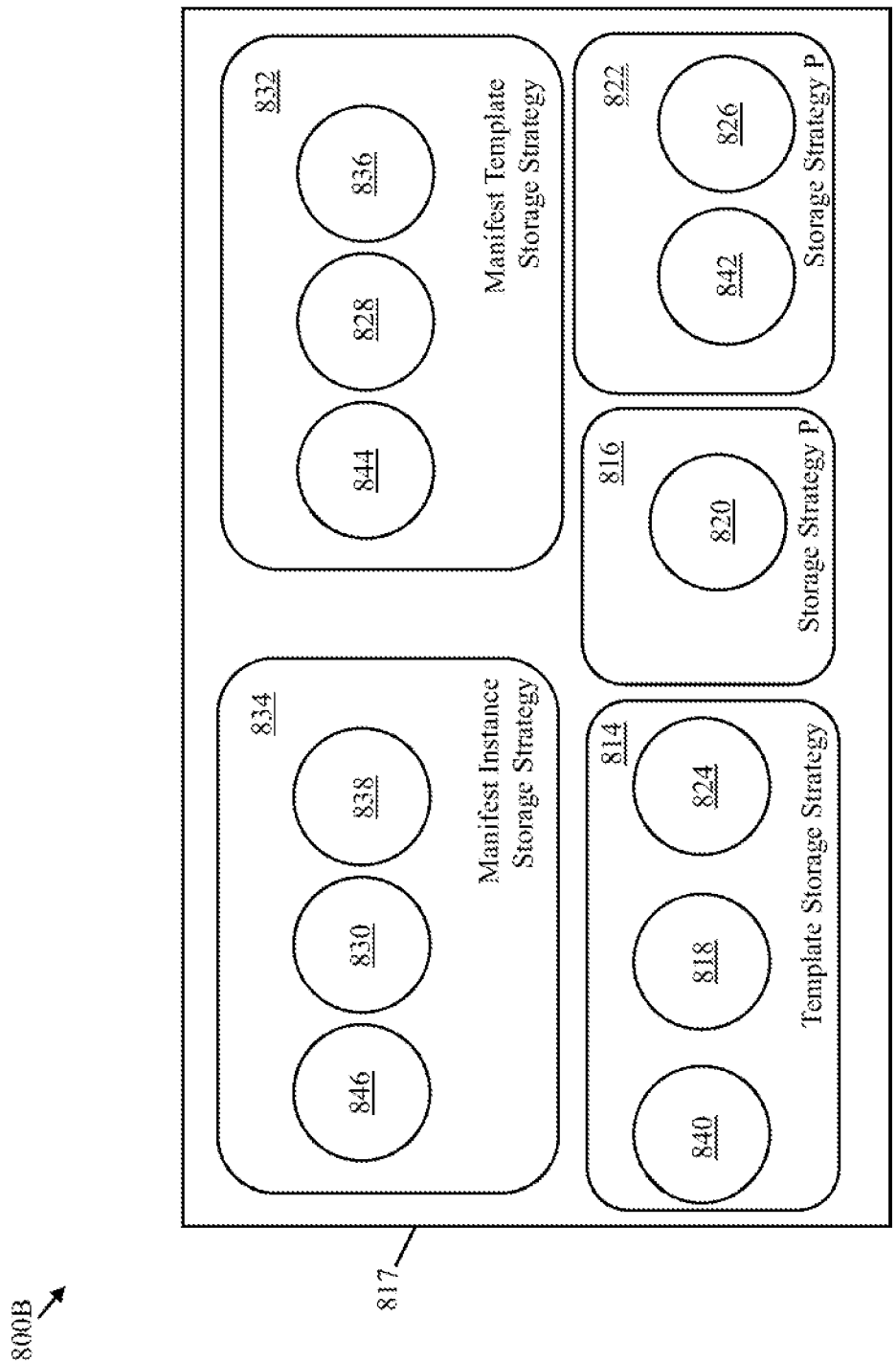

FIGS. 8A and 8B illustrate schematic diagrams 800A and 800B, respectively, that, collectively, depict data splintering at the attribute level, in accordance with another embodiment of the disclosure. Referring to FIG. 8A, the executable graph-based model 100 is shown to be stored in a primary storage element 801 of the overlay system 202. The executable graph-based model 100 is shown to include a node 802. The node 802 may be a run-time node and hence hereinafter, is referred to as the run-time node 802.

The run-time node 802 may store data that may be sensitive and confidential. Therefore, the processing circuitry (such as the controller module 206, the stimuli management module 212, or the like) may be configured to receive a fifth stimulus indicative of (i) a third data splintering instruction that may be indicative of an instruction/command to execute operations to divide the run-time node 802 to create a plurality of splinters and (ii) a plurality of storage locations where the plurality of splinters of the run-time node 802 are to be stored. The third data splintering instruction may be further indicative of storage strategies using which the splinters of the run-time node 802 are to be stored. The third data splintering instruction may be further indicative of security techniques using which the splinters of the run-time node 802 are to be secured. Also, the third data splintering instruction may be indicative of the attribute level splintering to be performed for creating the splinters of the run-time node 802.

Based on a fifth context of the fifth stimulus, the processing circuitry (such as the data splintering management module 242) may be configured to identify, in the executable graph-based model 100, the run-time node 802 that is required for processing the fifth stimulus. Subsequently, based on the fifth stimulus, the processing circuitry (such as the data splintering management module 242) may be configured to execute a third data splintering operation on the run-time node 802. The third data splintering operation may be executed to divide the run-time node 802 into a plurality of splinters. The plurality of splinters include attribute data and attribute data structure associated with each attribute value of a plurality of attribute values for a plurality of attributes of the run-time node 802. Since the splintering level indicated by the fifth stimulus is the attribute level splintering, the processing circuitry (such as the data splintering management module 242) may be configured to store the plurality of attribute values for the plurality of attributes associated with the run-time node 802 in a plurality of attribute vertex nodes 804-806. Such storage of the plurality of attribute values in the attribute vertex nodes 804-806 divides the run-time node 802 by separating each attribute value from remaining attribute values. Each of the plurality of attribute vertex nodes 804-806 may correspond to a run-time node and hence, includes attribute data structure (i.e., a node template) and attribute data (i.e., a node instance). As mentioned previously, each run-time node includes a node template and a node instance, where the node template is a predefined data structure, and the node instance corresponds to an implementation of the node template.

Based on the fifth stimulus, the processing circuitry (such as the overlay management module 216 and the data splintering management module 242) may be configured to instantiate location overlay nodes 808 and 810, and a storage strategy overlay node 812 in the executable graph-based model 100. The location overlay nodes 808 and 810 and the storage strategy overlay node 812 may also correspond to run-time nodes. Subsequently, the processing circuitry (such as the overlay management module 216 and the data splintering management module 242) may be configured to associate (i) the location overlay node 808 and the storage strategy overlay node 812 with the run-time node 802, and (ii) the location overlay node 810 with the attribute vertex node 804.

The processing circuitry (such as the controller module 206, the memory management module 218, and the storage management module 220) may be configured to store a node template (attribute data structure) of attribute vertex node 804 is stored in a template storage 814 (shown in FIG. 8B) of the overlay system 202. Based on the association with the location overlay node 810, a node instance portion (attribute data) of the attribute vertex node 804 is stored in an auxiliary storage element 816 (shown in FIG. 8B) of the overlay system 202. Further, as the attribute vertex node 804 is not tightly coupled with a storage strategy overlay node, the attribute vertex node 804 is assumed to be loosely coupled with the storage strategy overlay node 812 of the run-time node 802 that logically includes the attribute vertex node 804. Therefore, the instance portion of the attribute vertex node 804 is stored using a storage strategy P indicated by the storage strategy overlay node 812. Additionally, the template portion of the attribute vertex node 804 is stored using a template storage strategy determined by the processing circuitry (such as the controller module 206, the memory management module 218, and the storage management module 220). Notably, the location overlay node 808 and the storage strategy overlay node 812 are assumed to be associated with node instances of the run-time node 802. Similarly, the location overlay node 810 is assumed to be associated with node instance of the attribute vertex node 804. Further, storage locations, storage strategies, and security techniques for the node templates of the run-time node 802 and the attribute vertex nodes 804 and 806 are determined by the processing circuitry (such as the controller module 206, the memory management module 218, and the storage management module 220).

Referring to FIG. 8B, shown is a splinter storage record 817 for the run-time node 802. Notably, the plurality of splinters of the run-time node 802 also include the location overlay nodes 808 and 810 and the storage strategy overlay node 812. For the sake of brevity, node template states, node instance states, node manifest template states, and node manifest instance states associated with the location overlay nodes 808 and 810 and the storage strategy overlay node 812 are not depicted in FIG. 8B. It will be apparent to a person skilled in the art that storage and retrieval of each splinter of the run-time node 802 is performed in a similar manner.

For storing the node template of the attribute vertex node 804, an attribute vertex node template state 818 is created by the processing circuitry (such as the memory management module 218 and the storage management module 220). The processing circuitry (such as the memory management module 218 and the storage management module 220) may store the attribute vertex node template state 818 in the template storage 814. For storing the node instance of the attribute vertex node 804, an attribute vertex node instance state 820 is created by the processing circuitry (such as the memory management module 218 and the storage management module 220). The processing circuitry (such as the memory management module 218 and the storage management module 220) may store the attribute vertex node instance state 820 is stored in the auxiliary storage element 816. The attribute vertex node template state 818 is stored using the template storage strategy determined by the processing circuitry, whereas the attribute vertex node instance state 820 is stored using the storage strategy P indicated by the storage strategy overlay node 812. Notably, the attribute vertex node template state 818 includes information to re-create the node template of the attribute vertex node 804, whereas, the attribute vertex node instance state 820 includes information to re-create the node instance of the attribute vertex node 804. The attribute vertex node instance state 820 further includes a reference (in the form of an identifier that is common to the attribute vertex node template state 818 and the attribute vertex node instance state 820) to the attribute vertex node template state 818. The attribute vertex node template state 818 is loaded via the reference included in the attribute vertex node instance state 820. The attribute vertex node template state 818 is loaded prior to the attribute vertex node instance state 820.

Similarly, a node template of the attribute vertex node 806 is stored in the template storage 814 associated with the node template of the location overlay node 808, whereas, a node instance of the attribute vertex node 806 is stored in an auxiliary storage element 822 associated with the location overlay node 808. The node template of the attribute vertex node 806 is stored using the template storage strategy determined by the processing circuitry (such as the memory management module 218 and the storage management module 220) whereas, the node instance of the attribute vertex node 806 is stored using the storage strategy P indicated by the storage strategy overlay node 812.

For storing the node template of the attribute vertex node 806, an attribute vertex node template state 824 is created by the processing circuitry (such as the memory management module 218 and the storage management module 220). The processing circuitry (such as the memory management module 218 and the storage management module 220) may store the attribute vertex node template state 824 in the template storage 814. For storing the node instance of the attribute vertex node 804, an attribute vertex node instance state 826 is created by the processing circuitry (such as the memory management module 218 and the storage management module 220). The processing circuitry (such as the memory management module 218 and the storage management module 220) may store the attribute vertex node instance state 826 in the auxiliary storage element 822. The attribute vertex node template state 824 is stored using the template storage strategy determined by the processing circuitry (such as the memory management module 218 and the storage management module 220), whereas the attribute vertex node instance state 826 is stored using the storage strategy P indicated by the storage strategy overlay node 812. Notably, the attribute vertex node template state 824 includes information to re-create the node template of the attribute vertex node 806 whereas, the attribute vertex node instance state 826 includes information to re-create the node instance of the attribute vertex node 806. The attribute vertex node instance state 826 includes a reference (in the form of an identifier that is common to the attribute vertex node template state 824 and the attribute vertex node instance state 826) to the attribute vertex node template state 824. The attribute vertex node template state 824 gets loaded via the reference included in the attribute vertex node instance state 826.

For the attribute vertex node 804, the processing circuitry (such as the memory management module 218 and the storage management module 220) may be configured to create a first attribute vertex node manifest. The first attribute vertex node manifest may include a first attribute vertex node manifest template and a first attribute vertex node manifest instance. The first attribute vertex node manifest template includes storage location of the attribute vertex node template state 818. The first attribute vertex node manifest instance includes storage location of the attribute vertex node instance state 820. Subsequently, the processing circuitry (such as the memory management module 218 and the storage management module 220) may be configured to create an attribute vertex node manifest template state 828 for the first attribute vertex node manifest template, and an attribute vertex node manifest instance state 830 for the first attribute vertex node manifest instance. The attribute vertex node manifest template state 828 includes information to re-create the first attribute vertex node manifest template. The attribute vertex node manifest instance state 830 includes information to re-create the first attribute vertex node manifest instance. The attribute vertex node manifest instance state 830 further includes a reference to the attribute vertex node manifest template state 828. The attribute vertex node manifest template state 828 is stored in a manifest template storage 832 using a manifest template storage strategy. The attribute vertex node manifest instance state 830 is stored in a manifest instance storage 834 using a manifest instance storage strategy.

Similarly, for the attribute vertex node 806, the processing circuitry (such as the memory management module 218 and the storage management module 220) may create a second attribute vertex node manifest that may include a second attribute vertex node manifest template and a second attribute vertex node manifest instance. The second attribute vertex node manifest template includes storage location of the attribute vertex node template state 824. The second attribute vertex node manifest instance includes storage location of the attribute vertex node instance state 826 and a reference to the attribute vertex node template state 824. Subsequently, the processing circuitry (such as the memory management module 218 and the storage management module 220) may create an attribute vertex node manifest template state 836 for the second attribute vertex node manifest template and an attribute vertex node manifest instance state 838 for the second attribute vertex node manifest instance. The attribute vertex node manifest template state 836 includes information to re-create the second attribute vertex node manifest template. The attribute vertex node manifest instance state 838 includes information to re-create the second attribute vertex node manifest instance and a reference to the attribute vertex node manifest template state 836. The attribute vertex node manifest template state 836 is stored in the manifest template storage 832 using the manifest template storage strategy. The attribute vertex node manifest instance state 838 is stored in the manifest instance storage 834 using the manifest instance storage strategy.

Subsequently, the processing circuitry (such as the memory management module 218 and the storage management module 220) may create a node state of the node 702. The node state includes storage information associated with the plurality of splinters of the run-time node 802 and hierarchical data associated with the plurality of splinters. The node state may include a node template state 840 and a node instance state 842. As shown, the node template state 840 is stored in the template storage 814 using the template storage strategy. The node instance state 842 is stored in the auxiliary storage element 822 indicated by the location overlay node 808 by way of the storage strategy P indicated by the storage strategy overlay node 812. The node template state 840 includes storage information associated with the attribute vertex node manifest template states 828 and 836 and the node instance state 842 includes storage information associated with the attribute vertex node manifest instance states 830 and 838. The processing circuitry (such as the memory management module 218 and the storage management module 220) may further create a node manifest for the node state of the node 702. The node manifest includes a node manifest template and a node manifest instance. The node manifest template includes the storage information associated with the attribute vertex node manifest template states 828 and 836 whereas, the node manifest instance includes the storage information associated with the attribute vertex node manifest instance states 830 and 838.

Subsequently, the processing circuitry (such as the memory management module 218 and the storage management module 220) may create a node manifest template state 844 and a node manifest instance state 846. The node manifest template state 844 is stored in the manifest template storage 832 and the node manifest instance state 846 is stored in the manifest instance storage 834. Thus, the data splintering operation for performing the data splintering of the run-time node 802 is executed.

In an instance, the hierarchical data for the run-time node 802 may include a manifest template graph and a manifest instance graph. The manifest template graph may include manifests of the node templates of the run-time node 802 and the plurality of splinters thereof whereas, the manifest instance graph may include manifests of the node instances of the run-time node 802 and the plurality of splinters thereof. The node manifest template graph may be used to re-create the node templates of the run-time node 802 and the plurality of splinters thereof. The node manifest instance graph may be used to re-create the node instances of the run-time node 802 and the plurality of splinters thereof.

In an instance, when the run-time node 802 is required to be accessed, the run-time node 802 may be re-formed using the plurality of splinters as described in conjunction with FIGS. 5, 6A-6B, and 7A-7C.

Figure 9A:
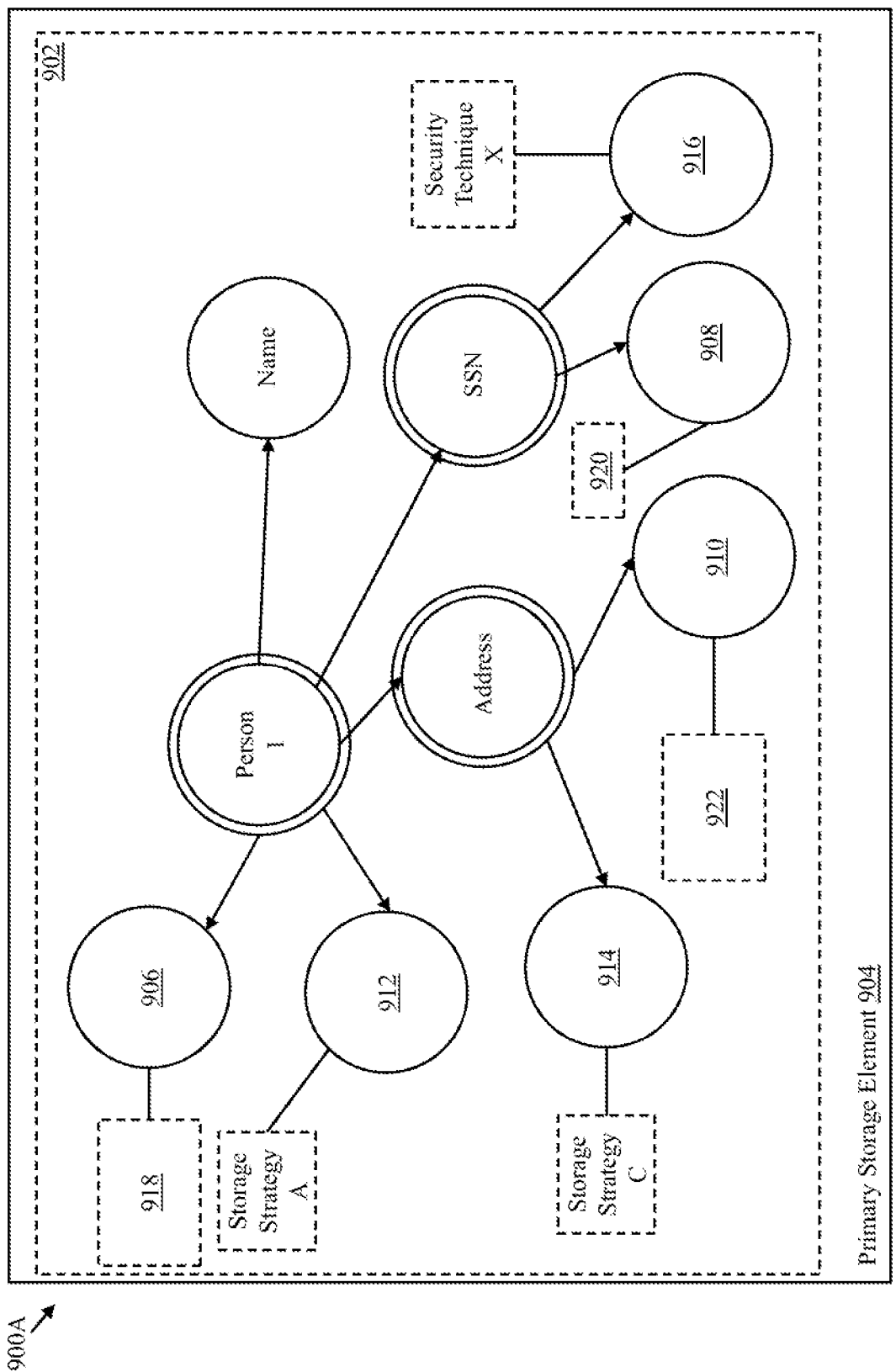
FIGS. 9A and 9B, are schematic diagrams that, collectively, illustrate an example implementation of the overlay system, in accordance with an embodiment of the present disclosure.
Figure 9B:
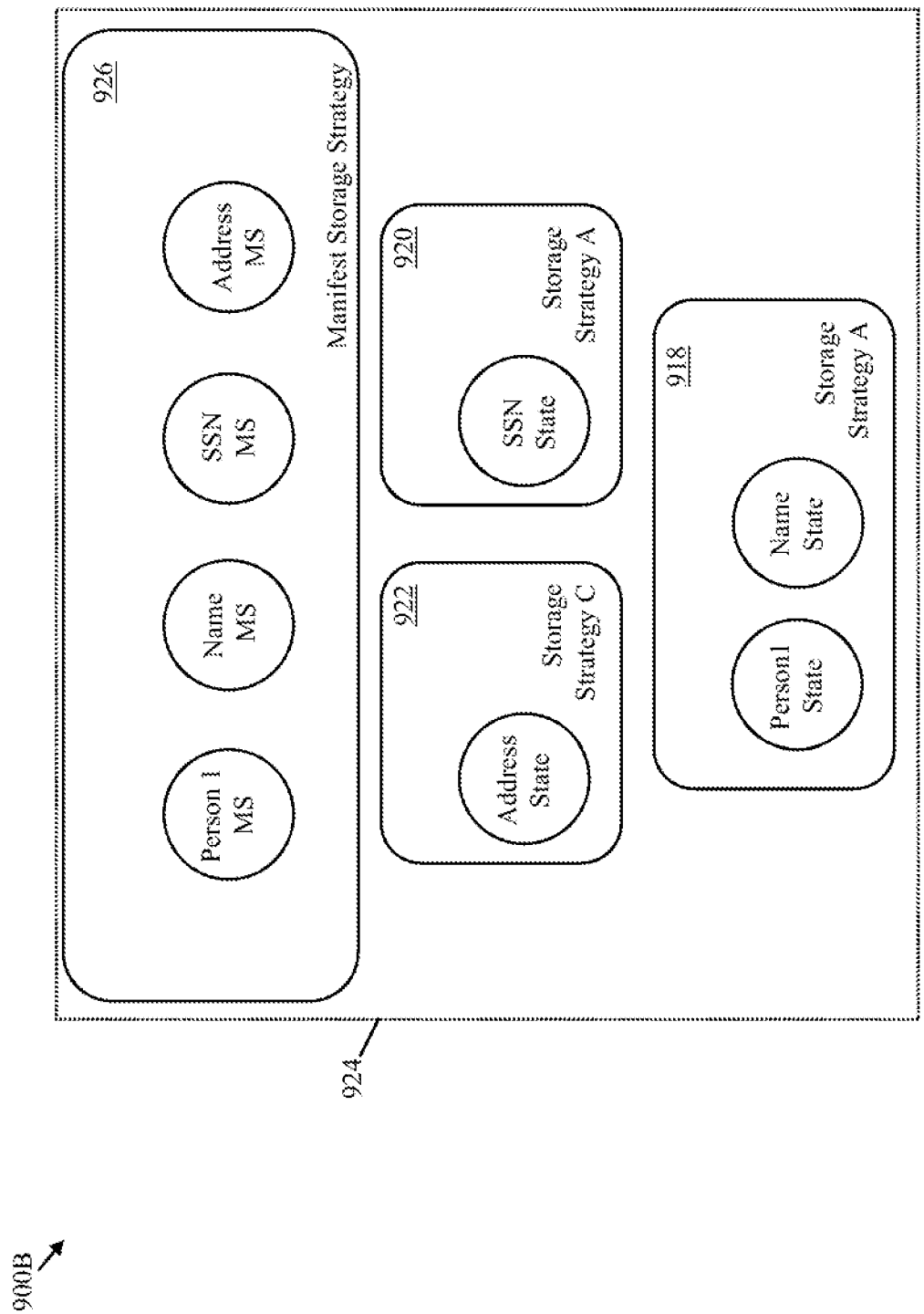

FIGS. 9A and 9B, are schematic diagrams 900A and 900B, respectively, that, collectively, illustrate an example implementation of the overlay system 202, in accordance with an embodiment of the present disclosure. Referring to FIG. 9A, the overlay system 202 is used to implement a user management overlay graph for a fintech platform. The user management overlay graph is implemented in the form of a user executable graph-based model 902 (hereinafter, a "user model 902") that includes data associated with a plurality of users of the fintech platform. The user model 902 is stored in the primary storage element (hereinafter, the "primary storage element 904") of the overlay system 202. For the sake of simplicity, data associated with a single user of the fintech platform is shown in the FIGS. 9A and 9B.

The user model 902 includes a node 'Person 1' that stores data associated with a first user of the fintech platform. The data associated with the first user may be stored in the form of a plurality of attribute values of a plurality of attributes of the node 'Person 1'. The plurality of attributes of the node 'Person 1' may include attributes 'Name', 'Social Security Number (SSN)', and 'Address'.

The data associated with the first user includes PII data, and hence, the node 'Person 1' is required to be secured to protect the data associated with the first user. In order to protect the data associated with the first user, the node 'Person 1' may be splintered based on a sixth stimulus received from an administrator of the user management overlay graph. The sixth stimulus is indicative of (i) a fourth data splintering instruction that may be indicative of an instruction/command to execute operations to divide the node 'Person 1' to create a plurality of splinters and (ii) a plurality of storage locations where the plurality of splinters of the node 'Person 1' are to be stored. The sixth data splintering instruction may be further indicative of one or more storage strategies using which one or more splinters of the plurality of splinters of the node 'Person 1' are to be stored, and security techniques using which a set of splinters of the plurality of splinters are to be secured. Also, the fourth data splintering instruction may be indicative of the attribute level splintering to be performed for creating the splinters of the node 'Person 1'.

Based on a sixth context of the sixth stimulus, the processing circuitry (for example, the data splintering management module 242) may be configured to identify the node 'Person 1' in the user model 902 that is required for processing the sixth stimulus. Subsequently, based on the sixth stimulus, the processing circuitry (for example, the data splintering management module 242) may be configured to execute a fourth data splintering operation on the node 'Person 1' to divide the node 'Person 1' into the plurality of splinters. Since the splintering level indicated by the sixth stimulus is the attribute level splintering, the processing circuitry (such as the data splintering management module 242) may be configured to store the plurality of attribute values for the plurality of attributes of the node 'Person 1' in a plurality of attribute vertex nodes 'Name', 'SSN', and 'Address'. The attribute vertex nodes 'Name', 'SSN', and 'Address' are associated with the node 'Person 1' via corresponding attribute connections.

Based on the sixth stimulus, the processing circuitry (such as the overlay management module 216 and the data splintering management module 242) may be configured to instantiate location overlay nodes 906, 908, and 910. The processing circuitry (such as the overlay management module 216 and the data splintering management module 242) may be further configured to instantiate additional overlay nodes such as storage strategy overlay nodes 912 and 914 and a security overlay node 916. Further, based on the sixth stimulus, the processing circuitry (such as the overlay management module 216 and the data splintering management module 242) may be configured to associate the location overlay nodes 906-910 with the node 'Person 1' and the attribute vertex nodes 'SSN' and 'Address', respectively. The location overlay node 906 is indicative of an auxiliary storage element 918 which is a default storage location for the node 'Person 1'. The location overlay node 908 is indicative of an auxiliary storage element 920 where the attribute vertex node 'SSN' is to be stored, whereas, the location overlay node 910 is indicative of an auxiliary storage element 922 where the attribute vertex node 'Address' is to be stored.

Additionally, the processing circuitry (such as the overlay management module 216 and the data splintering management module 242) may be configured to associate the storage strategy overlay nodes 912 and 914 with the node 'Person 1' and the attribute vertex node 'Address', respectively. The storage strategy overlay node 912 may be indicative of a storage strategy A that is a default storage strategy using which the node 'Person 1' is to be stored. The storage strategy overlay node 914 may be indicative of a storage strategy C using which the attribute vertex node 'Address' is to be stored. Additionally, the processing circuitry (such as the overlay management module 216 and the data splintering management module 242) may be configured to associate the security overlay node 916 with the attribute vertex node 'SSN'. The security overlay node 916 is indicative of a security technique X using which the attribute vertex node 'SSN' is to be secured.

Subsequently, the processing circuitry (such as the memory management module 218 and the storage management module 220) may store the plurality of splinters of the node 'Person 1' in accordance with a location overlay node and/or additional overlay nodes associated therewith.

Referring to FIG. 9B, shown is a splinter storage record 924 which is maintained by the processing circuitry (such as the data splintering management module 242). Notably, the processing circuitry (such as the memory management module 218 and the storage management module 220) may generate a state for the node 'Person 1' and the plurality of splinters thereof. Subsequently, for each of the states of the node 'Person 1' and the plurality of splinters thereof, the processing circuitry (such as the memory management module 218 and the storage management module 220) may generate a manifest that stores storage information associated with the corresponding state. For the manifests of the states of the node 'Person 1' and the plurality of splinters thereof, the processing circuitry (such as the memory management module 218 and the storage management module 220) may be configured to generate corresponding manifest states, where each manifest state stores information to re-create corresponding manifest.

The processing circuitry (such as the memory management module 218 and the storage management module 220) may be configured to generate attribute vertex node states for each of the plurality of attribute vertex nodes 'Name', 'SSN', and 'Address'. That is to say that, the processing circuitry may generate attribute vertex node states 'Name State', 'SSN State', and 'Address State' for the attribute vertex nodes 'Name', 'SSN', and 'Address', respectively. The attribute vertex node states 'Name State', 'SSN State', and 'Address State' may include information that is required to re-create the attribute vertex nodes 'Name', 'SSN', and 'Address', respectively Subsequently, since the attribute vertex node 'Name' does not have an associated location overlay node and storage strategy overlay node, the processing circuitry (such as the memory management module 218 and the storage management module 220) may be configured to store the attribute vertex node state 'Name State' in the auxiliary storage element 918 using the storage strategy A, which are the default storage location and the default storage strategy for the node 'Person 1'. Subsequently, a name manifest is created for the attribute vertex node state 'Name State', where the name manifest includes storage information of the attribute vertex node state 'Name State'. The storage information of the attribute vertex node state 'Name State' may be indicative of a storage location (such as a directory, a file name, a logical address, or the like) in the auxiliary storage element 918. The processing circuitry (such as the memory management module 218 and the storage management module 220) may be configured to generate a manifest state (MS) 'Name MS' for the name manifest, and store the manifest state 'Name MS' in a manifest storage 926 using a manifest storage strategy. Notably, different manifest states may be stored in the manifest storage 926 by way of similar or different manifest storage strategies.

Similarly, since the attribute vertex node 'SSN' is associated with the location overlay node 908, the processing circuitry (such as the memory management module 218 and the storage management module 220) may be configured to store the attribute vertex node state 'SSN State' in the auxiliary storage element 920 indicated by the location overlay node 908. Additionally, since the attribute vertex node 'SSN' is not associated with a storage strategy overlay node, the storage strategy A, associated with the storage strategy overlay node 912 associated with the node 'Person 1', is used to store the attribute vertex node state 'SSN State'. Further, since the attribute vertex node 'SSN' is associated with the security overlay node 916, the attribute vertex node state 'SSN State' is secured by way of the security technique X associated with the security overlay node 916. Subsequently, an SSN manifest is created for the attribute vertex node state 'SSN State', where the SSN manifest includes storage information of the attribute vertex node state 'SSN State'. The storage information of the attribute vertex node state 'SSN State' may be indicative of a storage location (such as a directory, a file name, a logical address, or the like) in the auxiliary storage element 920. The processing circuitry (such as the memory management module 218 and the storage management module 220) may be configured to generate a manifest state 'SSN MS' for the SSN manifest and store the manifest state 'SSN MS' in the manifest storage 926 using the manifest storage strategy.

Additionally, since the attribute vertex node 'Address' is associated with the location overlay node 910, the processing circuitry (such as the memory management module 218 and the storage management module 220) may be configured to store the attribute vertex node state 'Address State' in the auxiliary storage element 922 indicated by the location overlay node 910. Since the attribute vertex node 'Address' is associated with the storage strategy overlay node 914, the storage strategy C, associated with the storage strategy overlay node 914, is used to store the attribute vertex node state 'Address State'. Subsequently, an address manifest is created for the attribute vertex node state 'Address State', where the address manifest includes storage information of the attribute vertex node state 'Address State'. The storage information of the attribute vertex node state 'Address' may be indicative of a storage location (such as a directory, a file name, a logical address, or the like) in the auxiliary storage element 922. The processing circuitry (such as the memory management module 218 and the storage management module 220) may be configured to generate a manifest state 'Address MS' for the address manifest and store the manifest state 'Address MS' in the manifest storage 926 using the manifest storage strategy.

Moreover, the processing circuitry (such as the memory management module 218 and the storage management module 220) may be configured to create a node state 'Person 1 State' for the node 'Person 1'. The node state 'Person 1 State' may include the storage location of the manifest states 'Name MS', 'SSN MS', and 'Address MS'. The node state 'Person 1 State' may also include hierarchical data associated with the plurality of splinters of the node 'Person 1'. Subsequently, the processing circuitry (such as the memory management module 218 and the storage management module 220) may be configured to create a person node manifest for the node state 'Person 1 State'. The person node manifest includes the storage location of the node state 'Person 1 State'. Subsequently, the processing circuitry (such as the memory management module 218 and the storage management module 220) may be configured to generate a node manifest state 'Person 1 MS' for the person node manifest. The node manifest state 'Person 1 MS' includes information to re-create the person node manifest. The processing circuitry (such as the memory management module 218 and the storage management module 220) may be configured to store the node manifest state 'Person 1 MS' in the manifest storage 926 using the manifest storage strategy.

Additionally, the manifest states 'Name MS', 'SSN MS', 'Address MS', and the 'Person 1 MS' are stored in the manifest storage 926 by way of the manifest storage strategy that is determined by the processing circuitry (such as the memory management module 218 and the storage management module 220). Thus, data splintering of data associated with the first user of the fintech platform is executed.

Notably, in order to access the data associated with the first user numerous data retrieval operations, data processing operations, data decryptions, or the like, are to be executed. Therefore, it becomes significantly difficult to access the data. Additionally, time-sensitive data (such as time-sensitive messages) also gets significant security enhancement as an unauthorized retrieval of such data becomes excessively time-consuming and complex. Therefore, the overlay system 202 provides a robust solution for protecting the data.

Figure 10:
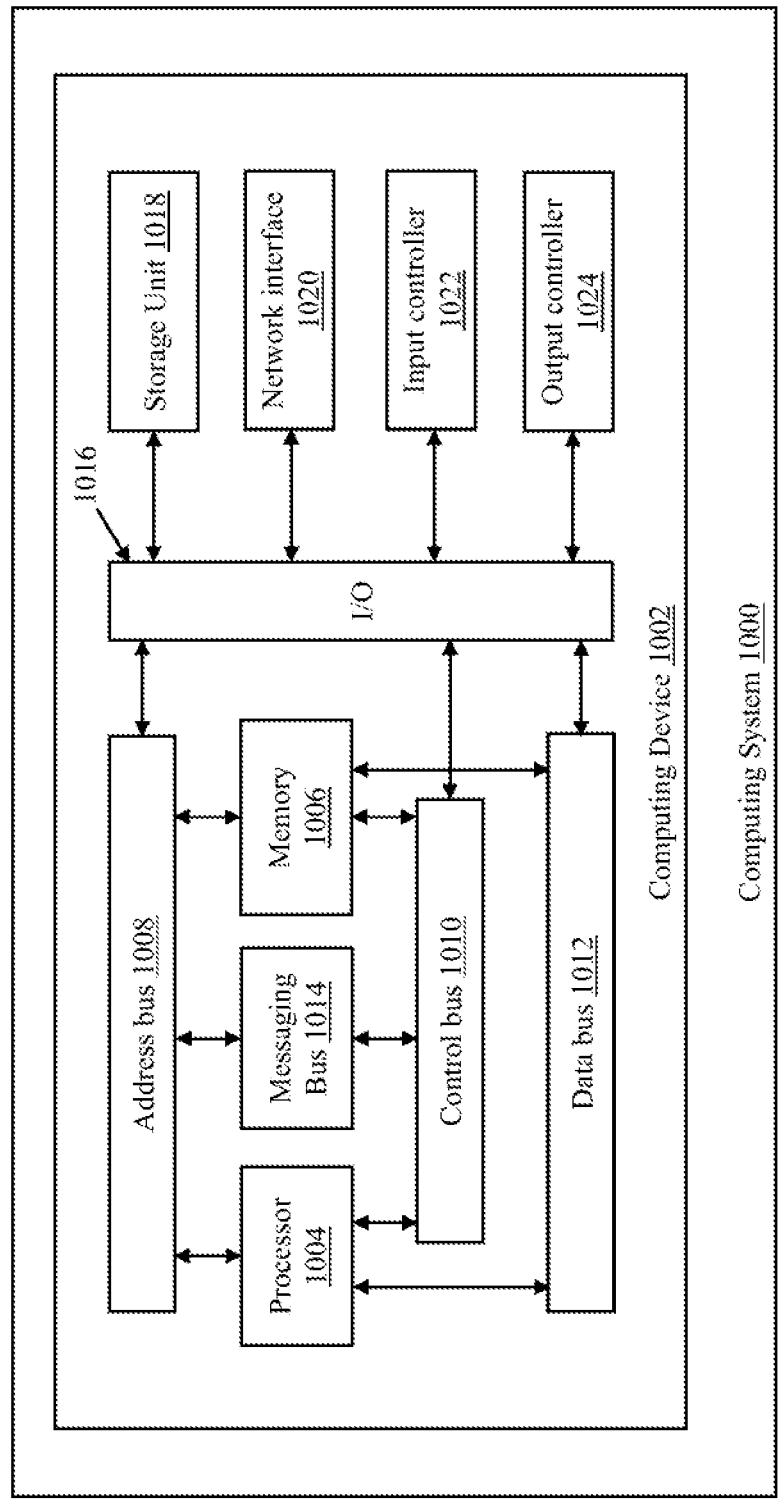
FIG. 10 shows an example computing system for carrying out methods of the present disclosure, in accordance with an embodiment of the present disclosure.

FIG. 10 shows an example computing system 1000 for carrying out the methods of the present disclosure, in accordance with an embodiment of the present disclosure. Specifically, FIG. 10 shows a block diagram of an embodiment of the computing system 1000 according to example embodiments of the present disclosure.

The computing system 1000 may be configured to perform any of the operations disclosed herein, such as for example, any of the operations discussed with reference to the functional modules described in relation to FIG. 2. The computing system 1000 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1000 is a distributed system configured to function using multiple computing machines interconnected via a data network or bus system.

The computing system 1000 includes computing devices (such as a computing device 1002). The computing device 1002 includes one or more processors (such as a processor 1004) and a memory 1006. The processor 1004 may be any general-purpose processor(s) configured to execute a set of instructions. For example, the processor 1004 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 1004 may be multiple processing units, a single processing core, multiple processing cores, special purpose processing cores, co-processors, or any combination thereof. The processor 1004 may be communicatively coupled to the memory 1006 via an address bus 1008, a control bus 1010, a data bus 1012, and a messaging bus 1014.

The memory 1006 may include non-volatile memories such as a read-only memory (ROM), a programmable read-only memory (PROM), an erasable programmable read-only memory (EPROM), a flash memory, or any other device capable of storing program instructions or data with or without applied power. The memory 1006 may also include volatile memories, such as a random-access memory (RAM), a static random-access memory (SRAM), a dynamic random-access memory (DRAM), and a synchronous dynamic random-access memory (SDRAM). The memory 1006 may include single or multiple memory modules. While the memory 1006 is depicted as part of the computing device 1002, a person skilled in the art will recognize that the memory 1006 can be separate from the computing device 1002.

The memory 1006 may store information that can be accessed by the processor 1004. For instance, the memory 1006 (e.g., one or more non-transitory computer-readable storage mediums, memory devices) may include computer-readable instructions (not shown) that can be executed by the processor 1004. The computer-readable instructions may be software written in any suitable programming language or may be implemented in hardware. Additionally, or alternatively, the computer-readable instructions may be executed in logically and/or virtually separate threads on the processor 1004. For example, the memory 1006 may store instructions (not shown) that when executed by the processor 1004 cause the processor 1004 to perform operations such as any of the operations and functions for which the computing system 1000 is configured, as described herein. Additionally, or alternatively, the memory 1006 may store data (not shown) that can be obtained, received, accessed, written, manipulated, created, and/or stored. The data can include, for instance, the data and/or information described herein in relation to FIGS. 1-9B. In some implementations, the computing device 1002 may obtain from and/or store data in one or more memory device(s) that are remote from the computing system 1000.

The computing device 1002 may further include an input/output (I/O) interface 1016 communicatively coupled to the address bus 1008, the control bus 1010, and the data bus 1012. The data bus 1012 and messaging bus 1014 may include a plurality of tunnels that may support parallel execution of messages by the overlay system 202. The I/O interface 1016 is configured to couple to one or more external devices (e.g., to receive and send data from/to one or more external devices). Such external devices, along with the various internal devices, may also be known as peripheral devices. The I/O interface 1016 may include both electrical and physical connections for operably coupling the various peripheral devices to the computing device 1002. The I/O interface 1016 may be configured to communicate data, addresses, and control signals between the peripheral devices and the computing device 1002. The I/O interface 1016 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, or the like. The I/O interface 1016 is configured to implement only one interface or bus technology. Alternatively, the I/O interface 1016 is configured to implement multiple interfaces or bus technologies. The I/O interface 1016 may include one or more buffers for buffering transmissions between one or more external devices, internal devices, the computing device 1002, or the processor 1004. The I/O interface 1016 may couple the computing device 1002 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1016 may couple the computing device 1002 to various output devices, including video displays, speakers, printers, projectors, tactile feedback devices, automation control, robotic components, actuators, motors, fans, solenoids, valves, pumps, transmitters, signal emitters, lights, and so forth.

The computing system 1000 may further include a storage unit 1018, a network interface 1020, an input controller 1022, and an output controller 1024. The storage unit 1018, the network interface 1020, the input controller 1022, and the output controller 1024 are communicatively coupled to the central control unit (e.g., the memory 1006, the address bus 1008, the control bus 1010, and the data bus 1012) via the I/O interface 1016. The network interface 1020 communicatively couples the computing system 1000 to one or more networks such as wide area networks (WAN), local area networks (LAN), intranets, the Internet, wireless access networks, wired networks, mobile networks, telephone networks, optical networks, or combinations thereof. The network interface 1020 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 1018 is a computer-readable medium, preferably a non-transitory computer-readable medium, comprising one or more programs, the one or more programs comprising instructions which when executed by the processor 1004 cause the computing system 1000 to perform the method steps of the present disclosure. Alternatively, the storage unit 1018 is a transitory computer-readable medium. The storage unit 1018 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 1018 stores one or more operating systems, application programs, program modules, data, or any other information. The storage unit 1018 is part of the computing device 1002. Alternatively, the storage unit 1018 is part of one or more other computing machines that are in communication with the computing device 1002, such as servers, database servers, cloud storage, network attached storage, and so forth.

The input controller 1022 may include suitable logic, circuitry, interfaces, and/or code, executable by the circuitry, that may be configured to control one or more input devices that may be configured to receive an input (the stimulus 230) for the overlay system 202. The output controller 1024 may include suitable logic, circuitry, interfaces, and/or code, executable by the circuitry, that may be configured to control one or more output devices that may be configured to render/output the outcome of the operation executed to process the received input (the stimulus 230).

Figure 11:
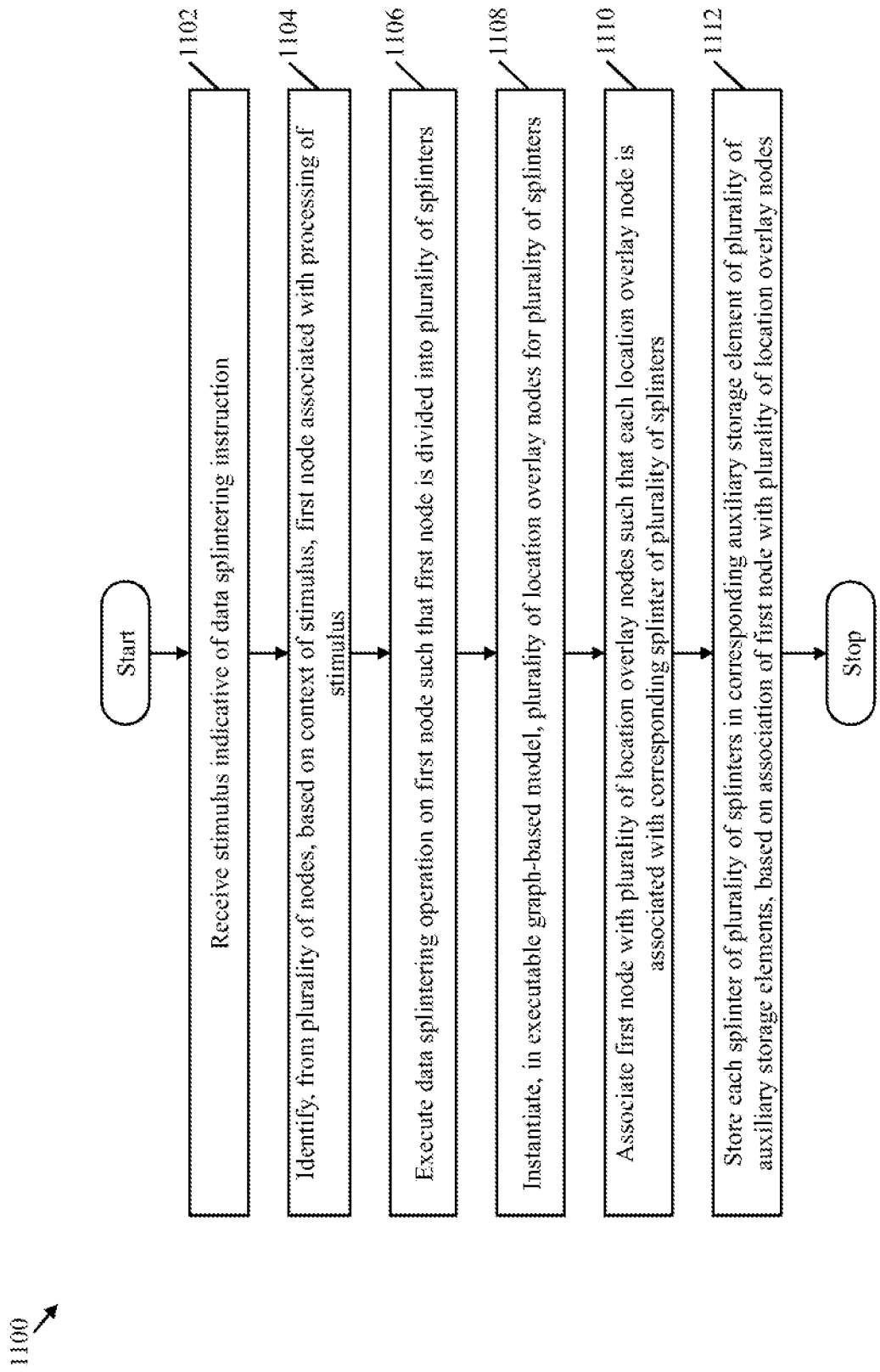
FIG. 11 is a flowchart that illustrates a method for facilitating data splintering in the executable graph-based model, in accordance with an embodiment of the present disclosure.

FIG. 11 is a flowchart 1100 that illustrates a method for facilitating data splintering in the executable graph-based model 100, in accordance with an embodiment of the present disclosure. Referring to FIG. 11, at 1102, a stimulus is received. The processing circuitry (such as the controller module 206 and the stimuli management module 212) receives the stimulus that is indicative of a data splintering instruction. The data splintering instruction is indicative of a command to execute one or more operations to divide a node into the plurality of splinters, where each splinter corresponds to a unit of the node that is separate from the remaining splinters.

At 1104, a first node (e.g., the node 302, the run-time node 336, or the like) that is associated with processing of the stimulus is identified, from the plurality of nodes of the executable graph-based model 100, based on a context of the stimulus. The processing circuitry (such as the controller module 206 and the context module 210) may identify the first node from the plurality of nodes of the executable graph-based model 100. At 1106, the data splintering operation is executed on the first node such that the first node is divided into a plurality of splinters. The processing circuitry (such as the data splintering management module 242) may execute the data splintering operation. At 1108, a plurality of location overlay nodes for the plurality of splinters are instantiated in the executable graph-based model 100. Each location overlay node, of the plurality of location overlay nodes, is indicative of an auxiliary storage element of the plurality of auxiliary storage elements. The processing circuitry (such as the overlay management module 216) may instantiate the plurality of location overlay nodes in the executable graph-based model 100.

At 1110, the first node is associated with the plurality of location overlay nodes such that each location overlay node is associated with a corresponding splinter of the plurality of splinters. The processing circuitry (such as the overlay management module 216) may associate the first node with the plurality of location overlay nodes. At 1112, each splinter of the plurality of splinters is stored in the corresponding auxiliary storage element of the plurality of auxiliary storage elements, based on the association of the plurality of splinters with the plurality of location overlay nodes. The processing circuitry (such as the memory management module 218 and the storage management module 220) may store each splinter of the plurality of splinters in the corresponding auxiliary storage element of the plurality of auxiliary storage elements.

Figure 12:
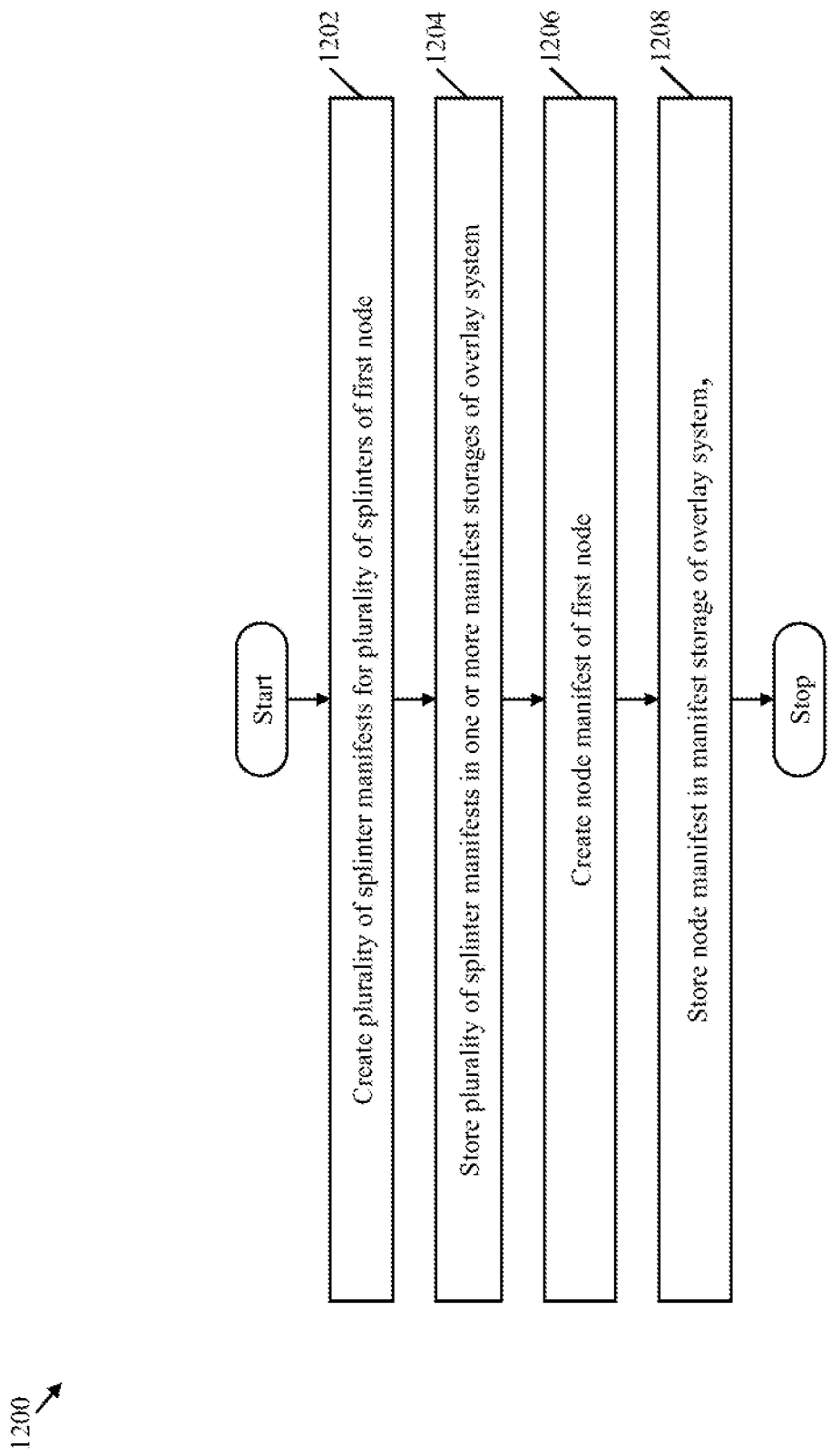
FIG. 12 is a flowchart that illustrates a method of storing splinters, in accordance with an embodiment of the present disclosure.

FIG. 12 is a flowchart 1200 that illustrates a method of storing the splinters, in accordance with an embodiment of the present disclosure. Referring to FIG. 12, at 1202, a plurality of splinter manifests for the plurality of splinters of the first node are created. Each splinter has a splinter state that includes data required to re-create the corresponding splinter, and a splinter manifest of the corresponding splinter includes storage information associated with the splinter state. The processing circuitry (such as the memory management module 218 and the storage management module 220) may create the plurality of splinter manifests for the plurality of splinters of the first node.

At 1204, the plurality of splinter manifests are stored in the one or more manifest storages of the overlay system 202. The processing circuitry (such as the memory management module 218 and the storage management module 220) may store the plurality of splinter manifests in the manifest storages of the overlay system 202. The manifest storages for storing the plurality of splinter manifests are determined by the processing circuitry (such as the memory management module 218 and the storage management module 220). At 1206, a node manifest of the first node is created. The node manifest is created based on a node state of the first node that includes information to re-create the first node. The node manifest includes hierarchical data associated with the plurality of splinters of the first node and storage information associated with the plurality of splinter manifests. The processing circuitry (such as the memory management module 218 and the storage management module 220) may create the node manifest of the first node. At 1208, the node manifest is stored in the manifest storage of the overlay system 202. The processing circuitry (such as the memory management module 218 and the storage management module 220) may store the node manifest in the manifest storage. The manifest storage for storing the node manifest is determined by the processing circuitry (such as the memory management module 218 and the storage management module 220).

The disclosed embodiments encompass numerous advantages including an efficient, robust, and seamless approach for protecting the dataset stored by way of the executable graph-based model 100. The disclosed methods and systems allow a data record of the dataset to be stored in a node that is divided into a plurality of splinters, where each splinter is stored in a designated storage element (such as the auxiliary storage element) of the overlay system 202. Therefore, to access the data record, each splinter is to be retrieved separately and then organized to re-form the data record. Further, each splinter may be stored in a corresponding storage element by way of a corresponding storage strategy. Additionally, each splinter may be protected by way of a corresponding security technique. Therefore, each splinter of the plurality of splinters may be stored at a storage location that may be different from storage locations of other splinters of the plurality of splinters. Additionally, each splinter of the plurality of splinters may be stored by way of a storage strategy that may be different from storage strategies of other splinters of the plurality of splinters. Further, each splinter of the plurality of splinters may be protected by way of a security technique that may be different from security techniques applied to protect other splinters of the plurality of splinters. Therefore, an unauthorized attempt to access the data record may require retrieval of each splinter by understanding the storage strategy associated therewith and subsequently encountering the security technique applied to the splinter to gain access thereof. Such an approach to accessing the data record may be complex, lengthy, inconvenient, and time-consuming, which provides ample time to detect the unauthorized attempt. Further, an unauthorized access, based on an identity theft, may also only provide access to data records associated with the stolen identity. Hence, even a partially successful attack does not affect the entire dataset. Application areas of the overlay system 202 may include, but are not limited to, research and analytics, information technology, communication technology, and data storage.

Certain embodiments of the disclosure may be found in the disclosed systems, methods, and non-transitory computer-readable medium, for facilitating data splintering in the executable graph-based models. The methods and systems disclosed herein include various operations performed by the processing circuitry (e.g., the controller module 206, the transaction module, 208, the message management module 214, and the data splintering management module 242, any other element of the overlay system 202, or a combination of two or more elements of the overlay system 202). The systems disclosed herein include a primary storage element that is configured to store an executable graph-based model that includes a plurality of nodes. The system also includes a plurality of auxiliary storage elements. The processing circuitry is coupled to the primary storage elements and the plurality of auxiliary storage elements. The processing circuitry is configured to receive a first stimulus associated with the overlay system. The first stimulus is indicative of a data splintering instruction. The processing circuitry is further configured to identify, from the plurality of nodes, based on a first context of the first stimulus, at least a first node associated with processing of the first stimulus. The processing circuitry is further configured to execute a data splintering operation on the first node such that the first node is divided into a plurality of splinters. The processing circuitry is further configured to instantiate, in the executable graph-based model, a plurality of location overlay nodes for the plurality of splinters. Each location overlay node, of the plurality of location overlay nodes, is indicative of an auxiliary storage element of the plurality of auxiliary storage elements. The processing circuitry is further configured to associate the first node and the plurality of location overlay nodes such that each location overlay node is associated with a corresponding splinter of the plurality of splinters. The processing circuitry is further configured to store each splinter of the plurality of splinters in the corresponding auxiliary storage element of the plurality of auxiliary storage elements, based on the association of the plurality of location overlay nodes with the plurality of splinters.

In some embodiments, a location overlay node of the plurality of location overlay nodes is associated with a corresponding splinter of the plurality of splinters in a tightly coupled manner such that the location overlay node is directly associated with the corresponding splinter.

In some embodiments, a location overlay node of the plurality of location overlay nodes is associated with a corresponding splinter of the plurality of splinters in a loosely coupled manner such that the location overlay node is associated with the corresponding splinter via one or more intermediate nodes.

In some embodiments, the data splintering instruction is indicative of a command to execute one or more operations to divide the first node into the plurality of splinters. Each splinter of the first node corresponds to a unit of the first node that is separate from one or more remaining splinters of the first node.

In some embodiments, the overlay system further includes a plurality of manifest storages. The processing circuitry is further configured to create a plurality of splinter manifests for the plurality of splinters. Each splinter has a splinter state that includes data required to re-create the corresponding splinter, and a splinter manifest of the corresponding splinter includes storage information associated with the splinter state. The processing circuitry is further configured to store the plurality of splinter manifests in one or more manifest storages of the overlay system. The processing circuitry is further configured to create a node manifest of the first node. The node manifest includes hierarchical data associated with the plurality of splinters of the first node and storage information associated with the plurality of splinter manifests. The processing circuitry is further configured to store the node manifest in a manifest storage of the overlay system.

In some embodiments, the processing circuitry is further configured to receive a second stimulus. The second stimulus is indicative of an operation to be executed on the first node. The processing circuitry is further configured to determine whether the first node is loaded in the executable graph-based model. The processing circuitry is further configured to retrieve, based on the first node being unloaded from the executable graph-based model, the node manifest of the first node from the manifest storage. The processing circuitry is further configured to determine, based on the retrieved node manifest (i) the storage information associated with the plurality of splinter manifests and (ii) the hierarchical data associated with the plurality of splinters. The processing circuitry is further configured to retrieve the plurality of splinter manifests based on the storage information associated with the plurality of splinter manifests. The processing circuitry is further configured to retrieve, based on the plurality of splinter manifests, the splinter state of each of the plurality of splinters. The processing circuitry is further configured to re-create each of the plurality of splinters based on the corresponding splinter state. The processing circuitry is further configured to organize the plurality of splinters based on the hierarchical data associated therewith to re-form the first node. The processing circuitry is further configured to execute the operation associated with the second stimulus on the first node.

In some embodiments, the first node is a run time node that includes a node template that corresponds to a pre-defined structure and a node instance that corresponds to an implementation of the node template. The plurality of splinters include a node template splinter and a node instance splinter.

In some embodiments, the execution of the data splintering operation includes separation of a data structure of the first node from data of the first node. The plurality of splinters include a data structure splinter and a data splinter.

In some embodiments, the processing circuitry is further configured to extract a dynamic node template and a dynamic node instance from the first node. The dynamic node template corresponds to the data structure splinter and the dynamic node instance corresponds to the data splinter. A first location overlay node and a second location overlay node, of the plurality of location overlay nodes, are associated with the dynamic node template and the dynamic node instance, respectively. Based on the association with the first location overlay node, the data structure splinter is stored in a first auxiliary storage element of the plurality of auxiliary storage elements whereas, based on the association with the second location overlay node, the data splinter is stored in a second auxiliary storage element of the plurality of auxiliary storage elements.

In some embodiments, the first node includes a plurality of attribute values for a plurality of attributes associated therewith. To execute the data splintering operation, the processing circuitry is further configured to store the plurality of attribute values in a plurality of attribute vertex nodes associated with the first node. The plurality of attribute vertex nodes constitute the plurality of splinters, where each splinter of the first node corresponds to a unit of the first node that is separated from other splinters of the first node.

In some embodiments, each of the plurality of splinters is associated with the first node via an attribute connection, where the attribute connection corresponds to one of a group consisting of an edge node and an attribute path included in the first node.

In some embodiments, the first node includes a plurality of attribute values for a plurality of attributes associated therewith. Each attribute value includes an attribute data structure and attribute data. The attribute data structure and the attribute data of each attribute value of the plurality of attribute values constitute a corresponding splinter of the plurality of splinters.

In some embodiments, the first node includes a plurality of attribute values for a plurality of attributes. For executing the data splintering operation, the processing circuitry is further configured to create a plurality of sets of attribute values from the plurality of attribute values. The processing circuitry is further configured to store the plurality of sets of attribute values in a plurality of sub-nodes of the first node. The plurality of sub-nodes constitute the plurality of splinters. Each sub-node is associated with the first node via a corresponding attribute connection. The attribute connection corresponds to one of a group consisting of an edge node and an attribute path included in the first node.

In some embodiments, the processing circuitry is further configured to instantiate, in the executable graph-based model, a set of additional overlay nodes for a set of splinters of the plurality of splinters of the first node. The set of additional overlay nodes is instantiated based on the first stimulus. Each additional overlay node is associated with a functionality that is to be executed on an associated splinter of the set of splinters, associate the set of splinters with the set of additional overlay nodes. The processing circuitry is further configured to execute, on each splinter of the set of splinters, the functionality of the corresponding additional overlay node.

In some embodiments, at least one of the set of additional overlay nodes corresponds to a storage strategy overlay node that is associated with a storage strategy using which the corresponding splinter is to be stored.

In some embodiments, at least one of the set of additional overlay nodes corresponds to a security overlay node that is associated with a security technique using which each splinter is to be secured.

In some embodiments, one or more of the set of additional overlay nodes is associated with a corresponding splinter via the location overlay node associated with the splinter.

In some embodiments, the processing circuitry is further configured to instantiate, in the executable graph-based model, based on the first stimulus, a set of security overlay nodes for a set of splinters of the plurality of splinters. The set of splinters includes a primary splinter and one or more secondary splinters. Each of the set of security overlay nodes is associated with a security technique using which an associated splinter is to be secured. The processing circuitry is further configured to associate a first security overlay node of the set of security overlay nodes with the primary splinter. The processing circuitry is further configured to associate the one or more secondary splinters with a corresponding second security overlay node. A security level of the first security overlay node is higher than a security level of the second security overlay node.

In some embodiments, the first node is further associated with a first location overlay node that is different from the plurality of location overlay nodes. The first location overlay node is indicative of one of the plurality of auxiliary storage elements. The first node is associated with a second node such that the second node is a child node of the first node. The second node is further associated with the first location overlay node based on association thereof with the first node.

In some embodiments, the first node is associated with a third node such that the third node is a child node of the first node. The third node is associated with a set of additional overlay nodes based on an association of the set of additional overlay nodes with the first node. The set of additional overlay nodes includes at least one of a group consisting of a storage strategy overlay node and a security overlay node.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for facilitating data splintering in the executable graph-based model. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. An overlay system, comprising:
   a primary storage element configured to store an executable graph-based model that comprises a plurality of nodes;
   a plurality of auxiliary storage elements; and
   processing circuitry that is coupled to the primary storage element and the plurality of auxiliary storage elements, and configured to:
   receive a first stimulus associated with the overlay system, wherein the first stimulus is indicative of a data splintering instruction;
   identify, from the plurality of nodes, based on a first context of the first stimulus, at least a first node associated with processing of the first stimulus;
   execute a data splintering operation on the first node such that the first node is divided into a plurality of splinters;
   instantiate, in the executable graph-based model, a plurality of location overlay nodes for the plurality of splinters, wherein each location overlay node, of the plurality of location overlay nodes, is indicative of an auxiliary storage element of the plurality of auxiliary storage elements;
   associate the first node and the plurality of location overlay nodes such that each location overlay node is associated with a corresponding splinter of the plurality of splinters; and store each splinter of the plurality of splinters in the corresponding auxiliary storage element of the plurality of auxiliary storage elements, based on the association of the plurality of location overlay nodes with the plurality of splinters.

2. The overlay system of 1, wherein a location overlay node of the plurality of location overlay nodes is associated with a corresponding splinter of the plurality of splinters in a tightly coupled manner such that the location overlay node is directly associated with the corresponding splinter.

3. The overlay system of 1, wherein a location overlay node of the plurality of location overlay nodes is associated with a corresponding splinter of the plurality of splinters in a loosely coupled manner such that the location overlay node is associated with the corresponding splinter via one or more intermediate nodes.

4. The overlay system of 1, wherein the data splintering instruction is indicative of a command to execute one or more operations to divide the first node into the plurality of splinters, where each splinter of the first node corresponds to a unit of the first node that is separate from one or more remaining splinters of the first node.

5. The overlay system of 1, further comprising a plurality of manifest storages, wherein the processing circuitry is further configured to:

create a plurality of splinter manifests for the plurality of splinters, wherein each splinter has a splinter state that includes data required to re-create the corresponding splinter, and a splinter manifest of the corresponding splinter includes storage information associated with the splinter state;

store the plurality of splinter manifests in one or more manifest storages of the plurality of manifest storages;

create a node manifest of the first node, wherein the node manifest includes hierarchical data associated with the plurality of splinters of the first node and storage information associated with the plurality of splinter manifests; and store the node manifest in a first manifest storage of the plurality of manifest storages.

6. The overlay system of 5, wherein the processing circuitry is further configured to:

receive a second stimulus, wherein the second stimulus is indicative of an operation to be executed on the first node;

determine whether the first node is loaded in the executable graph-based model;

retrieve, based on the first node being unloaded from the executable graph-based model, the node manifest of the first node from the first manifest storage;

determine, based on the retrieved node manifest, (i) the storage information associated with the plurality of splinter manifests and (ii) the hierarchical data associated with the plurality of splinters;

retrieve the plurality of splinter manifests based on the storage information associated with the plurality of splinter manifests;

retrieve, based on the plurality of splinter manifests, the splinter state of each of the plurality of splinters;

re-create each of the plurality of splinters based on the corresponding splinter state;

organize the plurality of splinters based on the hierarchical data associated therewith to re-form the first node; and execute the operation associated with the second stimulus on re-formed the first node.

7. The overlay system of 1, wherein the first node is a run time node that includes a node template that corresponds to a predefined structure and a node instance that corresponds to an implementation of the node template, and wherein the plurality of splinters include a node template splinter and a node instance splinter.

8. The overlay system of 1, wherein the execution of the data splintering operation includes separation of a data structure of the first node from data of the first node, and wherein the plurality of splinters include a data structure splinter and a data splinter.

9. The overlay system of 8, wherein the processing circuitry is further configured to extract a dynamic node template and a dynamic node instance from the first node, where the dynamic node template corresponds to the data structure splinter and the dynamic node instance corresponds to the data splinter, wherein a first location overlay node and a second location overlay node, of the plurality of location overlay nodes, are associated with the dynamic node template and the dynamic node instance, respectively, and wherein based on the association with the first location overlay node, the data structure splinter is stored in a first auxiliary storage element of the plurality of auxiliary storage elements whereas, based on the association with the second location overlay node, the data splinter is stored in a second auxiliary storage element of the plurality of auxiliary storage elements.

10. The overlay system of 1, wherein the first node includes a plurality of attribute values for a plurality of attributes associated therewith, wherein to execute the data splintering operation, the processing circuitry is further configured to store the plurality of attribute values in a plurality of attribute vertex nodes associated with the first node, and wherein the plurality of attribute vertex nodes constitute the plurality of splinters, where each splinter of the first node corresponds to a unit of the first node that is separated from one or more remaining splinters of the first node.

11. The overlay system of 10, wherein each of the plurality of splinters are associated with the first node via an attribute connection, where the attribute connection corresponds to one of a group consisting of an edge node and an attribute path included in the first node.

12. The overlay system of 1, wherein the first node includes a plurality of attribute values for a plurality of attributes associated therewith, wherein each attribute value includes an attribute data structure and attribute data, and wherein the attribute data structure and the attribute data of each attribute value of the plurality of attribute values constitute a corresponding splinter of the plurality of splinters.

13. The overlay system of 1,
   wherein the first node includes a plurality of attribute values for a plurality of attributes, and
   wherein for executing the data splintering operation, the processing circuitry is further configured to:
      create a plurality of sets of attribute values from the plurality of attribute values,
      store the plurality of sets of attribute values in a plurality of sub-nodes of the first node, wherein the plurality of sub-nodes constitute the plurality of splinters, wherein each sub-node is associated with the first node via a corresponding attribute connection, and wherein the attribute connection corresponds to one of a group consisting of an edge node and an attribute path included in the first node.

14. The overlay system of 1, wherein the processing circuitry is further configured to:
   instantiate, in the executable graph-based model, a set of additional overlay nodes for a set of splinters of the plurality of splinters of the first node, where the set of additional overlay nodes is instantiated based on the first stimulus, wherein each additional overlay node, of the set of additional overlay nodes, is associated with a functionality that is to be executed on an associated splinter of the set of splinters;
   associate the set of splinters with the set of additional overlay nodes; and
   execute, on each splinter of the set of splinters, the functionality of the corresponding additional overlay node.

15. The overlay system of 14, wherein at least one of the set of additional overlay nodes corresponds to a storage strategy overlay node that is associated with a storage strategy using which the corresponding splinter is to be stored.

16. The overlay system of 14, wherein at least one of the set of additional overlay nodes corresponds to a security overlay node that is associated with a security technique using which each splinter is to be secured.

17. The overlay system of 14, wherein one or more of the set of additional overlay nodes is associated with a corresponding splinter via the location overlay node associated with the splinter.

18. The overlay system of 1, wherein the processing circuitry is further configured to:
   instantiate, in the executable graph-based model, based on the first stimulus, a set of security overlay nodes for a set of splinters of the plurality of splinters, wherein the set of splinters includes a primary splinter and one or more secondary splinters, and wherein each of the set of security overlay nodes is associated with a security technique using which an associated splinter is to be secured;
   associate a first security overlay node of the set of security overlay nodes with the primary splinter; and
   associate the one or more secondary splinters with a corresponding second security overlay node, where a security level of the first security overlay node is higher than a security level of the second security overlay node.

19. The overlay system of 1,
   wherein the first node is further associated with a first location overlay node that is different from the plurality of location overlay nodes, where the first location overlay node is indicative of one of the plurality of auxiliary storage elements,
   wherein the first node is associated with a second node such that the second node is a child node of the first node, and
   wherein the second node is further associated with the first location overlay node based on association thereof with the first node.

20. The overlay system of 1,
   wherein the first node is associated with a third node such that the third node is a child node of the first node, where the third node is associated with a set of additional overlay nodes based on an association of the set of additional overlay nodes with the first node, and
   wherein the set of additional overlay nodes includes at least one of a group consisting of a storage strategy overlay node and a security overlay node.

21. A method, comprising:
   receiving, by processing circuitry of an overlay system, a stimulus associated with the overlay system, wherein the stimulus is indicative of a data splintering instruction, and wherein an executable graph-based model having a plurality of nodes is stored in a primary storage element of the overlay system,
   identifying, by the processing circuitry, from the plurality of nodes, based on a context of the stimulus, a first node associated with processing of the stimulus;
   executing, by the processing circuitry, a data splintering operation on the first node such that the first node is divided into a plurality of splinters;
   instantiating, by the processing circuitry, in the executable graph-based model, a plurality of location overlay nodes for the plurality of splinters, wherein each location overlay node, of the plurality of location overlay nodes, is indicative of an auxiliary storage element of a plurality of auxiliary storage elements of the overlay system;
   associating, by the processing circuitry, the first node with the plurality of location overlay nodes such that each location overlay node is associated with a corresponding splinter of the plurality of splinters; and
   storing, by the processing circuitry, each splinter of the plurality of splinters in the corresponding auxiliary storage element of the plurality of auxiliary storage elements, based on the association of the first node with the plurality of location overlay nodes.

What is claimed is:
1. An overlay system, comprising:
   a primary storage element configured to store an executable graph-based model that comprises a plurality of nodes;
   a plurality of auxiliary storage elements; and
   processing circuitry that is coupled to the primary storage element and the plurality of auxiliary storage elements, and configured to:
   receive a first stimulus associated with the overlay system, wherein the first stimulus is indicative of a data splintering instruction;
   identify, from the plurality of nodes, based on a first context of the first stimulus, at least a first node associated with processing of the first stimulus;
   execute a data splintering operation on the first node such that the first node is divided into a plurality of splinters;
   instantiate, in the executable graph-based model, a plurality of location overlay nodes for the plurality of splinters, wherein each location overlay node, of the plurality of location overlay nodes, is indicative of an auxiliary storage element of the plurality of auxiliary storage elements;

associate the first node and the plurality of location overlay nodes such that each location overlay node is associated with a corresponding splinter of the plurality of splinters; and store each splinter of the plurality of splinters in the corresponding auxiliary storage element of the plurality of auxiliary storage elements, based on the association of the plurality of location overlay nodes with the plurality of splinters.

2. The overlay system of claim 1, wherein a location overlay node of the plurality of location overlay nodes is associated with a corresponding splinter of the plurality of splinters in a tightly coupled manner such that the location overlay node is directly associated with the corresponding splinter.

3. The overlay system of claim 1, wherein a location overlay node of the plurality of location overlay nodes is associated with a corresponding splinter of the plurality of splinters in a loosely coupled manner such that the location overlay node is associated with the corresponding splinter via one or more intermediate nodes.

4. The overlay system of claim 1, wherein the data splintering instruction is indicative of a command to execute one or more operations to divide the first node into the plurality of splinters, where each splinter of the first node corresponds to a unit of the first node that is separate from one or more remaining splinters of the first node.

5. The overlay system of claim 1, further comprising a plurality of manifest storages, wherein the processing circuitry is further configured to:

create a plurality of splinter manifests for the plurality of splinters, wherein each splinter has a splinter state that includes data required to re-create the corresponding splinter, and a splinter manifest of the corresponding splinter includes storage information associated with the splinter state;

store the plurality of splinter manifests in one or more manifest storages of the plurality of manifest storages;

create a node manifest of the first node, wherein the node manifest includes hierarchical data associated with the plurality of splinters of the first node and storage information associated with the plurality of splinter manifests; and store the node manifest in a first manifest storage of the plurality of manifest storages.

6. The overlay system of claim 5, wherein the processing circuitry is further configured to:

receive a second stimulus, wherein the second stimulus is indicative of an operation to be executed on the first node;

determine whether the first node is loaded in the executable graph-based model;

retrieve, based on the first node being unloaded from the executable graph-based model, the node manifest of the first node;

determine, based on the retrieved node manifest, (i) the storage information associated with the plurality of splinter manifests and (ii) the hierarchical data associated with the plurality of splinters;

retrieve the plurality of splinter manifests based on the storage information associated with the plurality of splinter manifests;

retrieve, based on the plurality of splinter manifests, the splinter state of each of the plurality of splinters;

re-create each of the plurality of splinters based on the corresponding splinter state;

organize the plurality of splinters based on the hierarchical data associated therewith to re-form the first node; and execute the operation associated with the second stimulus on the re-formed first node.

7. The overlay system of claim 1, wherein the first node is a run time node that includes a node template that corresponds to a predefined structure and a node instance that corresponds to an implementation of the node template, and wherein the plurality of splinters include a node template splinter and a node instance splinter.

8. The overlay system of claim 1, wherein the execution of the data splintering operation includes separation of a data structure of the first node from data of the first node, and wherein the plurality of splinters include a data structure splinter and a data splinter.

9. The overlay system of claim 8, wherein the processing circuitry is further configured to extract a dynamic node template and a dynamic node instance from the first node, where the dynamic node template corresponds to the data structure splinter and the dynamic node instance corresponds to the data splinter, wherein a first location overlay node and a second location overlay node, of the plurality of location overlay nodes, are associated with the dynamic node template and the dynamic node instance, respectively, and wherein based on the association with the first location overlay node, the data structure splinter is stored in a first auxiliary storage element of the plurality of auxiliary storage elements, whereas, based on the association with the second location overlay node, the data splinter is stored in a second auxiliary storage element of the plurality of auxiliary storage elements.

10. The overlay system of claim 1, wherein the first node includes a plurality of attribute values for a plurality of attributes associated therewith, wherein to execute the data splintering operation, the processing circuitry is further configured to store the plurality of attribute values in a plurality of attribute vertex nodes associated with the first node, and wherein the plurality of attribute vertex nodes constitute the plurality of splinters, where each splinter of the first node corresponds to a unit of the first node that is separated from one or more remaining splinters of the first node.

11. The overlay system of claim 10, wherein each of the plurality of splinters is associated with the first node via an attribute connection, where the attribute connection corresponds to one of a group consisting of an edge node and an attribute path included in the first node.

12. The overlay system of claim 1, wherein the first node includes a plurality of attribute values for a plurality of attributes associated therewith, wherein each attribute value includes an attribute data structure and attribute data, and wherein the attribute data structure and the attribute data of each attribute value of the plurality of attribute values constitute a corresponding splinter of the plurality of splinters.

13. The overlay system of claim 1, wherein the first node includes a plurality of attribute values for a plurality of attributes, and wherein for executing the data splintering operation, the processing circuitry is further configured to:

create a plurality of sets of attribute values from the plurality of attribute values; and store the plurality of sets of attribute values in a plurality of sub-nodes of the first node, wherein the plurality of sub-nodes constitute the plurality of splinters, and wherein each sub-node is associated with the first node via a corresponding attribute connection that corresponds to one of a group consisting of an edge node and an attribute path included in the first node.

14. The overlay system of claim 1, wherein the processing circuitry is further configured to:

instantiate, in the executable graph-based model, a set of additional overlay nodes for a set of splinters of the plurality of splinters of the first node, where the set of additional overlay nodes is instantiated based on the first stimulus, wherein each additional overlay node, of the set of additional overlay nodes, is associated with a functionality that is to be executed on an associated splinter of the set of splinters;

associate the set of splinters with the set of additional overlay nodes; and execute, on each splinter of the set of splinters, the functionality of the corresponding additional overlay node.

15. The overlay system of claim 14, wherein at least one of the set of additional overlay nodes corresponds to a storage strategy overlay node that is associated with a storage strategy using which the corresponding splinter is to be stored.

16. The overlay system of claim 14, wherein at least one of the set of additional overlay nodes corresponds to a security overlay node that is associated with a security technique using which each splinter is to be secured.

17. The overlay system of claim 14, wherein one or more of the set of additional overlay nodes is associated with a corresponding splinter via the location overlay node associated with the splinter.

18. The overlay system of claim 1, wherein the processing circuitry is further configured to:

instantiate, in the executable graph-based model, based on the first stimulus, a set of security overlay nodes for a set of splinters of the plurality of splinters, wherein the set of splinters includes a primary splinter and one or more secondary splinters, and wherein each of the set of security overlay nodes is associated with a security technique using which an associated splinter is to be secured;

associate a first security overlay node of the set of security overlay nodes with the primary splinter; and associate the one or more secondary splinters with a corresponding second security overlay node, where a security level of the first security overlay node is higher than a security level of the second security overlay node.

19. The overlay system of claim 1, wherein the first node is further associated with a first location overlay node that is different from the plurality of location overlay nodes, where the first location overlay node is indicative of one of the plurality of auxiliary storage elements, wherein the first node is associated with a second node such that the second node is a child node of the first node, and wherein the second node is further associated with the first location overlay node based on the association with the first node.

20. A method, comprising:

receiving, by processing circuitry of an overlay system, a stimulus associated with the overlay system, wherein the stimulus is indicative of a data splintering instruction, and wherein an executable graph-based model having a plurality of nodes is stored in a primary storage element of the overlay system;

identifying, by the processing circuitry, from the plurality of nodes, based on a context of the stimulus, a first node associated with processing of the stimulus;

executing, by the processing circuitry, a data splintering operation on the first node such that the first node is divided into a plurality of splinters;

instantiating, by the processing circuitry, in the executable graph-based model, a plurality of location overlay nodes for the plurality of splinters, wherein each location overlay node, of the plurality of location overlay nodes, is indicative of an auxiliary storage element of a plurality of auxiliary storage elements of the overlay system;

associating, by the processing circuitry, the first node with the plurality of location overlay nodes such that each location overlay node is associated with a corresponding splinter of the plurality of splinters; and storing, by the processing circuitry, each splinter of the plurality of splinters in the corresponding auxiliary storage element of the plurality of auxiliary storage elements, based on the association of the first node with the plurality of location overlay nodes.

* * * * *